United States Patent
Abe et al.

(10) Patent No.: US 7,946,717 B2
(45) Date of Patent: May 24, 2011

(54) PROJECTION OPTICAL SYSTEM AND IMAGE PROJECTING APPARATUS

(75) Inventors: Issei Abe, Kanagawa (JP); Kazuhiro Fujita, Tokyo (JP); Atsushi Takaura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 518 days.

(21) Appl. No.: 11/854,825

(22) Filed: Sep. 13, 2007

(65) Prior Publication Data

US 2008/0068563 A1 Mar. 20, 2008

(30) Foreign Application Priority Data

Sep. 15, 2006 (JP) .................................. 2006-251910
Sep. 4, 2007 (JP) .................................. 2007-229442

(51) Int. Cl.
*G03B 21/28* (2006.01)

(52) U.S. Cl. ................. 353/99; 353/77; 353/78; 353/79; 353/98; 353/122; 359/649; 359/650; 359/651; 359/749; 359/750; 359/751

(58) Field of Classification Search .................... 353/77, 353/78, 79, 98, 99, 122; 359/649, 650, 651, 359/749, 750, 751
See application file for complete search history.

(56) References Cited

U.S. PATENT DOCUMENTS

| | | | | |
|---|---|---|---|---|
| 2,510,080 | A | | 6/1950 | Cuneo |
| 5,515,122 | A * | 5/1996 | Morishima et al. ............. 353/98 |
| 5,871,266 | A * | 2/1999 | Negishi et al. .................. 353/98 |
| 6,109,756 | A * | 8/2000 | Takahashi ....................... 359/857 |
| 6,183,095 | B1 * | 2/2001 | Hudyma ......................... 359/857 |
| 6,198,576 | B1 * | 3/2001 | Matsuyama .................... 359/649 |
| 6,779,897 | B2 * | 8/2004 | Konno et al. ................... 353/99 |
| 6,829,099 | B2 * | 12/2004 | Kato et al. ..................... 359/650 |
| 7,239,452 | B2 * | 7/2007 | Kuwa ............................. 359/649 |
| 2003/0039029 | A1 * | 2/2003 | Suzuki ........................... 359/432 |
| 2004/0156117 | A1 * | 8/2004 | Takaura et al. ................ 359/651 |

FOREIGN PATENT DOCUMENTS

| | | |
|---|---|---|
| EP | 1 387 207 A2 | 2/2004 |
| EP | 1387207 A2 * | 2/2004 |
| JP | 59-97112 | 6/1984 |
| JP | 3-101708 | 4/1991 |
| JP | 6-91641 | 11/1994 |
| JP | 2002-40326 | 2/2002 |
| JP | 2002-174853 | 6/2002 |
| JP | 2004-61959 | 2/2004 |
| JP | 2004-258620 | 9/2004 |
| JP | 3727543 | 10/2005 |
| WO | WO 2005/106560 A1 | 11/2005 |
| WO | WO 2006/043666 A1 | 4/2006 |

OTHER PUBLICATIONS

U.S. Appl. No. 12/160,818, filed Jul. 14, 2008, Abe, et al.
U.S. Appl. No. 11/854,920, filed Sep. 13, 2007, Abe, et al.

* cited by examiner

*Primary Examiner* — Georgia Y Epps
*Assistant Examiner* — Sultan Chowdhury
(74) *Attorney, Agent, or Firm* — Oblon, Spivak, McClelland, Maier & Neustadt, L.L.P.

(57) ABSTRACT

A projection optical system including a first optical system configured to form a second image conjugate to a first image and a second optical system configured to include a reflective optical element which reflects light from the second image and to project a third image conjugate to the second image onto a projection surface is provided, wherein the first optical system has a Petzval sum with a sign opposite to a sign of a Petzval sum of the second optical system.

16 Claims, 38 Drawing Sheets

PTZ VS MIRROR SIZE

PROJECTION OPTICAL SYSTEM AND IMAGE PROJECTING APPARATUS

BACKGROUND OF THE INVENTION

1. Field of the Invention

The present invention relates to a projection optical system and an image projecting apparatus.

2. Description of the Related Art

In recent years, an enlarging projection system has attracted attention which uses a displaying device (referred to as a light valve, below) in which a transmission-type or reflection-type dot matrix liquid crystal and a DMD (Digital Micromirror Device) is used and which enlarges and projects an image displayed on the light valve onto a screen so as to exhibit it as a large image.

However, it is not easy to obtain a large-format liquid crystal displaying device with no defect in the production thereof in order to increase the surface area of a light valve, itself, for projecting a large image, and if it were obtained, it would be extremely expensive.

In such a situation, when a light valve such as a transmission-type (or reflection-type) liquid crystal and a DMD is used and an image displayed thereon is enlarged and projected, the size of a screen is not restricted and it is possible to obtain a powerful large image. Therefore, an image-enlarging projection apparatus (projector) has been widely utilized in an office, a school, or home.

However, when a situation of practical utilization of a projector is assumed, a location for setting a projector may be problematic.

For example, when a front-type projector for projecting an image in front in an office is utilized by a few people in a relatively small conference room, no small restriction is provided on a location for setting a projector due to, for example, the size of a projected image, a projection distance, connection with a PC, a table layout for comfortable discussion, and a problem of less usability thereof may occur. Also, in particular, when a presentation material is projected on a projector and explained, a presenter may be forced to stand between the projector and a screen. Then, a shadow of the presenter may be reflected on the screen and a problem may occur such that an audience cannot see a portion of a projected image.

Recently, various kinds of devices for reducing a projection distance with respect to a large screen have been developed increasingly. However, for example, a projection distance of at least about 1 m is required for a front-type one in order to obtain an image with a diagonal size of 50-60 inches in a conventional technique, and at such a distance, a problem often occurs such that the shadow of a presenter reflects on a screen.

Also, a rear-type displaying device, namely, a rear projector, has bee provided in which a projector is contained in a cabinet and rear projection is made on a screen provided on the front face of the cabinet so as to allow an enlarged image to be seen from the side of front face of the cabinet, and a thin-type one is needed in order to realize reduction of the depth thereof. Herein, even if several times of folding are made with, for example, plane mirrors in a housing, there is a limitation on miniaturization of the device, itself, and therefore, reduction of a projection distance of an optical system is desired increasingly.

Japanese Patent Application Publication No. 2002-040326 discloses a conventional technique for a reflection-type imaging optical system, which aims to provide a reflection-type imaging optical system which can suppress size increasing of an imaging optical system and attain a wide angle of view. As a practical example thereof, a reflection-type imaging optical system with four (first to fourth) reflection mirrors is provided, wherein the first reflection mirror has a concave surface and the second to fourth reflection mirrors are convex ones. Also, at least one reflection mirror of each reflection mirror is formed into a shape of free-form surface so as to ensure the desired projection performance.

Japanese Patent Application Publication No. 2002-174853 discloses a conventional technique relating and being limited to a rear-projection-type display device, in which the projection distance to a screen has been reduced. As a method for reducing the depth of the device, there is provided a conventional technique for reducing the projection distance by, for example, arranging a pair of concave mirrors and a convex mirror having a diverging function in an optical path from a displaying optical unit to a rear-surface reflection mirror in the order of the concave mirrors and the convex mirror from the side of displaying optical unit.

Japanese Examined Patent Application No. H06-091641 discloses a conventional technique relating to a video projector. There are descriptions of a rear-projection-type video projector intended to provide a thin-type one in which the first mirror surface of a television set is formed into a convex shape.

A common problem to the conventional techniques described above is to use many aspheric surfaces including a free-form surface in order to maintain an imaging performance and realize a wide angle of view, and accordingly, it is necessary to keep a strict precision of the distance between respective surfaces as well as a precision of the surface shape. Particularly, since the influence of an error in regard to the precision of a mirror surface is large in a type including the reflection mirrors in Japanese Patent Application Publication No. 2002-040326, there is a problem of setting of a comparatively narrower tolerance among these conventional projection-optical systems.

Also, when composed of only reflection mirrors, there is provided a merit of no generation of a chromatic aberration in principle. On the other hand, it is necessary to insert a color combining prism such as a cross prism and a Philips prism and a chromatic aberration is caused in case of an image forming system which forms a color image by combining plural colors. Therefore, if the projection optical system is composed of only reflection mirrors, there is provided a demerit such that the chromatic aberration cannot be compensated for.

Thus, in regard to the projection optical system, projection-type image displaying device and image displaying system disclosed in Japanese Patent Application Publication No. 2004-061959, a lens system and plural reflective surfaces having a power are used in the projection optical system. Therefore, it is possible to compensate for a chromatic aberration caused by, for example, the color combining prism, by using the lens system. However, 3-5 aspheric mirrors are used in the practical examples and the cost is high. Also, it is necessary to set the surface precision and positional precision of the reflective surfaces to be extremely high similarly to the publicly known case described above, and there is a problem of a strict precision of assembly for the optical system. Furthermore, since light beams emitted from an image forming element is not telecentric, the brightness at an image plane may not be uniform or it may be necessary to make the effective angular range of a film of the color combining prism be wider than the divergence angle of light emitted from the light valve, whereby the separation characteristic may be degraded.

Also, in regard to the projection optical system, enlarging projection optical system, enlarging projection apparatus and image projecting apparatus disclosed in Japanese Patent Application Publication No. 2004-258620, a lens system and plural reflective surfaces having a power are used in the projection optical system. Since enlargement is attained by using one rotationally aspherical reflective surface, the cost is saved and the precision of assembly is totally lowered compared to the technique disclosed in Japanese Patent Application Publication No. 2004-061959. However, since the lens system is parallel decentered and tilted with respect to the optical axis in practical examples 1-5, it is very difficult to conduct the centering thereof. Also, a lens system is used without decentering in practical example 6, but the diameter of a lens that is closest to a screen is large due to the lens configuration, and a free-form surface is used for the lens, whereby the cost is high. More specifically, the lens system is a coaxial system in practical example 6 but there is no description for the relation between the lens system and the concave mirror. Then, the last lens may be a lens with a free-form surface or the diameter thereof may be large, which may be factors of cost increase.

Furthermore, in an image displaying apparatus disclosed in Japanese Patent No. 3727543, the field curvature of the total system is eliminated by including a lens for compensating for the field curvature of a reflection part in the lens part. This is unsurprising as a method for eliminating the field curvature on a screen since it is only one system without forming an intermediate image between an image forming element and the screen and is not so different from a usual lens system. Also, since a front stop is referred to, for example, only a DMD can be provided for the image forming element and a transmission or reflection type liquid crystal cannot be applied to the image forming element.

In such a situation, the inventor(s) considered to provide a projection optical system whose field curvature is reduced.

Also, the inventor(s) considered to provide an image projecting apparatus which includes a projection optical system whose field curvature is reduced.

SUMMARY OF THE INVENTION

According to one aspect of the present invention, there is provided a projection optical system comprising a first optical system configured to form a second image conjugate to a first image and a second optical system configured to comprise a reflective optical element which reflects light from the second image and to project a third image conjugate to the second image onto a projection surface, wherein the first optical system has a Petzval sum with a sign opposite to a sign of a Petzval sum of the second optical system.

According to another aspect of the present invention, there is provided a projection optical system in which plural light beams emitted from an image forming element displaying image information on a conjugate plane A are allowed to be obliquely incident on a conjugate plane B so as to form an enlarged image of an image formed by the image forming element on the conjugate plane B, wherein the projection optical system comprises, at least, a first optical system, a second optical system, an intermediate image of the image forming element between the first optical system and the second optical system on which the plural light beams are generally converged, an optical system having a refractive power in the first optical system being composed of only a lens system transmitting the light beams, the intermediate image being formed by only a refractive power of the first optical system, the second optical system being a reflective optical system comprising a reflection mirror having a positive refractive power which reflects the light beams and is directly behind the intermediate image, and the first optical system being configured to compensate for a Petzval sum component provided in the second optical system.

According to another aspect of the present invention, there is provided a projection optical system in which plural light beams emitted from an image forming element displaying image information on a conjugate plane A are allowed to be obliquely incident on a conjugate plane B so as to form an enlarged image of an image formed by the image forming element on the conjugate plane B, wherein the projection optical system comprises, at least, a first optical system, a second optical system, an intermediate image of the image forming element between the first optical system and the second optical system on which the plural light beams are generally converged, an optical system having a refractive power in the first optical system being composed of a lens system transmitting the light beams and a reflection mirror being rotationally symmetric with respect to an optical axis of the first optical system and having a negative refractive power, the intermediate image being formed by only a refractive power of the first optical system, the second optical system being a reflective optical system comprising a reflection mirror having a positive refractive power which reflects the light beams and is directly behind the intermediate image, and the first optical system being configured to compensate for a Petzval sum component provided in the second optical system.

According to another aspect of the present invention, there is provided an image projecting apparatus wherein the projection optical system as described above is installed.

DETAILED DESCRIPTION OF THE PREFERRED EMBODIMENTS

Figure 1:
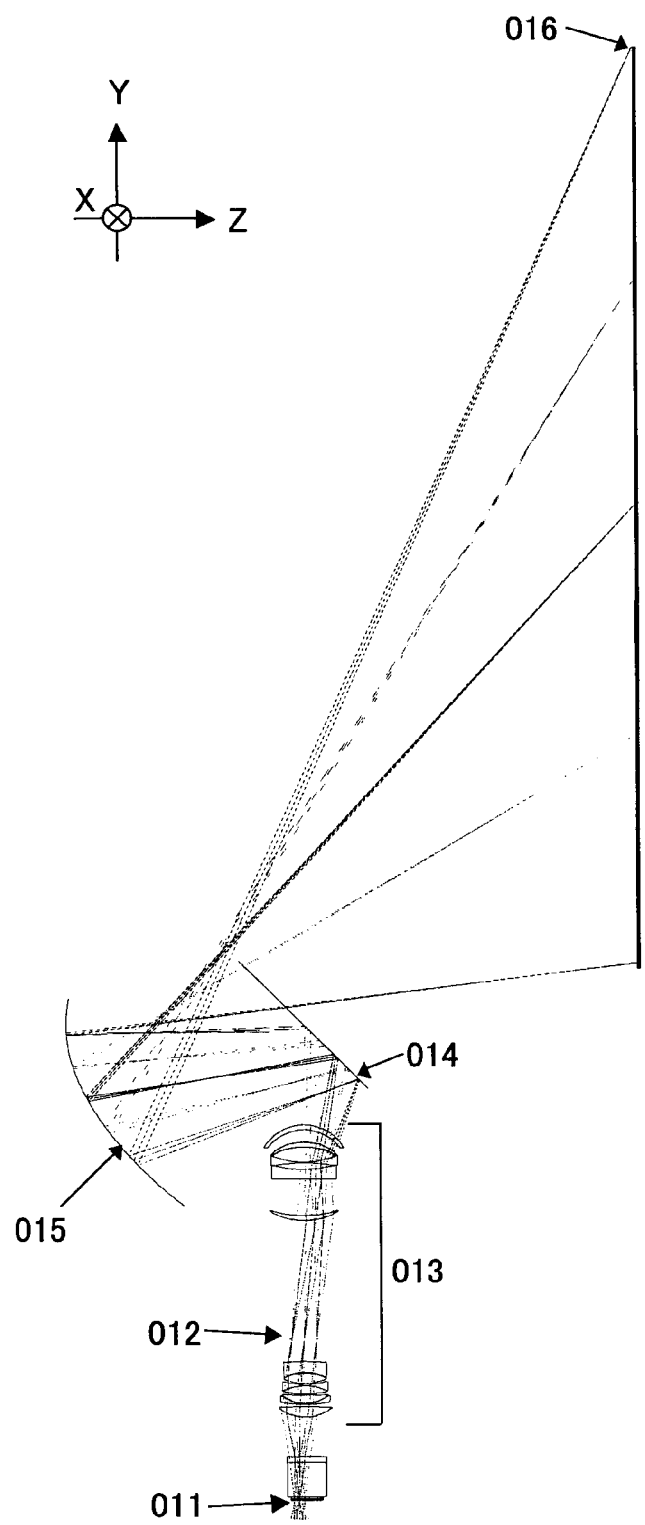
FIG. 1 is a diagram showing practical example 1 of the present invention.

Next, some embodiment(s) of the present invention are illustrated with reference to the drawings.

The first embodiment of the present invention is a projection optical system in which plural light beams emitted from an image forming element displaying image information on a conjugate plane A are allowed to be obliquely incident on a conjugate plane B so as to form an enlarged image of an image formed by the image forming element on the conjugate plane B, wherein the projection optical system comprises, at least, a first optical system, a second optical system, an intermediate image of the image forming element between the first optical system and the second optical system on which the plural light beams are generally converged, an optical system having a refractive power in the first optical system being composed of only a lens system transmitting the light beams, the intermediate image being formed by only a refractive power of the first optical system, the second optical system being a reflective optical system comprising a reflection mirror having a positive refractive power which reflects the light beams and is directly behind the intermediate image, and the first optical system being configured to compensate for a Petzval sum component provided in the second optical system.

According to the first embodiment of the present invention, since the first optical system compensates for the Petzval sum component of the reflection mirror having a positive refractive power in the second optical system, the field curvature at a screen surface that is an image plane may be reduced. Accordingly, a resolution performance may be improved.

The second embodiment of the present invention is a projection optical system in which plural light beams emitted from an image forming element displaying image information on a conjugate plane A are allowed to be obliquely incident on a conjugate plane B so as to form an enlarged image of an image formed by the image forming element on the conjugate plane B, wherein the projection optical system comprises, at least, a first optical system, a second optical system, an intermediate image of the image forming element between the first optical system and the second optical system on which the plural light beams are generally converged, an optical system having a refractive power in the first optical system being composed of a lens system transmitting the light beams and a reflection mirror being rotationally symmetric with respect to an optical axis of the first optical system and having a negative refractive power, the intermediate image being formed by only a refractive power of the first optical system, the second optical system being a reflective optical system comprising a reflection mirror having a positive refractive power which reflects the light beams and is directly behind the intermediate image, and the first optical system being configured to compensate for a Petzval sum component provided in the second optical system.

According to the second embodiment of the present invention, since the first optical system compensates for the Petzval sum component of the reflection mirror having a positive refractive power in the second optical system, the field curvature at a screen surface that is an image plane may be reduced. Accordingly, a resolution performance may be improved.

The third embodiment of the present invention is the projection optical system according to the first or second embodiment of the present invention, wherein a curved surface of the mirror having a positive refractive power in the second optical system has a shape such that a curvature thereof becomes smaller from its intersection point with an optical axis of the first optical system to a perimeter thereof.

According to the third embodiment of the present invention, a distortion aberration and a field curvature of an enlarged image on a screen may be corrected. Accordingly, a resolution performance may be improved.

The fourth embodiment of the present invention is the projection optical system according to the first or second embodiment of the present invention, wherein the mirror having a positive refractive power in the second optical system has an anamorphic and polynomial free-form surface having different powers between a minor axis direction and major axis direction of the image forming element.

According to the fourth embodiment of the present invention, the freedom of design may be increased. Accordingly, the capability of correcting an aberration may be further improved and/or a resolution performance may be improved.

The fifth embodiment of the present invention is the projection optical system according to the first or second embodiment of the present invention, wherein the mirror having a positive refractive power in the second optical system has a surface with a rotationally symmetric and aspherical shape.

According to the fifth embodiment of the present invention, since its shape is rotationally symmetric with respect to an axis, it may be easy to process the mirror having a positive refractive power. Accordingly, an error of shape may be reduced and/or a processing time period may be reduced, which may lead to cost reduction.

The sixth embodiment of the present invention is the projection optical system according to the first or second embodiment of the present invention, wherein a lens of the first optical system has at least one surface with an aspherical shape.

According to the sixth embodiment of the present invention, since the aspherical surface is used in the first optical system, a resolution performance with respect to an enlarged image may be improved.

The seventh embodiment of the present invention is the projection optical system according to the sixth embodiment of the present invention, wherein at least one aspherical surface in the first optical system is positioned in a third group.

According to the seventh embodiment of the present invention, since the third group of the first optical system is a group in which the angles of view of the light beams are most separated among all the groups and an aspherical surface is applied to it, the light beams at respective angles of view may be corrected independently. Accordingly, a resolution performance with respect to an enlarged image may be further improved.

The eighth embodiment of the present invention is the projection optical system according to the seventh embodiment of the present invention, wherein at least one aspherical surface in the third group of the first optical system is positioned on a lens having a positive refractive power.

According to the eighth embodiment of the present invention, since the lens having a positive power in the third group is a lens at which the angles of view of the light beams are separated well in the third group, the light beams at respective angles of view may be corrected independently. Accordingly, a resolution performance with respect to an enlarged image may be further improved.

The ninth embodiment of the present invention is the projection optical system according to the sixth embodiment of the present invention, wherein at least one aspherical surface in the first optical system is a surface of a lens system that is closest to the conjugate plane B.

According to the ninth embodiment of the present invention, the surface that is closest to the conjugate plane B in the third group is provided on a lens at which the angles of view of the light beams are most separated in the third group, the light beams at respective angles of view may be corrected independently. Accordingly, a resolution performance with respect to an enlarged image may be further improved.

The tenth embodiment of the present invention is the projection optical system according to the first or second embodiment of the present invention, wherein the intermediate image is curved and tilted with respect to a surface perpendicular to an optical axis of the first optical system.

According to the tenth embodiment of the present invention, a field curvature of an enlarged image on the screen may be counter-corrected at the side of an object (intermediate image). Accordingly, a resolution performance may be improved.

The eleventh embodiment of the present invention is the projection optical system according to the first or second embodiment of the present invention, wherein the projection optical system is generally telecentric from the image forming element to a first surface of the transmittable refractive optical system.

According to the eleventh embodiment of the present invention, since the light beams emitted from the image forming element are introduced into the first optical system at generally the same angle over the entire angle of view, the brightness of an enlarged image on the screen may be generally uniformized. Also, when a film having a certain incident angle characteristic is arranged between the image forming element and the first optical system, it is only necessary to take only the range of introduction angle into consideration. Therefore, the incident angle may be reduced, which may lead to cost reduction.

The twelfth embodiment of the present invention is the projection optical system according to the first or second embodiment of the present invention, wherein a reflection mirror is arranged between lenses of the first optical system.

According to the twelfth embodiment of the present invention, a folding mirror is arranged between lenses in the first optical system. Accordingly, an optical path from the image forming element to the folding mirror may be folded in empty space, whereby the spatial occupancy of the optical system may be reduced.

The thirteenth embodiment of the present invention is the projection optical system according to the first or second embodiment of the present invention, wherein the Petzval sum component of the first optical system is negative.

According to the thirteenth embodiment of the present invention, since the Petzval sum component of the first optical system is negative, the field curvature caused by the reflection mirror having a positive refractive power in the second optical system may be canceled. Accordingly, a resolution performance may be improved.

The fourteenth embodiment of the present invention is the projection optical system according to the thirteenth embodiment of the present invention, wherein the following condition:

$$PTZ < -0.0115$$

is satisfied, where PTZ is the Petzval sum component of the first optical system.

According to the fourteenth embodiment of the present invention, since the Petzval sum component of the first optical system is equal to or less than −0.0115, it may be generated on the intermediate image so as to greatly correct the field curvature that is previously caused when enlargement is made by the reflection mirror having a positive refractive power. Therefore, the magnification may be increased and/or the size of the intermediate image which corresponds to an object may be decreased. Furthermore, the size of the reflection mirror having a positive refractive power may be also decreased. Also, a resolution performance may be improved.

The fifteenth embodiment of the present invention is an image projecting apparatus wherein the projection optical system according to any of the first to fourteenth embodiments of the present invention is installed.

According to the fifteenth embodiment of the present invention, a projection apparatus may be realized in which a projection optical system is used whose lens size or mirror size is not so large even if the magnification thereof is high and the resolution performance is high. Therefore, a projection apparatus may be realized in which a desired magnification may be obtained, short distance projection may be possible, and the cost may be saved. Also, when the projection optical system according to any of the embodiments of the present invention is applied to rear-projection, an apparatus may be realized whose cost may be reduced compared to the conventional one and which may be possible to be thinned.

The sixteenth embodiment of the present invention is a projection optical system comprising a first optical system configured to form a second image conjugate to a first image and a second optical system configured to comprise a reflective optical element which reflects light from the second image and to project a third image conjugate to the second image onto a projection surface, wherein the first optical system has a Petzval sum with a sign opposite to a sign of a Petzval sum of the second optical system.

According to the sixteenth embodiment of the present invention, a projection optical system whose field curvature is reduced may be provided.

The seventeenth embodiment of the present invention is an image projecting apparatus wherein the projection optical system according to the sixteenth embodiment of the present invention is installed.

According to the seventeenth embodiment of the present invention, an image projecting apparatus may be provided which includes a projection optical system whose field curvature is reduced.

Practical Example 1

Practical example 1 of the present invention is shown in FIG. 1.

Herein, in regard to the coordinate system in the figures illustrating examples of the present invention, X is the directions of the major axis of a screen on a conjugate plane B, Y is the directions of the minor axis thereof, and Z is the directions of the normal of the screen.

A projection optical system is to project an image formed by an image forming element 011 on a conjugate plane A onto a screen 016 on a conjugate plane B, whose optical system having a refractive power is composed of a first optical system 013 that is a coaxial system and is composed of only a lens system transmitting light beams and a second optical system 015 that includes at least one reflective surface having a positive power, wherein the first optical system 013 and the second optical system 015 are arranged from the image forming element 011, and an intermediate image between the first optical system 013 and the second optical system 015 is once formed from the image formed on the image forming element 011, while enlarging projection is made as a whole. Additionally, a folding mirror 014 is arranged to fold the optical path so as to make the optical system be compact and does not contribute to project an image formed on the image forming element 011 onto the screen.

Figure 4:
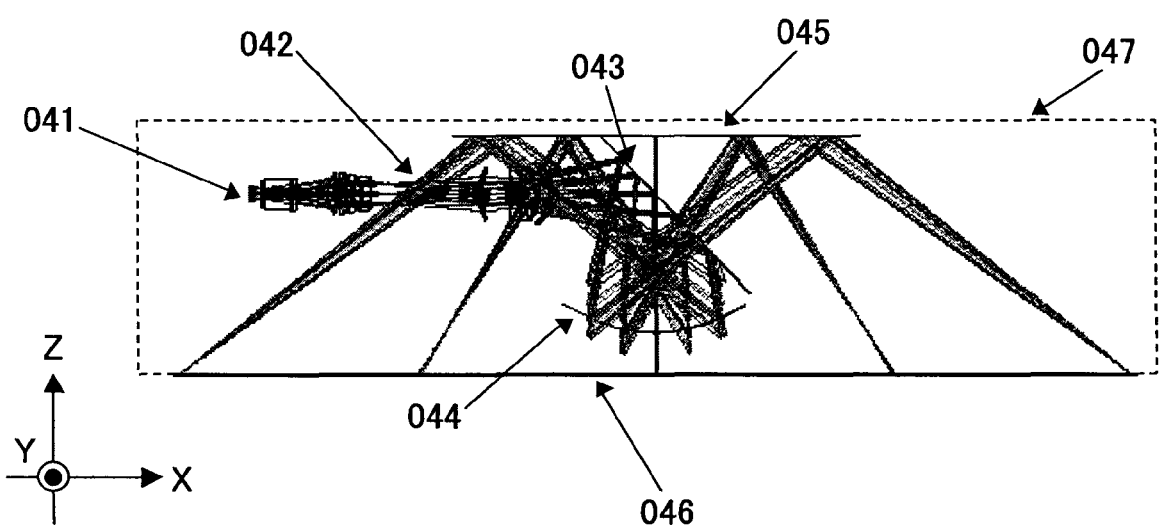
FIG. 4 is a top view of the system of FIG. 1, that is, a cross-sectional view of the system in an X-Z plane.

FIG. 4 is a top view of FIG. 1, that is, a cross-sectional view of the system in an XZ plane, in which the direction of folding of the optical path by a folding mirror 043 is changed. In FIG. 1, the direction of folding of the optical path by the folding mirror 014 is such that the first optical system 013 and the lower part are folded to a Y-direction, but it is obvious that, for example, the first optical system 042 may be folded to an X-direction as shown in FIG. 4, so as to reduce the spatial occupancy of the optical system. Furthermore, in the second optical system, a folding mirror 045 parallel to a screen 046 may be arranged behind a reflection mirror 044 having a positive power, and when the optical system is installed in one housing 047 as shown in FIG. 4, the depth of the housing may be reduced. This similarly applies to all of the following examples.

Figure 12:
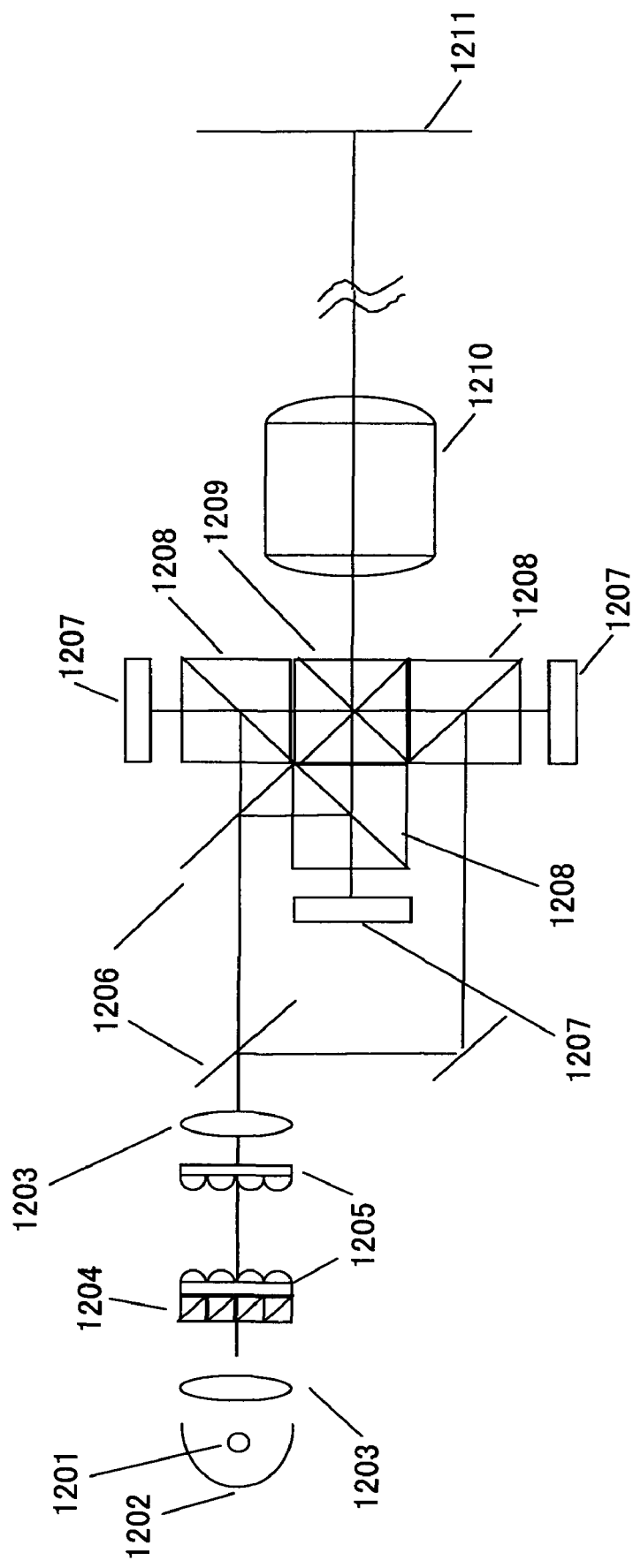
FIG. 12 is a diagram showing a projection apparatus to which a projection optical system is applied.

Additionally, for simplicity, only one image forming element is shown in the figures, but it is obvious that a color image may be projected onto a screen by using plural image forming elements 1207 such as red, green, and blue ones, color-combining light beams modulated by the respective elements using a color combining part 1209 such as a publicly known dichroic prism, and then, introducing them into the projection optical system 1210, as shown in FIG. 12.

Also, when light beams are generally telecentric from an image forming element 1107 to the first surface of a first optical system (the eleventh embodiment of the present invention), the brightness of an enlarged image of the image forming element 1107 on a screen 1111 may be uniformized and the angular characteristic of an dichroic film of a color combining part 1109 that may be used for a color image projection using plural elements as described above may be narrow so as to become easy to produce the film itself, since it is only necessary to take only the divergence angle of light emitted from the image forming element 1207 into consideration. Furthermore, in the case of an image forming apparatus using a polarized-light separating part 1108, the angular characteristic of a polarized-light separating film thereof may be preferably narrow. Of course, the embodiment(s) of the present invention is applicable to a non-telecentric optical system.

Figure 2:
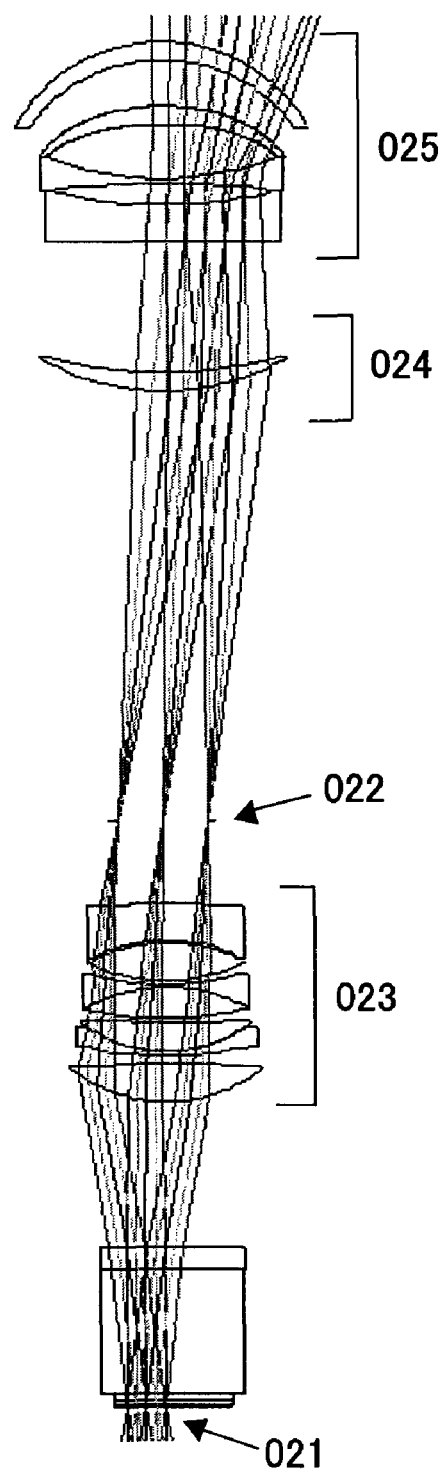
FIG. 2 is an enlarged view of the first optical system of practical example 1.

FIG. 2 is an enlarged view of the first optical system of practical example 1.

As shown in FIG. 2, the freedom of design may be increased and an imaging performance on a screen may be improved by using an aspherical lens for a first optical system (the sixth embodiment of the present invention). Furthermore, when the first optical system is divided by a stop 022 and the space where the maximum lens distance is provided in the lens group 025 at the side of conjugate plane B from the stop 022, the third group 025 that is closest to the conjugate plane B is a group in which the light beams with respective angles of view are most separated. Therefore, aberration correction may be independently applied with respect to the angles of view by using an aspherical surface in the group (the seventh embodiment of the present invention). In particular, since the light beams with the respective angles of view are separated well at a positive lens behind a negative lens as shown in FIG. 2, the capability of the aspherical surface in regard to aberration correction is effective (the eighth embodiment of the present invention). These similarly apply to each of the following practical examples.

Next, compensation of a Petzval sum is described below.

Figure 3:
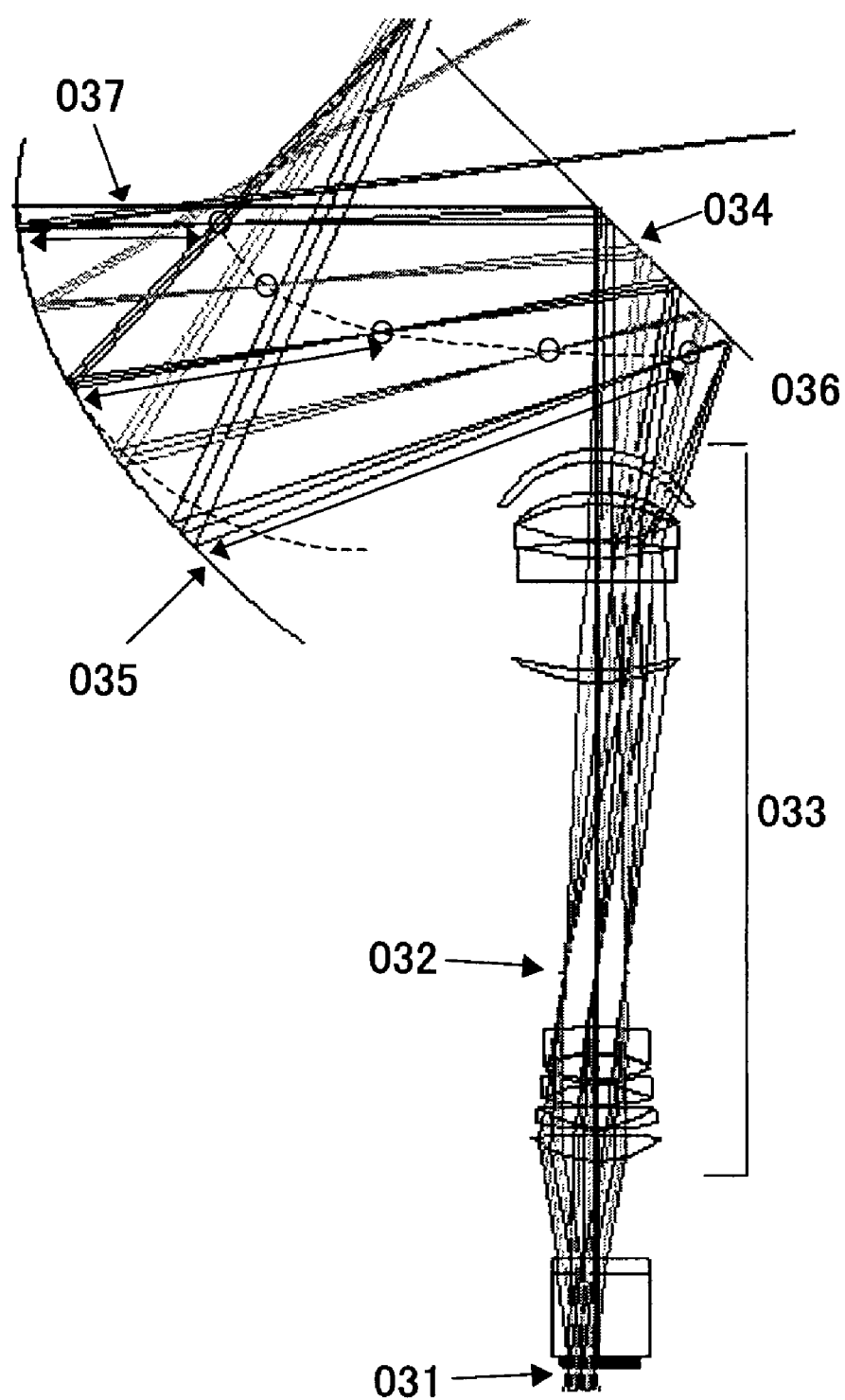
FIG. 3 is an enlarged view of the first optical system and second optical system of practical example 1.

FIG. 3 is an enlarged view of the first optical system and second optical system of practical example 1.

Light beams emitted from the first optical system 033, whose optical paths are folded by a folding mirror 034, are incident on the second optical system 035, and are enlarged and projected by a reflection mirror having a positive power in the second optical system. The light beams are generally converged and an intermediate image 036 of an image forming element 031 is formed between the first optical system 033 and the second optical system 035.

The distortion aberration of an image of an image forming element 031 which image is enlarged and projected onto a conjugate plane B by the positive power of the second optical system 035 generally increases in proportion to the cube of an incident angle of view. Similarly, the field curvature thereof is proportional to the square of an incident angle of view. That is, when light rays emitted from object points that are arrayed at equal spaces on the image forming element 031 form into images on the conjugate plane B by the projection optical system, the formed image points are not equally spaced and the degree of deviation increases with increasing the distance of the image point from the optical axis. In the subject optical system, when a curved surface in the second optical system is a spherical surface, the space between the image points on the projected image increases with increasing the angle of view of the light beam, that is, increasing the distance thereof from the optical axis, and the image curves to the side of object points. In order to correct the distortion aberration and field curvature caused by an enlarging projection system, as described above, the reflection mirror having a positive power in the second optical system 035 has a curved surface having a shape such that the positive power decreases with increasing the distance from the optical axis (the third embodiment of the present invention). Also, when the reflection mirror having a positive power in the second optical system 035 has a shape of anamorphic and polynomial free-from surface, the freedom of design may increase, and therefore, the capability of correction of aberration, including the above distortion aberration, may be improved (the fourth embodiment of the present invention). Additionally, although a concave reflective surface is used in the descriptions, it is not limited to the surface and may be a Fresnel reflection mirror or a hologram reflection mirror as long as it is a reflective optical element having a light-condensing power.

Additionally, "anamorphic and polynomial free-form surface" in the above descriptions is a shape represented by $$Z = X2 \cdot x^2 + Y2 \cdot y^2 + X2Y \cdot x^2 y + Y3 \cdot y^3 + X4 \cdot x^4 + X2Y2 \cdot x^2 y^2 + Y4 \cdot y^4 + X4Y \cdot x^4 y + X2Y3 \cdot x^2 y^3 + Y5 \cdot y^5 + X6 \cdot x6 + X4Y2 \cdot x^4 y^2 + X2Y4 \cdot x^2 y^4 + Y6 \cdot y^6 + \ldots \quad (1),$$

wherein minor axis directions and major axis directions on the projected image as a reference are Y-directions and X-directions, respectively, the depth of the curved surface is Z-directions, and "X2, Y2, X2Y, Y3, X2Y2, etc." are coefficients.

Furthermore, the positive power decreasing with increasing the distance from the optical axis means that the focal length increases with increasing the distance from the optical axis. Then, the intermediate image 036 conjugate to an enlarged image formed by the reflection mirror having a positive power in the second optical system 035 is tilted and curved such that the optical path length to the reflection mirror having a positive power in the second optical system 035 increases with increasing the distance of the light ray from the optical axis, since the focal length increases with increasing the distance from the optical axis (the tenth embodiment of the present invention).

Figure 33:
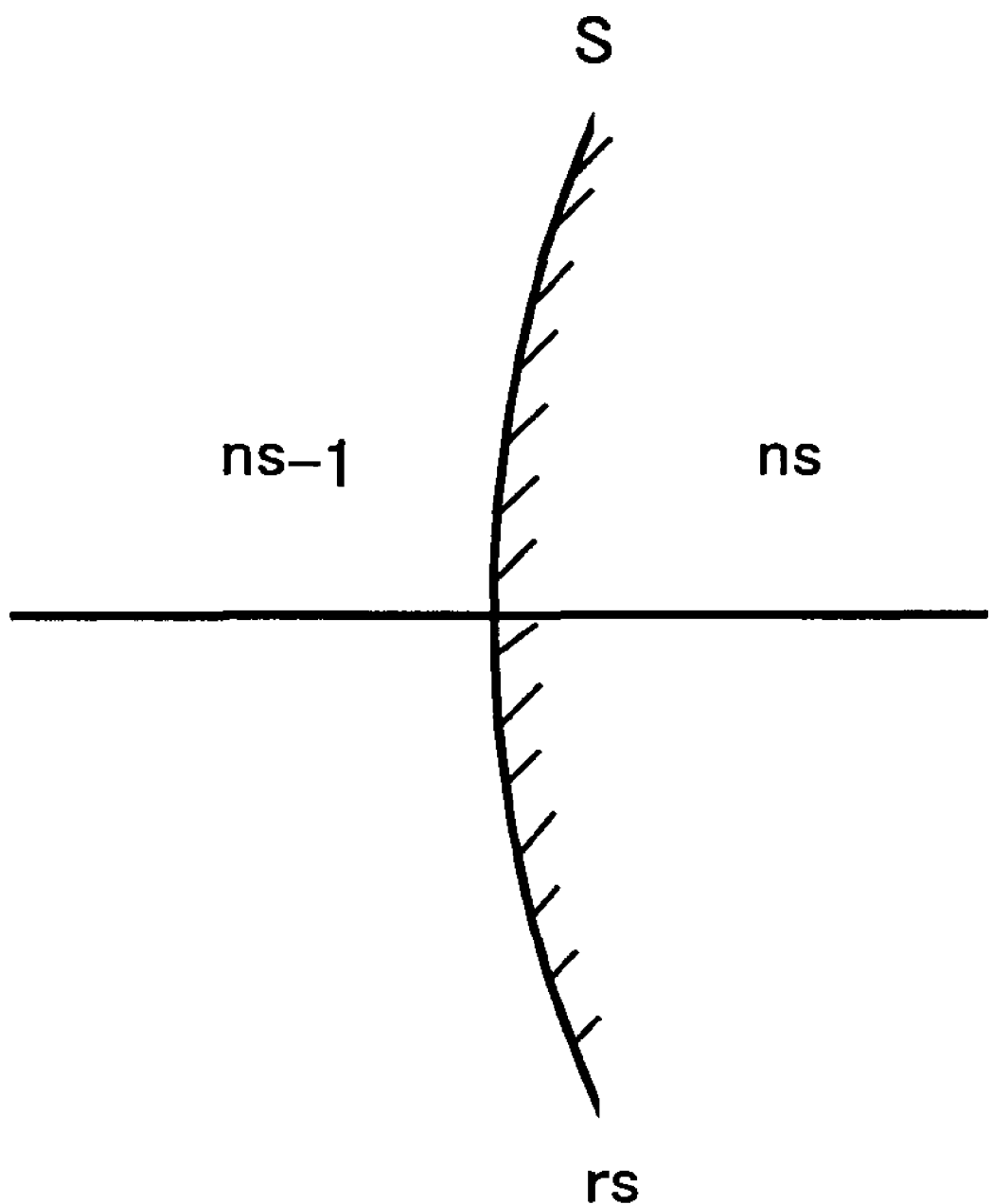
FIG. 33 is a diagram illustrating a Petzval sum.

Herein, the Petzval sum is described. A Petzval sum PTZ is represented by $$PTZ = \sum_{s=1}^{k} \left( \frac{1}{ns} - \frac{1}{ns-1} \right) \frac{1}{rs},$$

wherein ns and ns−1 are refractive indices at the side of image and the side of object with respect to a surface S, rs is a radius of curvature thereof, and the optical system is composed of k refractive surfaces, as shown in FIG. 33.

In general, a Petzval sum has a relation to a field curvature, and it is desired to make the Petzval sum approach to 0 in order to obtain a plane image with respect to a plane object, that is, to obtain an image with a small field curvature.

Herein, when this applies to this practical example, as described above, the reflection mirror having a positive power in the second optical system (the PTZ thereof has a positive value) has a curved surface with a shape such that the positive power thereof decreases with increasing the distance from the optical axis so as to reduce the field curvature on a screen, and the greater the distance of the light ray from the optical axis is, the intermediate image is more tilted and curved to the side of first optical system. In order to form such a tilted and curved intermediate image, it may be necessary to make the PTZ value of the first optical system which forms the intermediate image be negative and larger than the PTZ value of the whole of a usual optical system for projecting a plane object onto a plane image and purposely to incline an image plane toward the side of object (the fourteenth embodiment of the present invention).

As described above, the Petzval sum of the first optical system is configured to compensate for the Petzval sum component caused by the second optical system (the first embodiment of the present invention and the second embodiment of the present invention).

Also, these similarly apply to the following practical examples.

Furthermore, although 6, 2, and 3 lenses, (totally 11 lenses) are used for the first group 023, the second group 024, and the third group 025, respectively, in the first optical system in practical example 1 as shown in FIG. 2, the embodiments of the present invention are not limited to the above-mentioned number of lenses. Also, it is obvious that the spatial occupancy of the optical system may be reduced by arranging a reflection mirror between lenses so as to fold the optical path (the thirteenth embodiment of the present invention).

The specific data of practical example 1 are shown in Table 1.

In Table 1, "SHIFT" is the quantity of shift-decentering and "TILT" is the quantity of tilt-decentering. Herein, "DISPERSION" is expressed as an Abbe number and both it and "REFRACTIVE INDEX" are values at the d line. The units of the RADIUS OF CURVATURE, the SURFACE DISTANCE, and the quantity of shift-decentering are "mm" and the unit of the quantity of tilt-decentering is "degree(s)". These similarly apply to each of the following practical examples.

TABLE 1

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 0 | ∞ | | | | | | |
| 1 | ∞ | 43.6 | 1.517 | 64.2 | | | |
| 2 | ∞ | 40 | | | | | |

TABLE 1-continued

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 3 | 41 | 10.35 | 1.497 | 81.6 | 6.087 | | SPHERICAL SURFACE |
| 4 | −450.5 | 2.50 | | | | | SPHERICAL SURFACE |
| 5 | 114.5 | 1.00 | 1.786 | 44.2 | | | SPHERICAL SURFACE |
| 6 | 36.8 | 8.34 | 1.497 | 81.6 | | | SPHERICAL SURFACE |
| 7 | 1504.6 | 1.00 | | | | | SPHERICAL SURFACE |
| 8 | 98.0 | 8.26 | 1.497 | 81.6 | | | SPHERICAL SURFACE |
| 9 | −48.2 | 1.00 | 1.834 | 37.1 | | | SPHERICAL SURFACE |
| 10 | 73.7 | 1.00 | | | | | SPHERICAL SURFACE |
| 11 | 48.6 | 10.28 | 1.620 | 36.3 | | | SPHERICAL SURFACE |
| 12 | −47.4 | 1.00 | | | | | SPHERICAL SURFACE |
| 13 | −42.7 | 10.00 | 1.492 | 57.8 | | | SPHERICAL SURFACE |
| 14 | −142.7 | 22.70 | | | | | ASPHERICAL SURFACE |
| 15 STOP | ∞ | 117.63 | | | 0.652 | | |
| 16 | 65.6 | 5.12 | 1.773 | 49.6 | −0.652 | | SPHERICAL SURFACE |
| 17 | 115.0 | 35.93 | | | | | SPHERICAL SURFACE |
| 18 | −2652.3 | 10.00 | 1.497 | 81.6 | | | SPHERICAL SURFACE |
| 19 | 123.9 | 6.15 | | | | | SPHERICAL SURFACE |
| 20 | −201.0 | 1.00 | 1.667 | 48.2 | | | SPHERICAL SURFACE |
| 21 | 82.8 | 14.75 | | | | | SPHERICAL SURFACE |
| 22 | −82.4 | 5.00 | 1.492 | 57.8 | | | ASPHERICAL SURFACE |
| 23 | −57.9 | 12.52 | | | | | ASPHERICAL SURFACE |
| 24 | −44.3 | 5.00 | 1.717 | 29.5 | | | SPHERICAL SURFACE |
| 25 | −45.4 | 100.00 | | | | | SPHERICAL SURFACE |
| 26 | 5000.0 | −200.00 | REFLECTION | | | −45 | SPHERICAL SURFACE |
| 27 | ∞ | 530.00 | REFLECTION | | −94.593 | 34 | POLYNOMIAL FREE-FORM SURFACE |
| 28 | ∞ | 0.00 | | | | | |

The asphrical surfaces used for surfaces 14, 22 and 23 are rotationally symmetric aspherical surfaces but each may be rotationally asymmetric aspherical surface.

As known well, a rotationally symmetric aspherical surface is represented by a formula of aspherical surface:

$$Z = c \cdot r^2 / [1 + \sqrt{\{1 - (1+k)c^2 r^2\}}] + Ar^4 + Br^6 + Cr^8 \ldots,$$

wherein Z, c, r, and k are a depth in the directions of the optical axis, a paraxial radius of curvature, a distance from the optical axis in the direction orthogonal to the optical axis, and a conical coefficient, respectively, and A, B, C, . . . , etc., are higher-order coefficients of the aspherical surface. Herein, its shape is determined by providing the values of k, A, B, C, . . . etc. These similarly apply to other practical examples described below.

The coefficients of the aspherical surfaces in practical example 1 are provided in Table 2.

TABLE 2

| COEFFICIENT | 14 TH SURFACE | 22 TH SURFACE | 23 TH SURFACE |
|---|---|---|---|
| CONICAL COEFFICIENT: k | 0 | 0 | 0 |
| 4 TH ORDER COEFFICIENT: A | 4.12088E−06 | −3.40765E−07 | −7.30853E−08 |
| 6 TH ORDER COEFFICIENT: B | 2.01448E−09 | −3.20990E−09 | −2.68979E−09 |
| 8 TH ORDER COEFFICIENT: C | 1.44924E−12 | 1.06467E−12 | 4.63464E−13 |

The coefficients of the polynomial free-form surface in practical example 1 are provided in Table 3. The coefficients of the polynomial free-form surface correspond to those of formula (1) described above.

TABLE 3

| COEFFICIENT | COEFFICIENT VALUE |
|---|---|
| X2 | 2.97156.E−03 |
| Y2 | 1.75306.E−03 |
| X2Y | 1.03771.E−05 |
| Y3 | 4.56218.E−06 |
| X4 | 2.79059.E−09 |
| X2Y2 | 5.87011.E−08 |
| Y4 | 2.87829.E−08 |
| X4Y | −1.84772.E−11 |
| X2Y3 | 2.39223.E−10 |
| Y5 | 1.67000.E−10 |
| X6 | 1.48824.E−13 |
| X4Y2 | −1.57412.E−13 |
| X2Y4 | 7.39255.E−13 |
| Y6 | 5.38089.E−13 |

Figure 5:
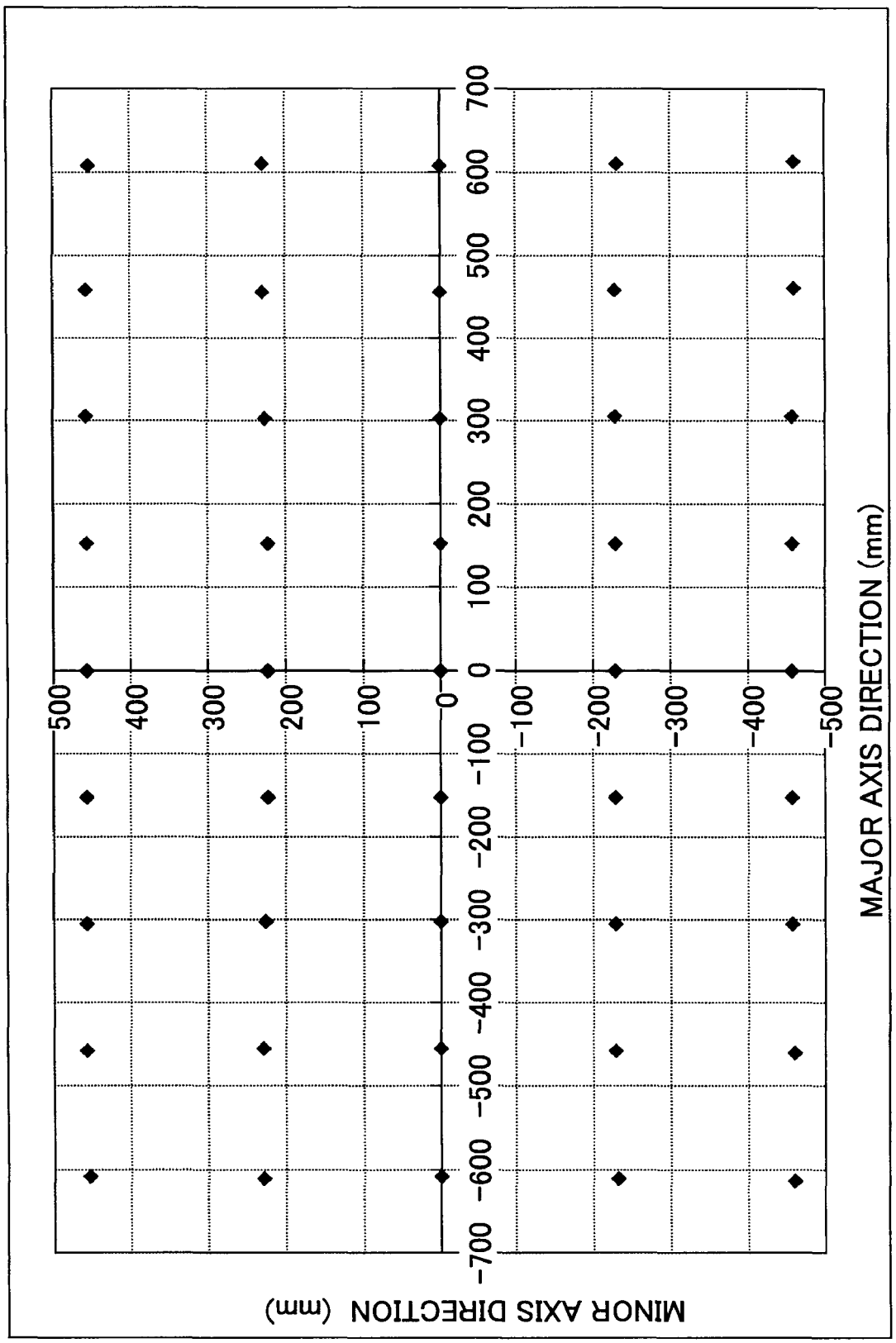
FIG. 5 is a diagram showing the distortion condition of an enlarged image on the last conjugate plane B in practical example 1.
Figure 6:
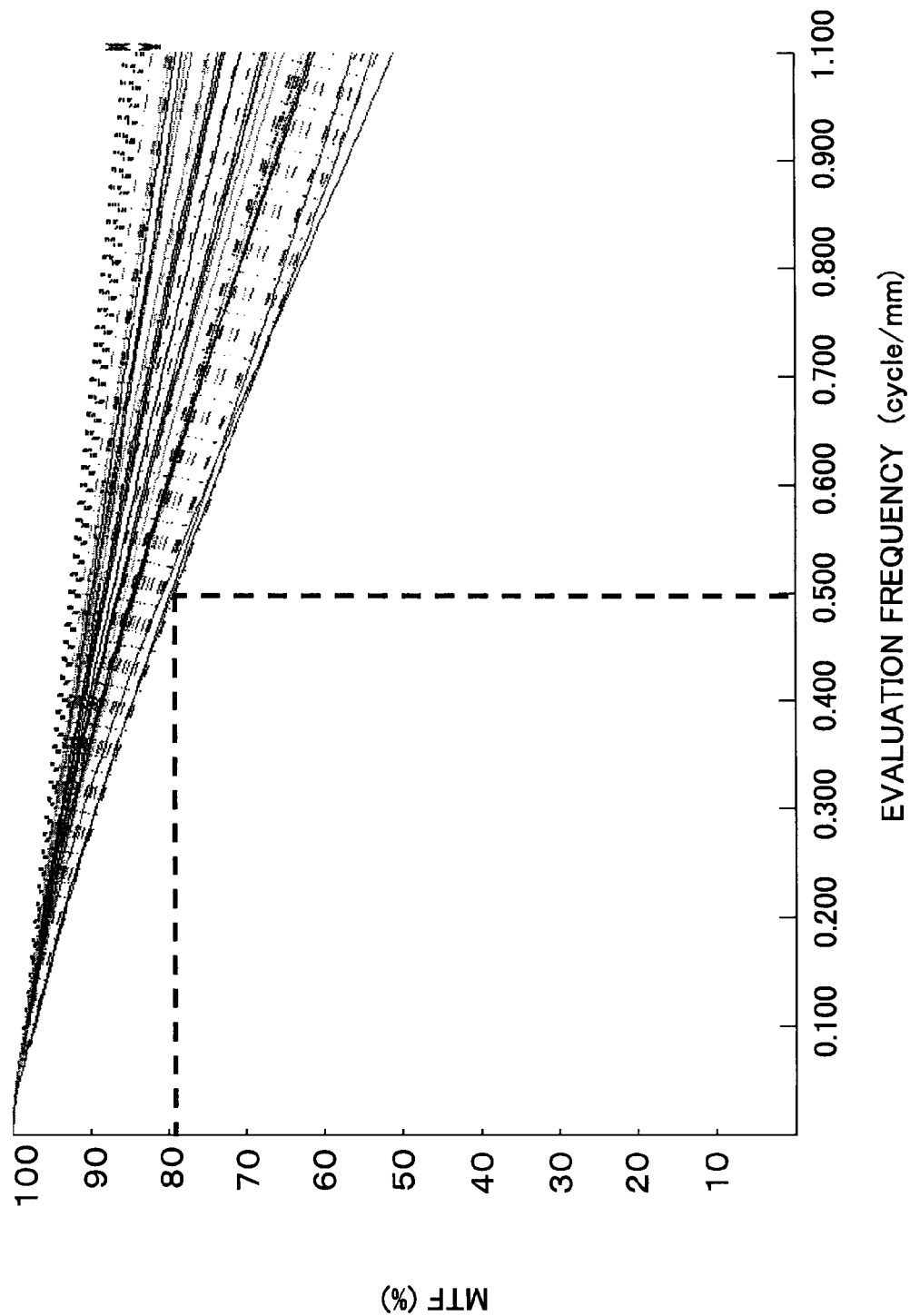
FIG. 6 is a diagram showing the resolution performance with respect to an enlarged image on the last conjugate plane B in practical example 1.

FIG. 5 shows the distortion condition of an enlarged image on the last conjugate plane B in practical example 1 and FIG. 6 shows the resolution performance with respect to the image. Both of them are the results where a panel with a diagonal size of 0.7 inches and a vertical to horizontal ratio of 3:4 is assumed as an image forming element. The enlargement ratio is approximately 85.7. It can be seen that grid images are formed in generally equal spaces as shown in FIG. 5 and the distortion is corrected well. Also, it can be seen that the MTF value at an evaluation frequency of 0.5 c/mm is 79% or greater as shown in FIG. 6 and the resolution performance is very high. Additionally, the F number of light emitted from the image forming element is F 2.8 and the thickness in the directions of the depth is 300 mm. Also, the lens having the largest diameter in the first optical system is a lens closest to the screen and the diameter is 80 mm.

Practical Example 2

Next, practical example 2 for another embodiment of the present invention is described below.

Figure 7:
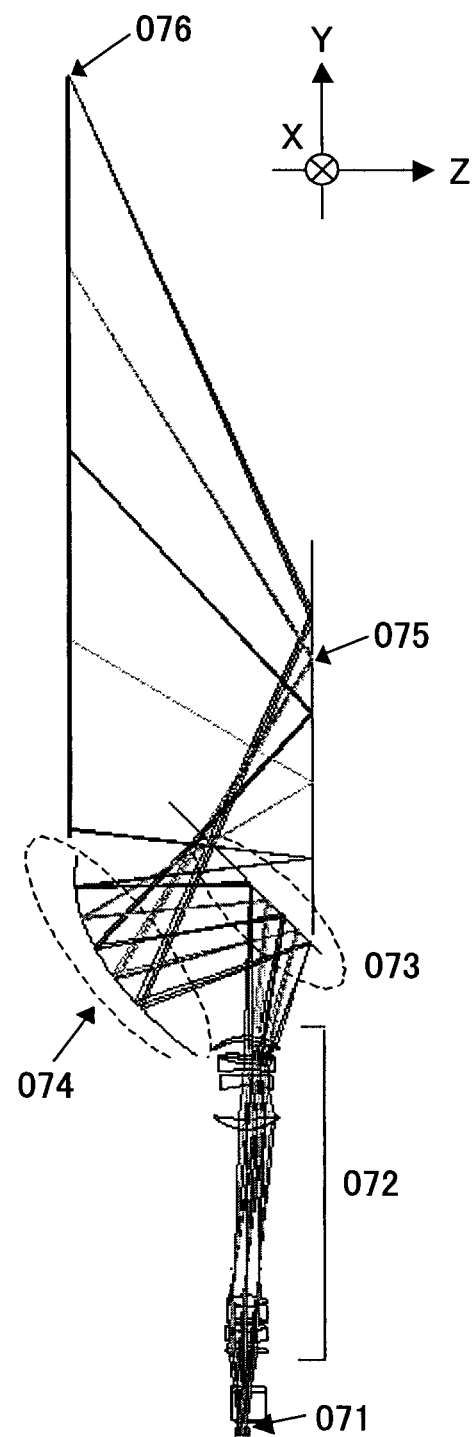
FIG. 7 is a diagram showing practical example 2 of the present invention.
Figure 8:
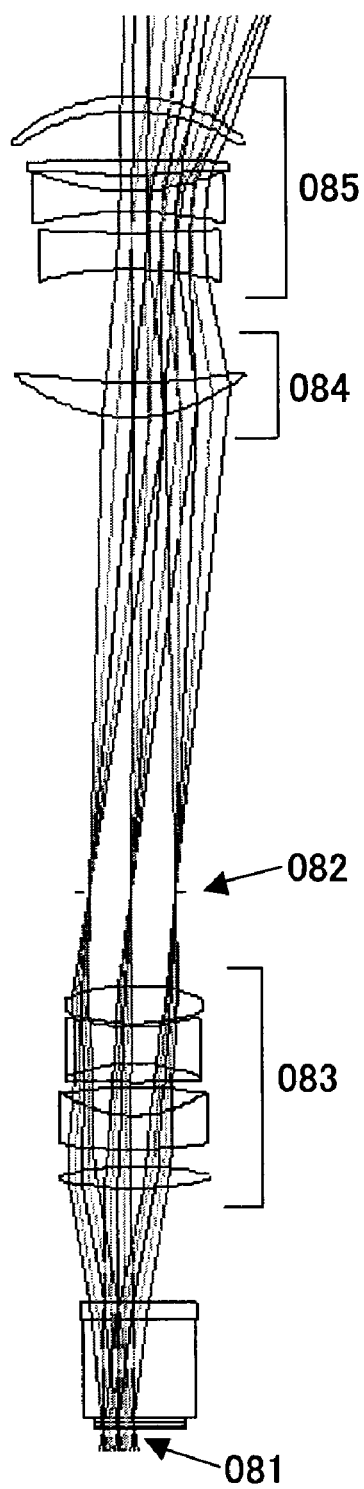
FIG. 8 is an enlarged view of the first optical system of practical example 2 of the present invention.

FIG. 7 shows practical example 2 of the present invention and FIG. 8 shows an enlarged view of a first optical system in practical example 2.

Similarly to practical example 1 of the present invention, a projection optical system is to project an image formed by an image forming element 071 on a conjugate plane A onto a screen 076 on a conjugate plane B, and is composed of a first optical system 072 that is a coaxial system and includes at least one refractive optical system and a second optical system 074, 075 that includes at least one reflective surface having a positive power, wherein the first optical system 072 and the second optical system 074, 075 are arranged from the image forming element 071, and an intermediate image between the first optical system 072 and the second optical system 074, 075 is once formed from the image formed from on the image forming element 071. It is an optical system for enlarging projection as a whole. Herein, when a reflection mirror 073 that is rotationally symmetric and has a negative power is arranged between the first optical system 072 and the second optical system 074, 075, the refractive power of a third group of the first optical system 071 may be reduced, and the spatial occupancy may be reduced since it may combine with a folding mirror. Also, in regard to the folding direction, the first optical system 072 is folded to the direction of the height of the conjugate plane B, that is, the Y-direction, in FIG. 7 but it is obvious that the first optical system 072 may be folded to, for example, the direction of the depth in the figure, that is, the X-direction, so as to further reduce the spatial occupancy of the optical system.

The specific data of practical example 2 are shown in Table 4.

TABLE 4

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 0 | ∞ | 0.00 | | | | | |
| 1 | ∞ | 43.60 | 1.517 | 64.2 | | | |
| 2 | ∞ | 40.00 | | | | | |
| 3 | 120.4 | 7.84 | 1.497 | 81.6 | 6.047 | | SPHERICAL SURFACE |
| 4 | −103.1 | 5.73 | | | | | SPHERICAL SURFACE |
| 5 | 146 | 11.70 | 1.786 | 44.2 | | | SPHERICAL SURFACE |
| 6 | 41.6 | 9.85 | 1.497 | 81.6 | | | SPHERICAL SURFACE |
| 7 | 150.4 | 1.65 | | | | | SPHERICAL SURFACE |
| 8 | 281.6 | 6.48 | 1.497 | 81.6 | | | SPHERICAL SURFACE |
| 9 | −59.9 | 13.00 | 1.834 | 37.1 | | | SPHERICAL SURFACE |
| 10 | 75.8 | 1.04 | | | | | SPHERICAL SURFACE |
| 11 | 70.9 | 13.00 | 1.620 | 36.3 | | | SPHERICAL SURFACE |
| 12 | −65.9 | 32.83 | | | | | SPHERICAL SURFACE |
| 13 STOP | ∞ | 165.75 | | | 0.749 | | |
| 14 | 60.4 | 12.36 | 1.591 | 64.1 | −0.749 | | SPHERICAL SURFACE |
| 15 | 232.6 | 39.20 | | | | | SPHERICAL SURFACE |
| 16 | −117.8 | 12.85 | 1.748 | 46.5 | | | SPHERICAL SURFACE |
| 17 | 617.3 | 7.21 | | | | | SPHERICAL SURFACE |
| 18 | −134.3 | 7.37 | 1.747 | 51.3 | | | SPHERICAL SURFACE |

TABLE 4-continued

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 19 | 81.2 | 5.48 | | | | | SPHERICAL SURFACE |
| 20 | 100.5 | 5.33 | 1.492 | 57.8 | | | ASPHERICAL SURFACE |
| 21 | 239.9 | 17.09 | | | | | ASPHERICAL SURFACE |
| 22 | −66.1 | 5.00 | 1.791 | 26.2 | | | SPHERICAL SURFACE |
| 23 | −60.0 | 190.00 | | | | | SPHERICAL SURFACE |
| 24 | 1000.0 | −160.00 | REFLECTION | | | −45 | SPHERICAL SURFACE |
| 25 | ∞ | 240.00 | REFLECTION | | −115.48 | 35.9 | POLYNOMIAL FREE-FORM SURFACE |
| 26 | ∞ | −290.00 | REFLECTION | | | | |
| 27 | ∞ | 0.00 | | | | | |

The coefficients of the aspherical surfaces in practical example 2 are provided in Table 5.

TABLE 5

| COEFFICIENT | 20 TH SURFACE | 21 TH SURFACE |
|---|---|---|
| CONICAL COEFFICIENT: k | 0 | 0 |
| 4 TH ORDER COEFFICIENT: A | −3.60680E−06 | −2.76455E−06 |
| 6 TH ORDER COEFFICIENT: B | −7.27350E−10 | −1.02629E−09 |
| 8 TH ORDER COEFFICIENT: C | 1.00351E−12 | 9.17691E−13 |

The coefficients of the polynomial free-form surface in practical example 2 are provided in Table 6. The coefficients of the polynomial free-form surface correspond to those of formula (1) described above.

TABLE 6

| COEFFICIENT | COEFFICIENT VALUE |
|---|---|
| X2 | 2.54164.E−03 |
| Y2 | 1.47203.E−03 |
| X2Y | 7.24107.E−06 |
| Y3 | 2.89309.E−06 |
| X4 | 2.96578.E−09 |
| X2Y2 | 3.76036.E−08 |
| Y4 | 1.43611.E−08 |
| X4Y | 9.34107.E−12 |
| X2Y3 | 1.67235.E−10 |
| Y5 | 9.46304.E−11 |
| X6 | 8.80991.E−14 |
| X4Y2 | −1.71084.E−14 |
| X2Y4 | 5.48160.E−13 |
| Y6 | 3.84113.E−13 |

Figure 9:
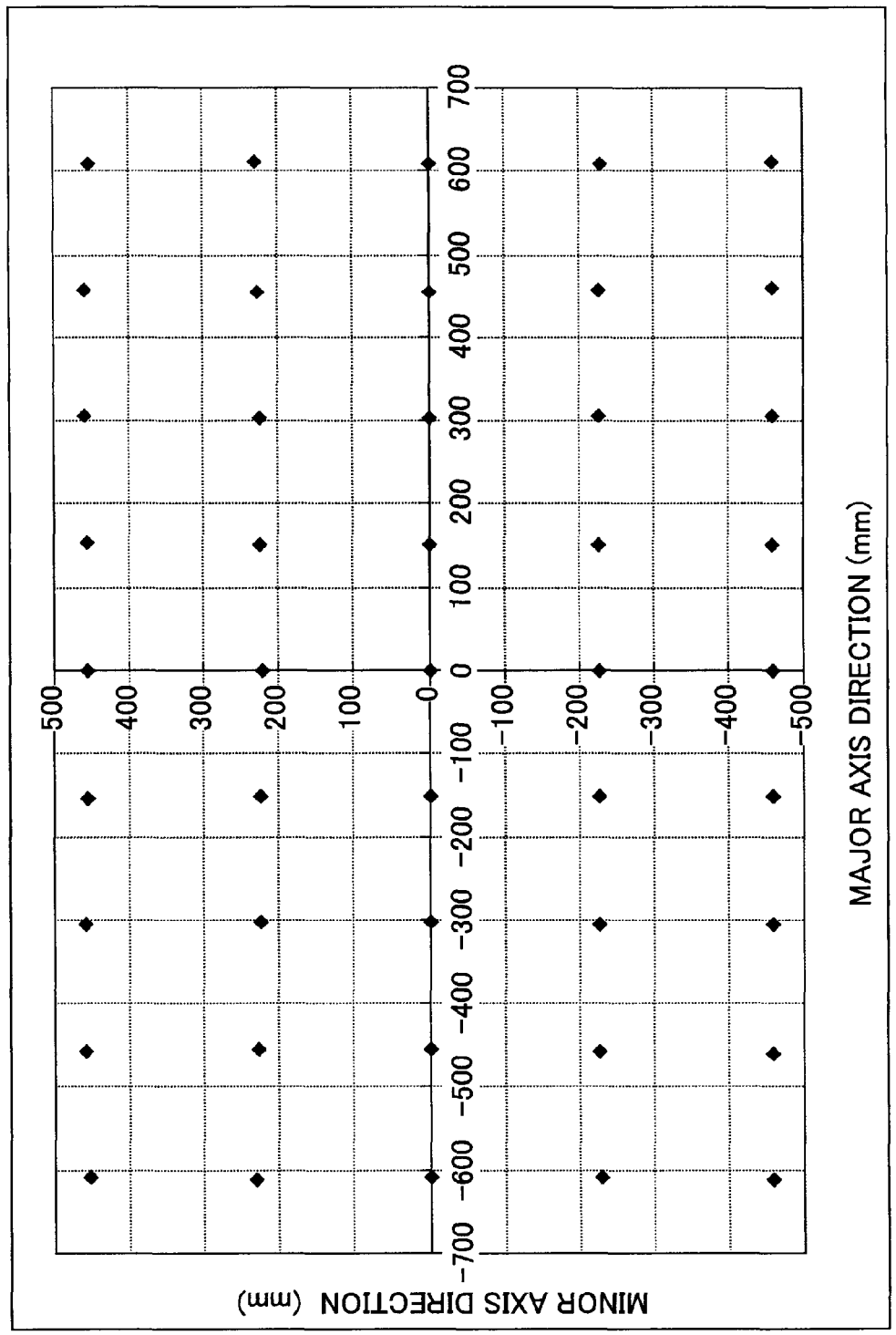
FIG. 9 is a diagram showing the distortion condition of an enlarged image on the last conjugate plane B in practical example 2.
Figure 10:
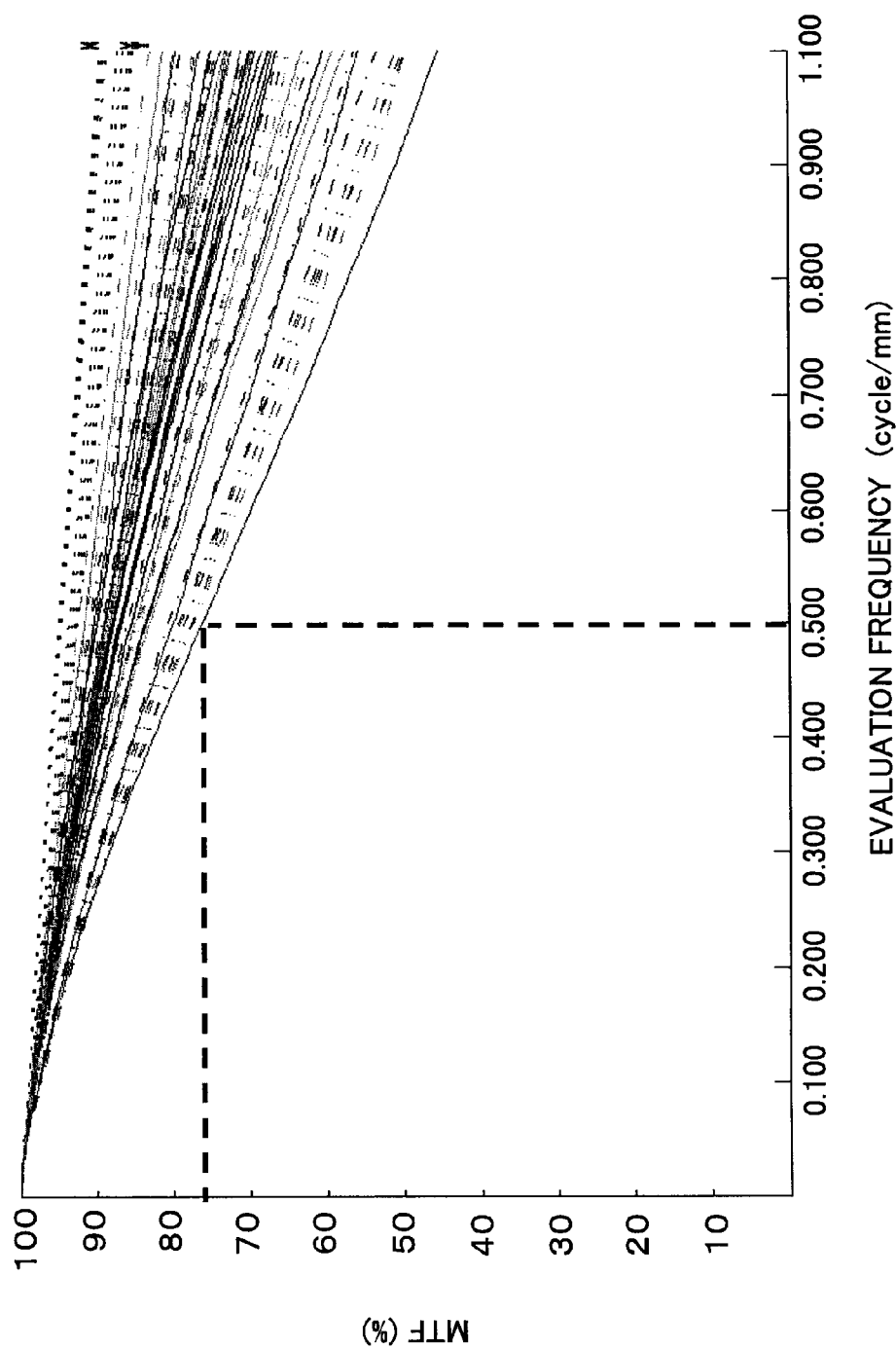
FIG. 10 is a diagram showing the resolution performance with respect to an enlarged image on the last conjugate plane B in practical example 2.

FIG. 9 shows the distortion condition of an enlarged image on the last conjugate plane B in practical example 2 and FIG. 10 shows the resolution performance with respect to the image.

Both of them are the results where a panel with a diagonal size of 0.7 inches and a vertical to horizontal ratio of 3:4 is assumed as an image forming element. The enlargement ratio is approximately 85.7. It can be seen that grid images are formed in generally equal spaces as shown in FIG. 8 and the distortion is corrected well. Also, it can be seen that the MTF value at an evaluation frequency of 0.5 c/mm is 75% or greater as shown in FIG. 9 and the resolution performance is good but is lower than that of practical example 1. It is considered that this is because the configuration of practical example 2 is such that one lens (aspherical lens) is removed from practical example 1, as described above, and therefore, the freedom of design is lowered. Additionally, the F number of light emitted from the image forming element is F 2.8 and the thickness in the directions of the depth is 300 mm. Also, the lens having the largest diameter in the first optical system is a lens closest to the screen and the diameter is 80 mm.

Practical Example 3

Next, practical example 3 for another embodiment of the present invention is described below.

Figure 13:
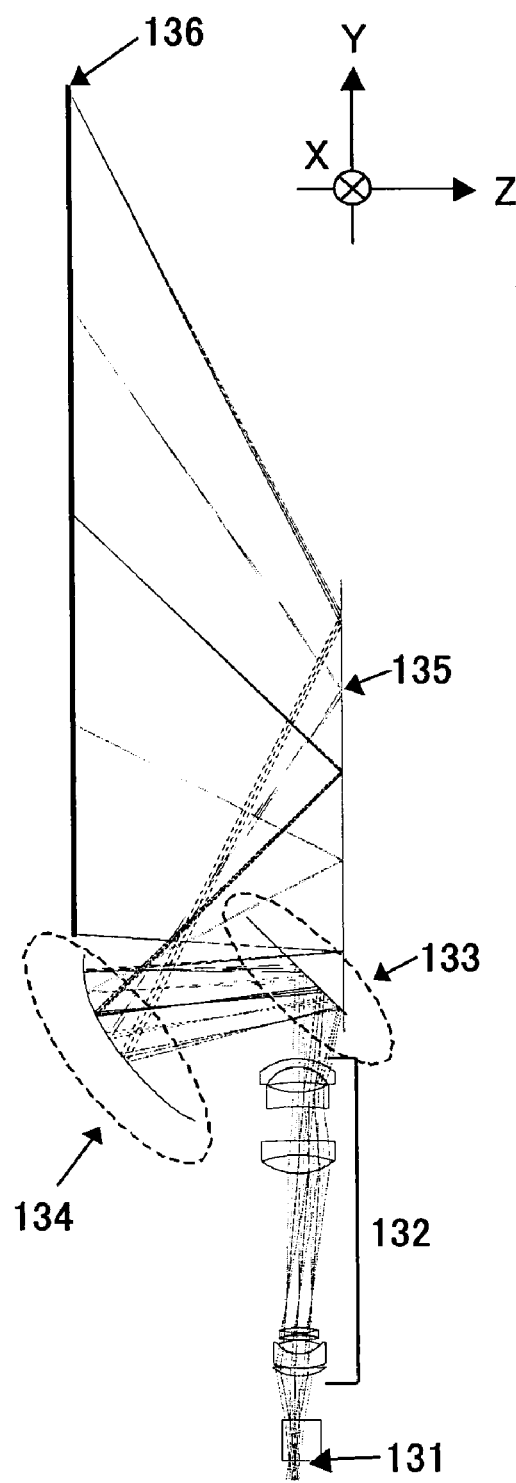
FIG. 13 is a diagram showing practical example 3 of the present invention.
Figure 14:
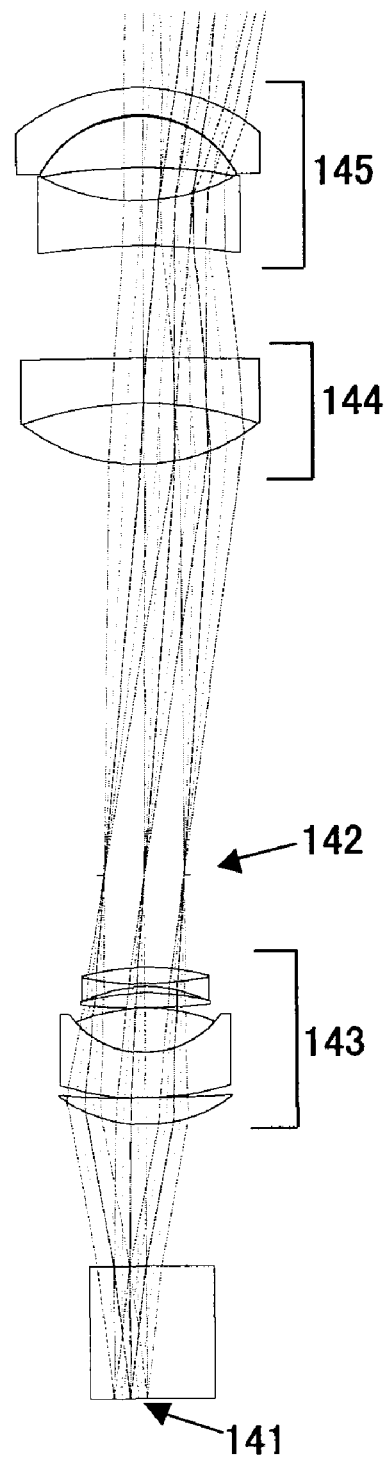
FIG. 14 is an enlarged view of the first optical system of practical example 3 of the present invention.

FIG. 13 shows practical example 3 of the present invention and FIG. 14 shows an enlarged view of a first optical system in practical example 3.

Similarly to practical example 2, 6, 2, and 3 lenses, (totally 11 lenses) are used for the first group 143, the second group 144, and the third group 145, respectively, for a first optical system 132 in the optical system according to an embodiment of the present invention. Similarly to practical example 1, it is obvious that the embodiment of the present invention does not depend on the number of a lens(es) and the spatial occupancy of the optical system may be reduced by arranging a reflection mirror 133 so as to fold the optical path.

Also, similarly to practical example 1, although in regard to the direction of folding of the optical path of the second optical system 134, 135, the first optical system 132 is folded to the direction of the height of the conjugate plane B, that is, the Y-direction, in FIG. 13, it is obvious that the spatial occupancy of the optical system may be reduced, for example, by folding the first optical system 132 to the direction of the depth in FIG. 1, that is, the X-direction. These similarly apply to other examples.

Also, in the example, when the Petzval sum PTZ of the first optical system 132 satisfies $$PTZ < -0.0115 \quad (2),$$

the size (surface area) of a reflection mirror 134 having a positive refractive power in the second optical system 134, 135 may be reduced (the fourteenth embodiment of the present invention).

In regard to this matter, the field curvature caused by the angle of view increases with increasing the magnification with respect to the reflection mirror 134 having a positive refractive power, and in order to reduce it, if the size of the image is constant, it has been required to enlarge the intermediate image (an object for the reflection mirror 134 having a positive refractive power) and to reduce the magnification of the reflection mirror 134 having a positive refractive power. However, when the Petzval sum of the first optical system 132 is set to negative and large value as indicated in conditional formula (2), the field curvature of the image formed by the first optical system 132, that is, the intermediate image, may be greatly curved toward the side of object so that the field curvature caused by the reflection mirror 134 having a positive refractive power may be canceled. Therefore, the magnification of the reflection mirror 134 having a positive refractive power may be increased. Then, the size of the intermediate image may be reduced, and accordingly, the reflection mirror 134 having a positive refractive power, itself, may be reduced. Also, the Petzval sum of the first optical system 132 and the size of the reflection mirror 134 having a positive refractive power of the second optical system 134, 135, in each of the practical examples in Table 22.

Figure 34:
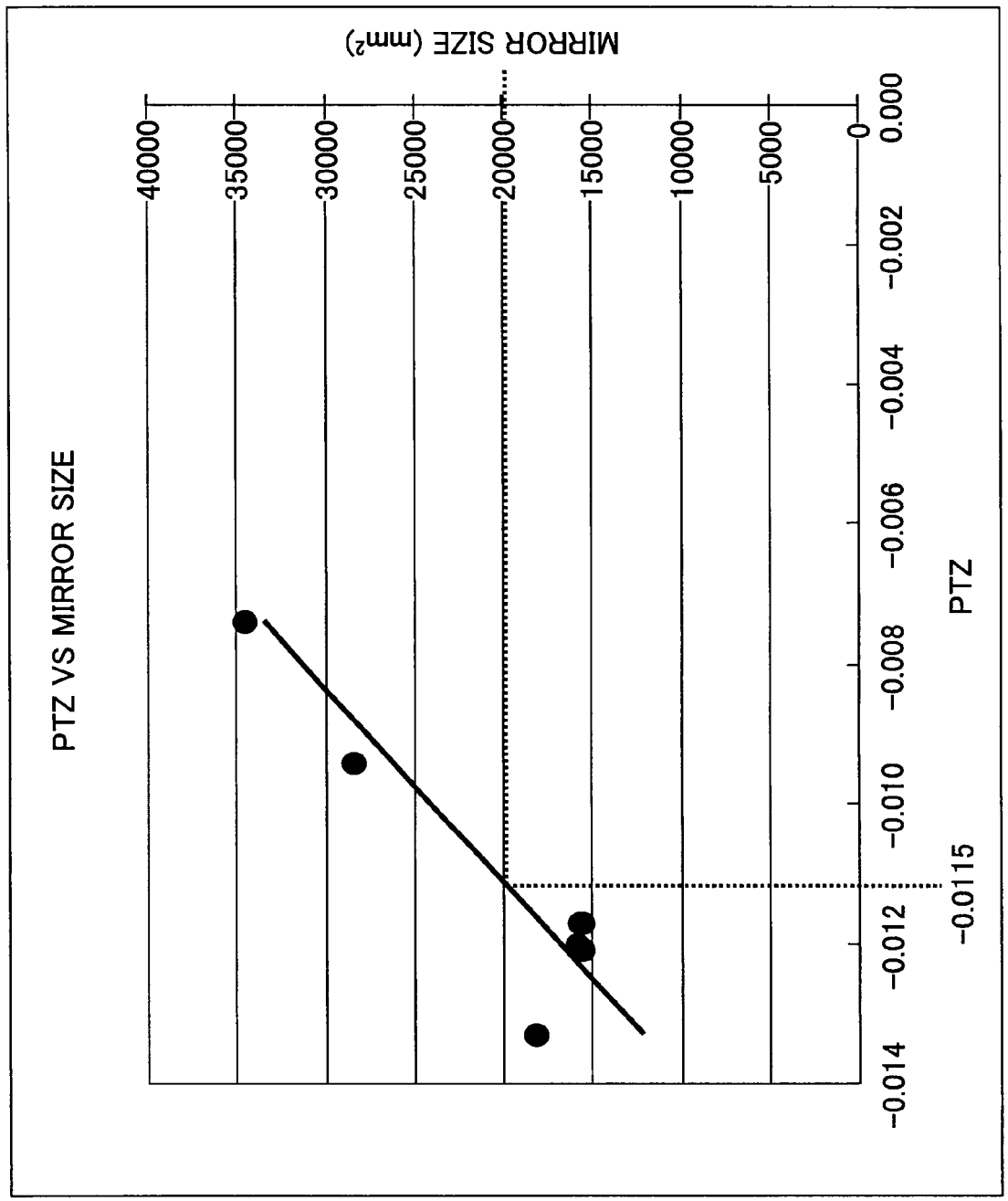
FIG. 34 is a diagram showing the relationship between a Petzval sum and a reflection mirror size.

From Table 22, it can be seen that there is a relationship between the Petzval sum and the reflection mirror size, as shown in FIG. 34.

Herein, when an anamorphic and polynomial free-form surface is particularly used for the reflection mirror having a positive refractive power, generally if the mirror size is greater than 20,000 mm$^2$, a large deformation of the mirror may be caused by a temperature change so that the image projection performance is greatly affected. Also, the production may be difficult so as to lead to cost increase. Therefore, it may be desirable that the Petzval sum be equal to or less than −0.0115 as indicated by conditional formula (2) derived from FIG. 34. Furthermore, in order to satisfy conditional formula (2), it is desirable that $n_{AVE}<1.557$ and $\nu_{AVE}>1.749$ be satisfied from the viewpoint of the balance between the generation and cancellation of each aberration in the entire optical system, wherein $n_{AVE}$ is the average of refractive indices of lenses having a positive power at the d

TABLE 22

| | REFRACTIVE INDEX | | | | | | | | | | | |
|---|---|---|---|---|---|---|---|---|---|---|---|---|
| | L1 | L2 | L3 | L4 | L5 | L6 | L7 | L8 | L9 | L10 | L11 | L12 |
| PRACTICAL EXAMPLE 1 | 1.497 | 1.786 | 1.497 | 1.497 | 1.834 | 1.620 | 1.492 | 1.773 | 1.497 | 1.667 | 1.492 | 1.717 |
| PRACTICAL EXAMPLE 2 | 1.497 | 1.786 | 1.497 | 1.497 | 1.834 | 1.620 | 1.589 | 1.744 | 1.743 | 1.492 | 1.785 | |
| PRACTICAL EXAMPLE 3 | 1.497 | 1.729 | 1.497 | 1.497 | 1.835 | 1.599 | 1.529 | 1.835 | 1.729 | 1.492 | 1.618 | |
| PRACTICAL EXAMPLE 4 | 1.497 | 1.796 | 1.497 | 1.835 | 1.609 | 1.524 | 1.835 | 1.729 | 1.492 | 1.618 | | |
| PRACTICAL EXAMPLE 5 | 1.497 | 1.835 | 1.497 | 1.835 | 1.677 | 1.531 | 1.835 | 1.729 | 1.492 | | | |
| PRACTICAL EXAMPLE 6 | 1.497 | 1.835 | 1.497 | 1.835 | 1.669 | 1.525 | 1.835 | 1.729 | 1.492 | | | |
| PRACTICAL EXAMPLE 7 | 1.497 | 1.835 | 1.497 | 1.835 | 1.693 | 1.523 | 1.835 | 1.729 | 1.492 | | | |
| PRACTICAL EXAMPLE 8 | 1.487 | 1.487 | 1.789 | 1.487 | 1.820 | 1.497 | 1.739 | 1.785 | 1.742 | 1.543 | 1.835 | 1.523 |

| | REFRACTIVE INDEX | | | | MIRROR | |
|---|---|---|---|---|---|---|
| | L13 | L14 | n AVE | ν AVE | PTZ | SIZE (mm$^2$) | SCREEN SIZE |
| PRACTICAL EXAMPLE 1 | | | 1.585 | 1.655 | −0.0094 | 171.9 × 164.4 = 28260.36 | 60 inch |
| PRACTICAL EXAMPLE 2 | | | 1.568 | 1.777 | −0.0074 | 191.0 × 180.4 = 34456.40 | |
| PRACTICAL EXAMPLE 3 | | | 1.518 | 1.749 | −0.0120 | 130.8 × 120.8 = 15800.64 | |
| PRACTICAL EXAMPLE 4 | | | 1.524 | 1.763 | −0.0121 | 129.1 × 119.6 = 15440.36 | |
| PRACTICAL EXAMPLE 5 | | | 1.539 | 1.809 | −0.0117 | 130.1 × 120.2 = 15638.02 | |
| PRACTICAL EXAMPLE 6 | | | 1.536 | 1.809 | −0.0117 | 130.4 × 119.2 = 15543.68 | 54 inch |
| PRACTICAL EXAMPLE 7 | | | 1.540 | 1.809 | −0.0117 | 131.2 × 118.4 = 15534.08 | 48 inch |
| PRACTICAL EXAMPLE 8 | 1.835 | 1.578 | 1.557 | 1.750 | −0.0133 | 178.4 × 101.2 = 18054.08 | 60 inch | line in the first optical system and 凹AVE is the average of refractive indices of lenses having a negative power at the d line (see Table 22). Also, since the minimum of the refractive indices of optical glasses at the d line which are commonly used for lenses is 1.457 (FCD 10 produced by HOYA corporation) and the maximum thereof is 1.923 (E-FDS1 produced by HOYA Corporation), it may be obvious that the above-mentioned condition of the refractive indices are $1.457 < 凸AVE < 1.557$ and $1.749 < 凹AVE < 1.923$.

The specific data of practical example 3 are shown in Table 7.

TABLE 7

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 0 | ∞ | 0.00 | | | | | |
| 1 | ∞ | 43.60 | 1.517 | 64.2 | | | |
| 2 | ∞ | 47.00 | | | | | |
| 3 | 46.9 | 8.79 | 1.497 | 81.6 | 1.449 | | SPHERICAL SURFACE |
| 4 | 373.2 | 0.10 | | | | | SPHERICAL SURFACE |
| 5 | 93.2 | 15.00 | 1.729 | 54.7 | | | SPHERICAL SURFACE |
| 6 | 30.6 | 14.61 | 1.497 | 81.6 | | | SPHERICAL SURFACE |
| 7 | −61.6 | 0.10 | | | | | SPHERICAL SURFACE |
| 8 | 193.5 | 4.97 | 1.497 | 81.6 | | | SPHERICAL SURFACE |
| 9 | −83.1 | 2.15 | | | | | SPHERICAL SURFACE |
| 10 | −45.9 | 1.00 | 1.835 | 43.0 | | | SPHERICAL SURFACE |
| 11 | 101.5 | 5.31 | 1.599 | 37.9 | | | SPHERICAL SURFACE |
| 12 | −82.1 | 30.51 | | | | | SPHERICAL SURFACE |
| 13 STOP | ∞ | 135.76 | | | −0.050 | | |
| 14 | 62.3 | 20.04 | 1.529 | 51.9 | 0.050 | | SPHERICAL SURFACE |
| 15 | −112.4 | 15.00 | 1.835 | 43.0 | | | SPHERICAL SURFACE |
| 16 | −2457.7 | 37.29 | | | | | SPHERICAL SURFACE |
| 17 | −208.5 | 15.00 | 1.729 | 54.7 | | | SPHERICAL SURFACE |
| 18 | 67.1 | 10.66 | | | | | SPHERICAL SURFACE |
| 19 | −226.9 | 16.78 | 1.492 | 57.8 | | | ASPHERICAL SURFACE |
| 20 | −39.1 | 0.65 | | | | | ASPHERICAL SURFACE |
| 21 | −36.4 | 8.97 | 1.618 | 63.4 | | | SPHERICAL SURFACE |
| 22 | −60.9 | 100.00 | | | | | SPHERICAL SURFACE |
| 23 | ∞ | −189.84 | REFLECTION | | | −45.0 | SPHERICAL SURFACE |
| 24 | ∞ | 240.00 | REFLECTION | | −93.330 | 36.9 | POLYNOMIAL FREE-FORM SURFACE |
| 25 | ∞ | −290.00 | REFLECTION | | | | |
| 26 | ∞ | 0.00 | | | | | |

The coefficients of the aspherical surfaces in practical example 3 are provided in Table 8.

TABLE 8

| COEFFICIENT | 19 TH SURFACE | 20 TH SURFACE |
|---|---|---|
| CONICAL COEFFICIENT: k | 0 | 0 |
| 4 TH ORDER COEFFICIENT: A | 1.51935E−07 | −2.55202E−07 |
| 6 TH ORDER COEFFICIENT: B | −2.04559E−09 | −1.36984E−09 |
| 8 TH ORDER COEFFICIENT: C | 1.29719E−12 | −2.00320E−13 |

The coefficients of the polynomial free-form surface in practical example 3 are provided in Table 9. The coefficients of the polynomial free-form surface correspond to those of formula (1) described above.

TABLE 9

| COEFFICIENT | COEFFICIENT VALUE |
|---|---|
| X2 | 3.27288.E−03 |
| Y2 | 1.56932.E−03 |

TABLE 9-continued

| COEFFICIENT | COEFFICIENT VALUE |
|---|---|
| X2Y | 1.45711.E−05 |
| Y3 | 5.08354.E−06 |
| X4 | 1.83380.E−12 |
| X2Y2 | 9.37101.E−08 |
| Y4 | 2.34062.E−08 |
| X4Y | −4.46511.E−11 |
| X2Y3 | 5.02446.E−10 |

TABLE 9-continued

| COEFFICIENT | COEFFICIENT VALUE |
|---|---|
| Y5 | 4.88622.E−11 |
| X6 | 5.23289.E−13 |
| X4Y2 | −1.69247.E−12 |
| X2Y4 | 3.84128.E−12 |
| Y6 | 3.88578.E−12 |

Figure 15:
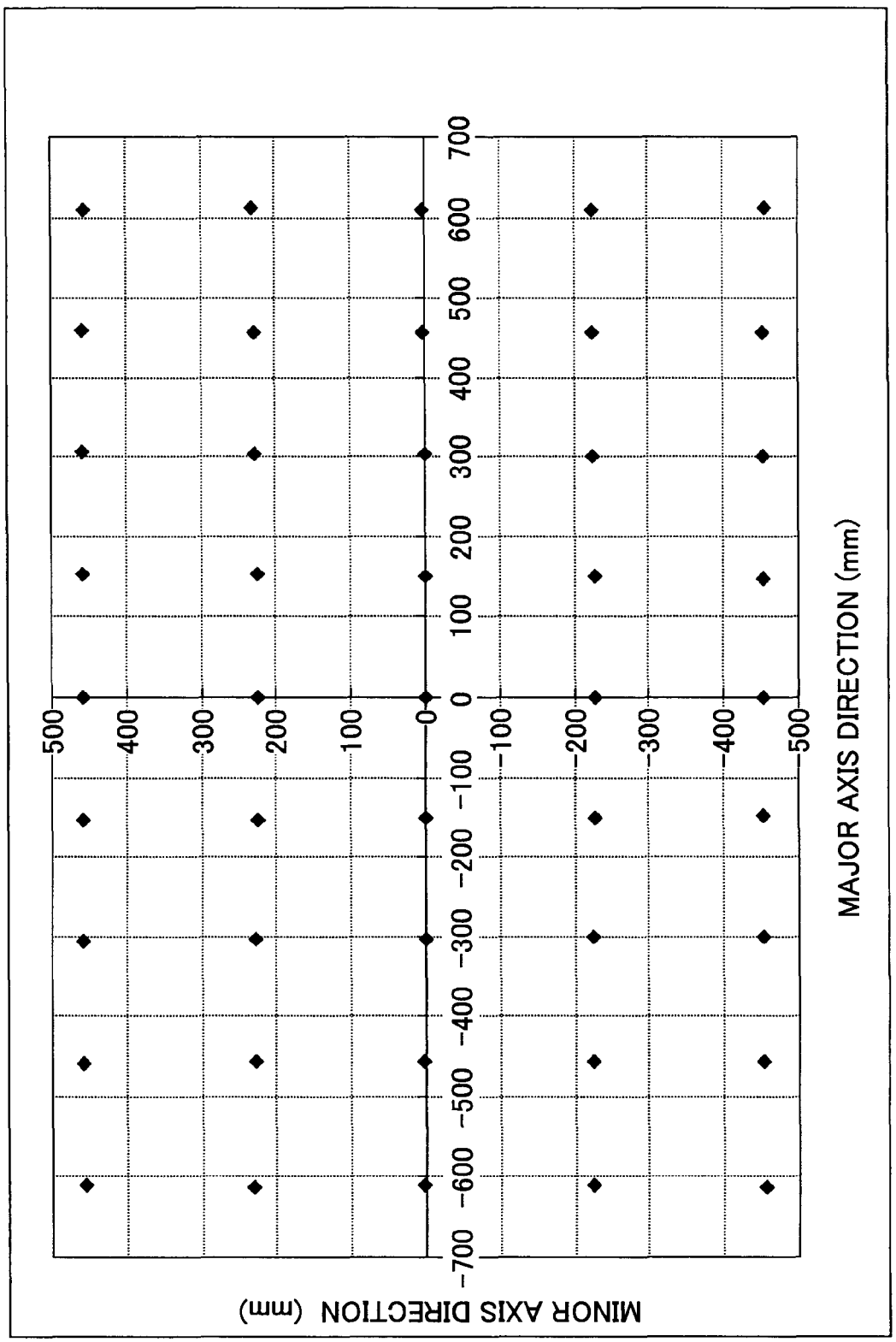
FIG. 15 is a diagram showing the distortion condition of an enlarged image on the last conjugate plane B in practical example 3.
Figure 16:
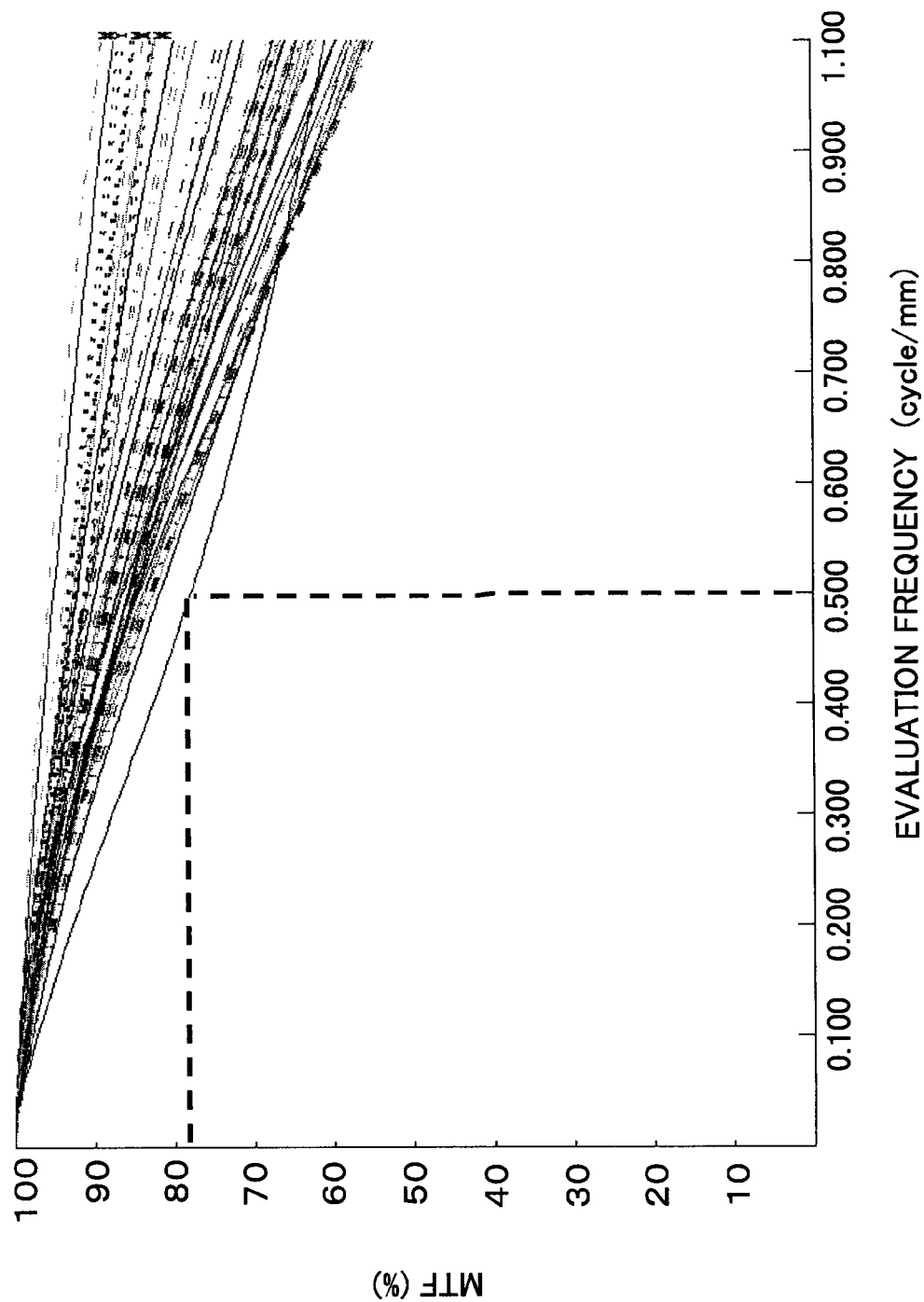
FIG. 16 is a diagram showing the resolution performance with respect to an enlarged image on the last conjugate plane B in practical example 3.

FIG. 15 shows the distortion condition of an enlarged image on the last conjugate plane B in practical example 3 and FIG. 16 shows the resolution performance with respect to the image.

Both of them are the results where a panel with a diagonal size of 0.7 inches and a vertical to horizontal ratio of 3:4 is assumed as an image forming element. The enlargement ratio is approximately 85.7. It can be seen that grid images are formed in generally equal spaces as shown in FIG. 15 and the distortion is corrected well. Also, it can be seen that the MTF value at an evaluation frequency of 0.5 c/mm is 77% or greater as shown in FIG. 16 and the resolution performance is good. Additionally, the F number of light emitted from the image forming element is F 2.8 and the thickness in the directions of the depth is 300 mm. Also, the lens having the largest diameter in the first optical system is a lens closest to the screen and the diameter is 80 mm. Also, in regard to the size of the reflection mirror having a positive refractive power in the second optical system, the product of the maximum length in the minor axis directions and the maximum length in the major axis directions is 130.8 mm×120.8 mm.

Practical Example 4

Next, practical example 4 for another embodiment of the present invention is described below.

Figure 17:
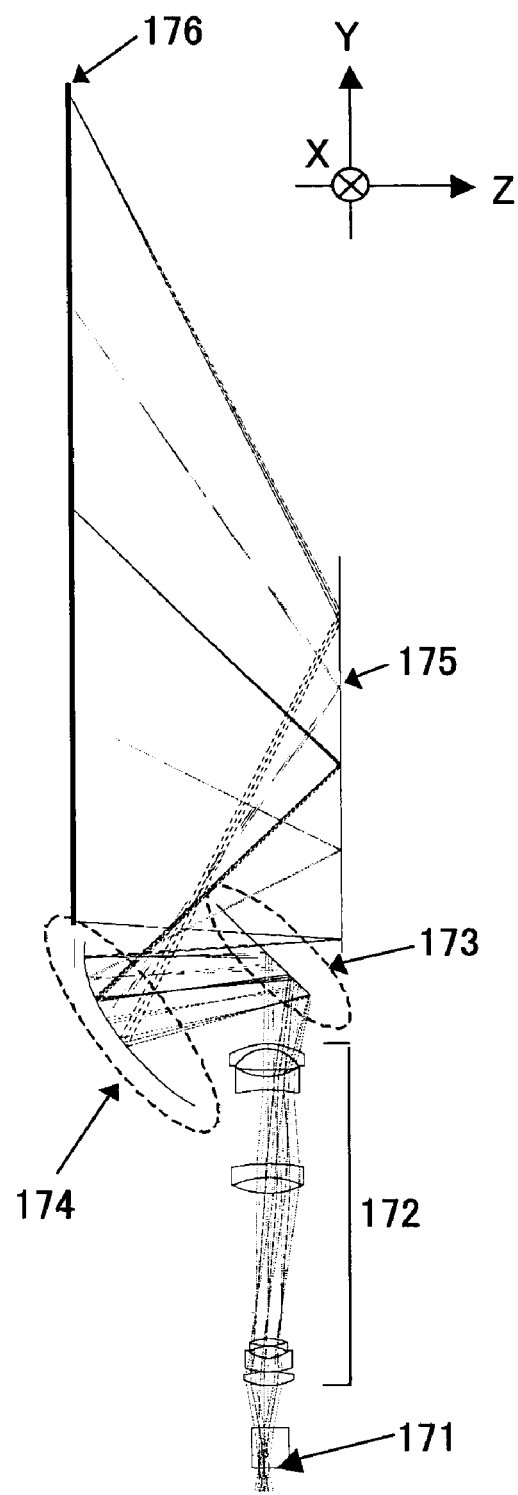
FIG. 17 is a diagram showing practical example 4 of the present invention.
Figure 18:
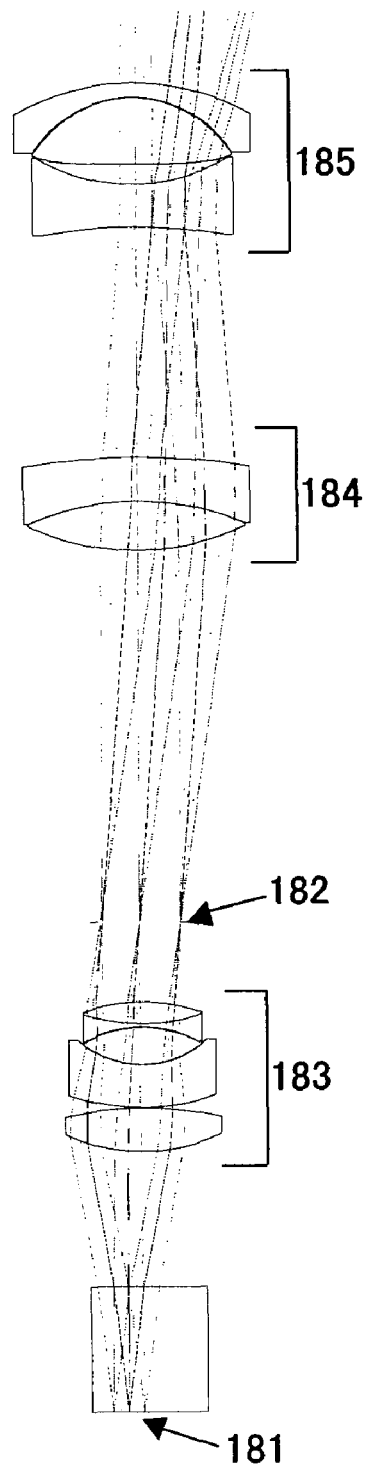
FIG. 18 is an enlarged view of the first optical system of practical example 4 of the present invention.

FIG. 17 shows practical example 4 of the present invention and FIG. 18 shows an enlarged view of a first optical system in practical example 4.

Similarly to practical example 3, 5, 2, and 3 lenses, (totally 10 lenses) are used for the first group 183, the second group 184, and the third group 185, respectively, for a first optical system 172 in the optical system according to an embodiment of the present invention and one lens is removed from practical example 3 so as to provide a cost reduction system. However, similarly to practical example 1, it is obvious that the embodiment of the present invention does not depend on the number of a lens(es) and the spatial occupancy of the optical system may be reduced by arranging a reflection mirror 173 so as to fold the optical path.

Also, since this practical example satisfies the above-mentioned conditional formula (2), the size of the reflection mirror 174 having a positive refractive power may be reduced.

The specific data of practical example 4 are shown in Table 10.

TABLE 10

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 0 | ∞ | 0.00 | | | | | |
| 1 | ∞ | 43.60 | 1.517 | 64.2 | | | |
| 2 | ∞ | 47.00 | | | | | |
| 3 | 60.7 | 15.00 | 1.497 | 81.6 | 1.510 | | SPHERICAL SURFACE |
| 4 | −115.0 | 0.10 | | | | | SPHERICAL SURFACE |
| 5 | 74.7 | 15.00 | 1.796 | 46.4 | | | SPHERICAL SURFACE |
| 6 | 32.3 | 12.95 | 1.497 | 81.6 | | | SPHERICAL SURFACE |
| 7 | −39.8 | 0.29 | | | | | SPHERICAL SURFACE |
| 8 | −38.6 | 1.00 | 1.835 | 43.0 | | | SPHERICAL SURFACE |
| 9 | 61.5 | 7.54 | 1.609 | 38.4 | | | SPHERICAL SURFACE |
| 10 | −59.4 | 27.88 | | | | | SPHERICAL SURFACE |
| 11 STOP | ∞ | 129.81 | | | 0.643 | | |
| 12 | 87.1 | 17.01 | 1.524 | 53.6 | −0.643 | | SPHERICAL SURFACE |
| 13 | −90.9 | 15.00 | 1.835 | 43.0 | | | SPHERICAL SURFACE |
| 14 | −244.1 | 80.08 | | | | | SPHERICAL SURFACE |
| 15 | −179.6 | 15.00 | 1.729 | 54.7 | | | SPHERICAL SURFACE |
| 16 | 61.9 | 7.10 | | | | | SPHERICAL SURFACE |
| 17 | 1186.9 | 23.18 | 1.492 | 57.8 | | | ASPHERICAL SURFACE |
| 18 | −38.0 | 0.10 | | | | | ASPHERICAL SURFACE |
| 19 | −39.9 | 5.00 | 1.618 | 63.4 | | | SPHERICAL SURFACE |
| 20 | −80.7 | 100.00 | | | | | SPHERICAL SURFACE |
| 21 | ∞ | −158.87 | REFLECTION | | | −45.0 | SPHERICAL SURFACE |
| 22 | ∞ | 240.00 | REFLECTION | | −93.049 | 37.6 | POLYNOMIAL FREE-FORM SURFACE |
| 23 | ∞ | −290.00 | REFLECTION | | | | |
| 24 | ∞ | 0.00 | | | | | |

The coefficients of the aspherical surfaces in practical example 4 are provided in Table 11.

TABLE 11

| COEFFICIENT | 17 TH SURFACE | 18 TH SURFACE |
|---|---|---|
| CONICAL COEFFICIENT: k | 0 | 0 |
| 4 TH ORDER COEFFICIENT: A | 1.89836E−06 | 7.60507E−07 |
| 6 TH ORDER COEFFICIENT: B | −2.08369E−09 | −8.08768E−10 |
| 8 TH ORDER COEFFICIENT: C | 2.30824E−12 | 8.17242E−14 |
| 10 TH ORDER COEFFICIENT: D | 3.82871E−16 | 9.34656E−16 |
| 12 TH ORDER COEFFICIENT: E | −1.01757E−18 | −6.55600E−19 |
| 14 TH ORDER COEFFICIENT: F | 3.24904E−22 | 5.46175E−22 |

The coefficients of the polynomial free-form surface in practical example 4 are provided in Table 12. The coefficients of the polynomial free-form surface correspond to those of formula (1) described above.

TABLE 12

| COEFFICIENT | COEFFICIENT VALUE |
|---|---|
| X2 | 3.32030.E−03 |
| Y2 | 1.64263.E−03 |
| X2Y | 1.40427.E−05 |
| Y3 | 4.95476.E−06 |
| X4 | 6.63376.E−10 |
| X2Y2 | 9.48744.E−08 |
| Y4 | 1.50226.E−08 |
| X4Y | −2.70910.E−12 |
| X2Y3 | 4.78356.E−10 |
| Y5 | 1.48313.E−10 |

TABLE 12-continued

| COEFFICIENT | COEFFICIENT VALUE |
|---|---|
| X6 | 6.49881.E−13 |
| X4Y2 | −1.46222.E−12 |
| X2Y4 | 4.82232.E−12 |
| Y6 | 3.66497.E−12 |

Figure 19:
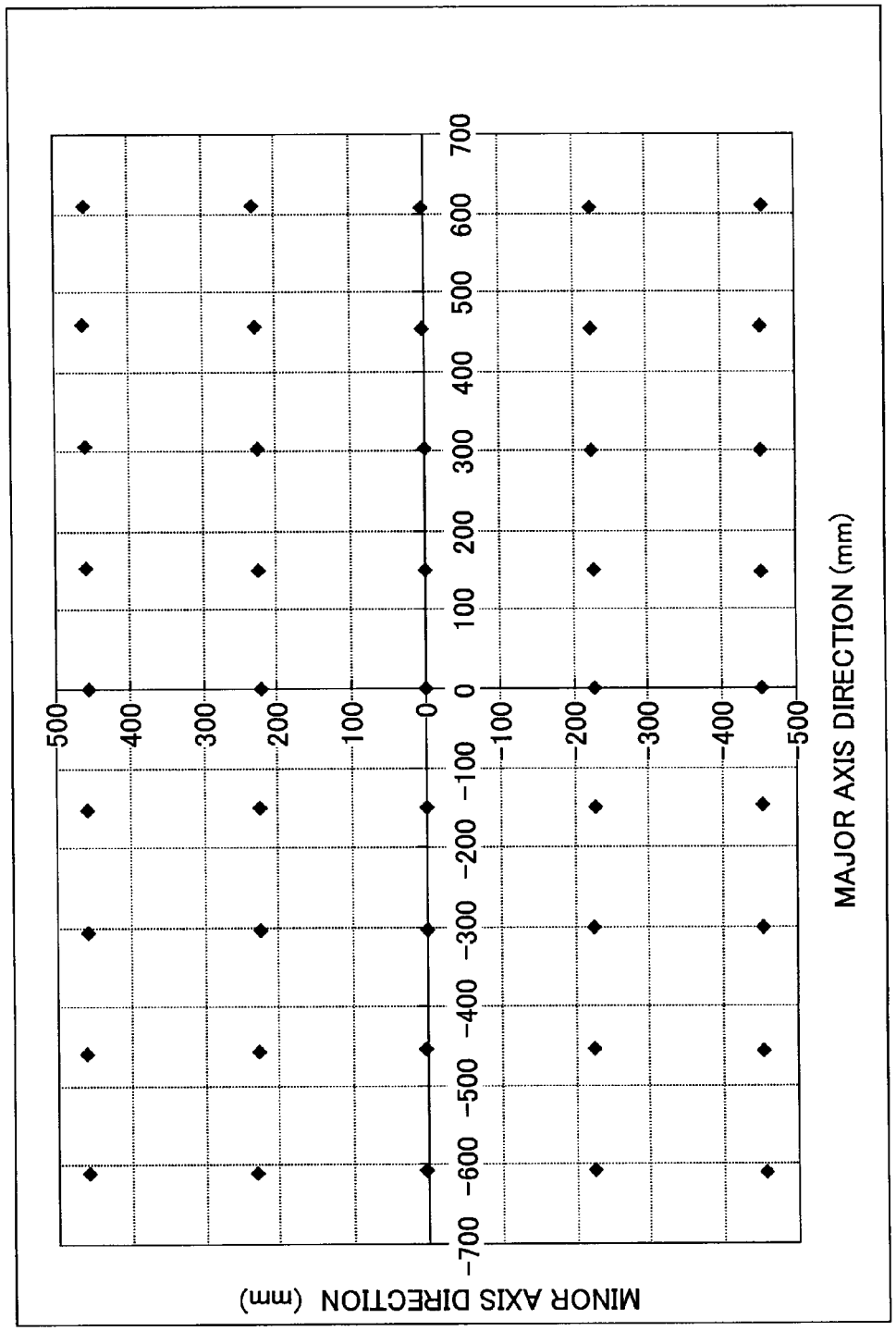
FIG. 19 is a diagram showing the distortion condition of an enlarged image on the last conjugate plane B in practical example 4.
Figure 20:
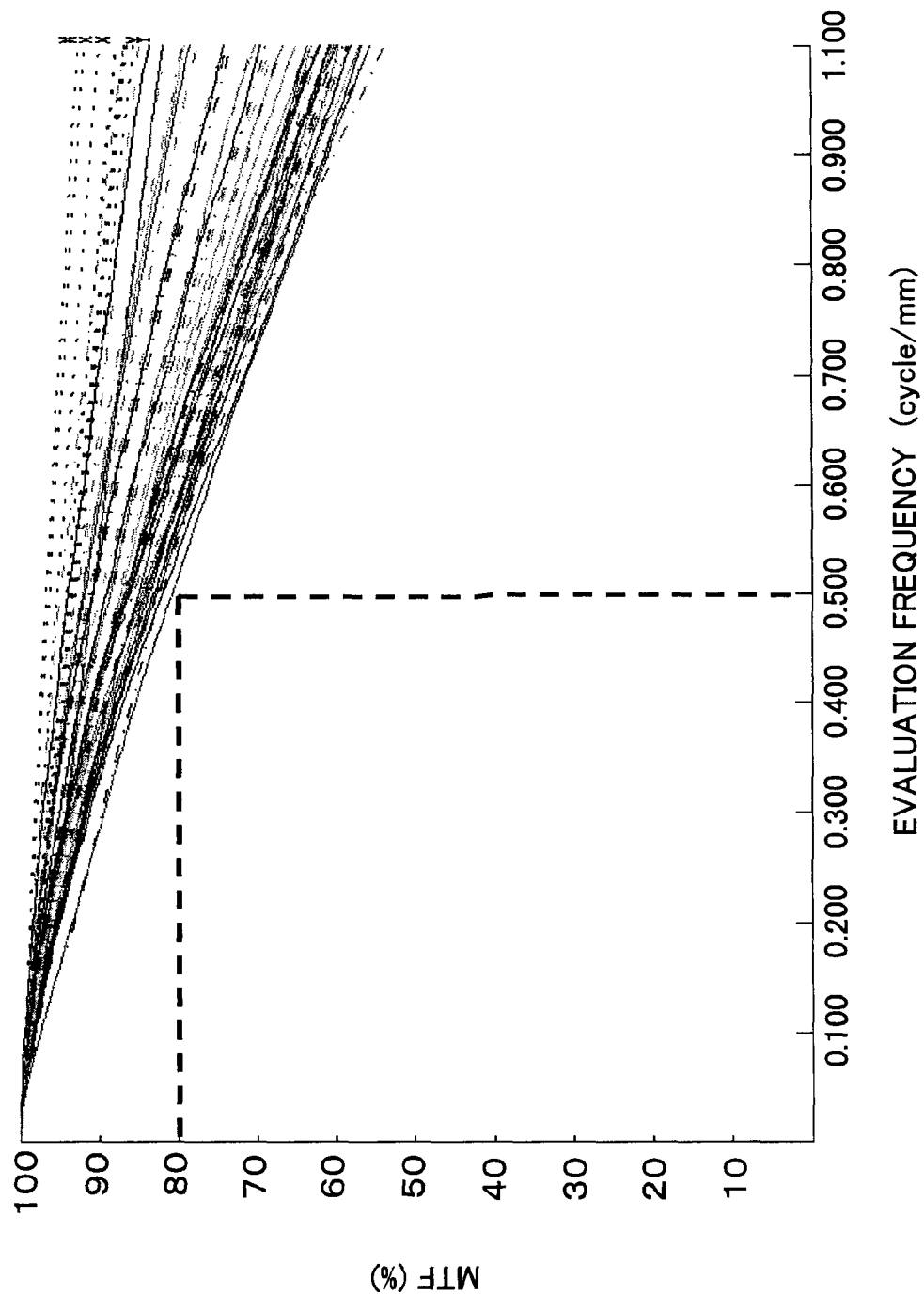
FIG. 20 is a diagram showing the resolution performance with respect to an enlarged image on the last conjugate plane B in practical example 4.

FIG. 19 shows the distortion condition of an enlarged image on the last conjugate plane B in practical example 4 and FIG. 20 shows the resolution performance with respect to the image.

Both of them are the results where a panel with a diagonal size of 0.7 inches and a vertical to horizontal ratio of 3:4 is assumed as an image forming element. The enlargement ratio is approximately 85.7. It can be seen that grid images are formed in generally equal spaces as shown in FIG. 19 and the distortion is corrected well. Also, it can be seen that the MTF value at an evaluation frequency of 0.5 c/mm is 80% or greater as shown in FIG. 20 and the resolution performance is good. Additionally, the F number of light emitted from the image forming element is F 2.8 and the thickness in the directions of the depth is 300 mm. Also, the lens having the largest diameter in the first optical system is a lens closest to the screen and the diameter is 80 mm. In regard to the size of the reflection mirror having a positive refractive power in the second optical system, the product of the maximum length in the minor axis directions and the maximum length in the major axis directions is 129.1 mm×119.6 mm.

224, and the third group 225, respectively, for a first optical system 212 in the optical system according to an embodiment of the present invention and one lens is removed from practical example 4 so as to provide a cost reduction system. However, similarly to practical example 1, it is obvious that the embodiment of the present invention does not depend on the number of a lens(es) and the spatial occupancy of the optical system may be reduced by arranging a reflection mirror 215 so as to fold the optical path.

Also, since this practical example satisfies the above-mentioned conditional formula (2), the size of the reflection mirror 214 having a positive refractive power may be reduced.

Furthermore, in this practical example, an spherical surface is used in the last lens of the first optical system 212, that is, on a surface closest to the conjugate plane B, and at that position, the light rays with the respective angles of view are most separated in the first optical system 212, whereby the light rays with the respective angles of view may be best controlled by the aspherical surface (the ninth embodiment of the present invention). Therefore, the resolution performance may be improved. It is shown that the MTF resolution performance in this practical example is comparable to that of practical example 4 (the number of lenses being 10), although the number of lenses in the first optical system 212 is 9 (see FIG. 24).

These similarly apply to practical examples 6 and 7 described below.

The specific data of practical example 5 are shown in Table 13.

TABLE 13

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 0 | ∞ | 0.00 | | | | | |
| 1 | ∞ | 43.60 | 1.517 | 64.2 | | | |
| 2 | ∞ | 47.00 | | | | | |
| 3 | 67.5 | 20.00 | 1.497 | 81.6 | 1.481 | | SPHERICAL SURFACE |
| 4 | −105.7 | 0.30 | | | | | SPHERICAL SURFACE |
| 5 | 106.8 | 18.29 | 1.835 | 43.0 | | | SPHERICAL SURFACE |
| 6 | 41.6 | 12.59 | 1.497 | 81.6 | | | SPHERICAL SURFACE |
| 7 | −39.6 | 0.38 | | | | | SPHERICAL SURFACE |
| 8 | −38.3 | 1.00 | 1.835 | 43.0 | | | SPHERICAL SURFACE |
| 9 | 72.3 | 8.27 | 1.677 | 38.6 | | | SPHERICAL SURFACE |
| 10 | −62.4 | 29.73 | | | | | SPHERICAL SURFACE |
| 11 STOP | ∞ | 148.54 | | | 0.708 | | |
| 12 | 107.5 | 20.00 | 1.531 | 51.3 | −0.708 | | SPHERICAL SURFACE |
| 13 | −119.1 | 20.00 | 1.835 | 43.0 | | | SPHERICAL SURFACE |
| 14 | −388.5 | 122.75 | | | | | SPHERICAL SURFACE |
| 15 | −184.8 | 2.00 | 1.729 | 54.7 | | | SPHERICAL SURFACE |
| 16 | 73.1 | 6.23 | | | | | SPHERICAL SURFACE |
| 17 | 471.0 | 14.92 | 1.492 | 57.8 | | | ASPHERICAL SURFACE |
| 18 | −85.0 | 100.00 | | | | | ASPHERICAL SURFACE |
| 19 | 1000.0 | −187.77 | REFLECTION | | | −45.0 | SPHERICAL SURFACE |
| 20 | ∞ | 240.00 | REFLECTION | | −93.675 | 37.1 | POLYNOMIAL FREE-FORM SURFACE |
| 21 | ∞ | −290.00 | REFLECTION | | | | |
| 22 | ∞ | 0.00 | | | | | |

Practical Example 5

Next, practical example 5 for another embodiment of the present invention is described below.

Figure 21:
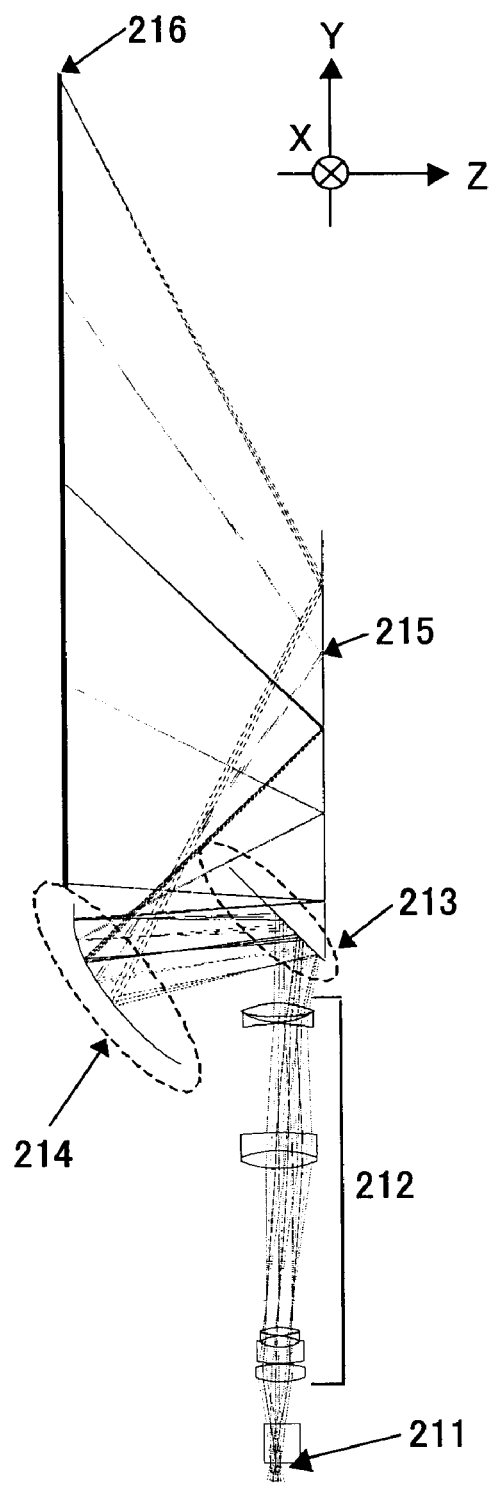
FIG. 21 is a diagram showing practical example 5 of the present invention.
Figure 22:
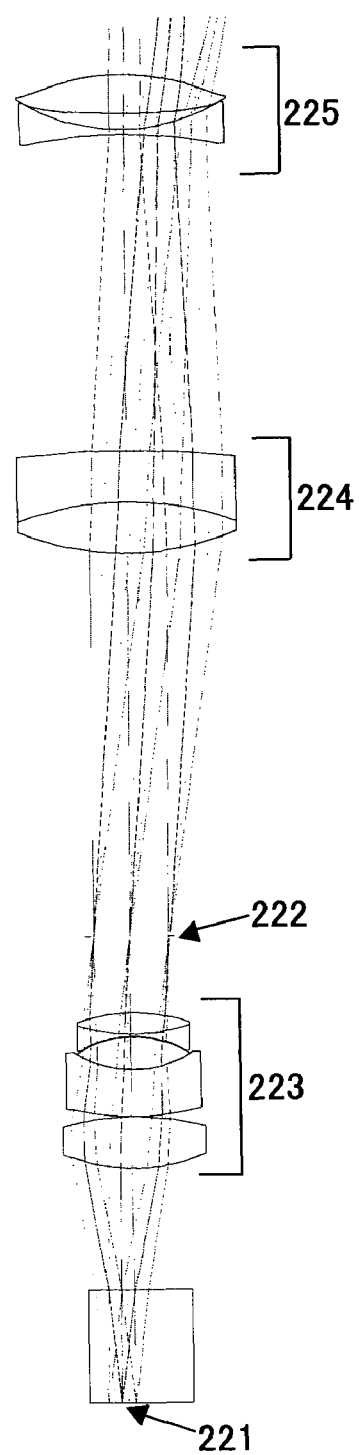
FIG. 22 is an enlarged view of the first optical system of practical example 5 of the present invention.

FIG. 21 shows practical example 5 of the present invention and FIG. 22 shows an enlarged view of a first optical system in practical example 5.

Similarly to practical example 4, 5, 2, and 2 lenses, (totally 9 lenses) are used for the first group 223, the second group The coefficients of the aspherical surfaces in practical example 5 are provided in Table 14.

TABLE 14

| COEFFICIENT | 17 TH SURFACE | 18 TH SURFACE |
|---|---|---|
| CONICAL COEFFICIENT: k | 0 | 0 |

TABLE 14-continued

| COEFFICIENT | 17 TH SURFACE | 18 TH SURFACE |
|---|---|---|
| 4 TH ORDER COEFFICIENT: A | 1.80976E−06 | 8.43334E−07 |
| 6 TH ORDER COEFFICIENT: B | −2.57549E−09 | −1.43667E−09 |
| 8 TH ORDER COEFFICIENT: C | 2.42886E−12 | 5.73948E−13 |
| 10 TH ORDER COEFFICIENT: D | −3.47341E−16 | 2.35665E−16 |
| 12 TH ORDER COEFFICIENT: E | −2.97949E−19 | −1.75196E−20 |
| 14 TH ORDER COEFFICIENT: F | 9.58800E−23 | −2.30463E−23 |

The coefficients of the polynomial free-form surface in practical example 5 are provided in Table 15. The coefficients of the polynomial free-form surface correspond to those of formula (1) described above.

TABLE 15

| COEFFICIENT | COEFFICIENT VALUE |
|---|---|
| X2 | 3.27049.E−03 |
| Y2 | 1.58036.E−03 |
| X2Y | 1.42909.E−05 |
| Y3 | 4.90804.E−06 |
| X4 | −1.23902.E−09 |
| X2Y2 | 9.52250.E−08 |
| Y4 | 1.72869.E−08 |
| X4Y | −4.10532.E−11 |
| X2Y3 | 4.76046.E−10 |
| Y5 | 1.01684.E−10 |
| X6 | 6.69857.E−13 |
| X4Y2 | −1.82800.E−12 |
| X2Y4 | 4.32723.E−12 |
| Y6 | 3.75216.E−12 |

Figure 23:
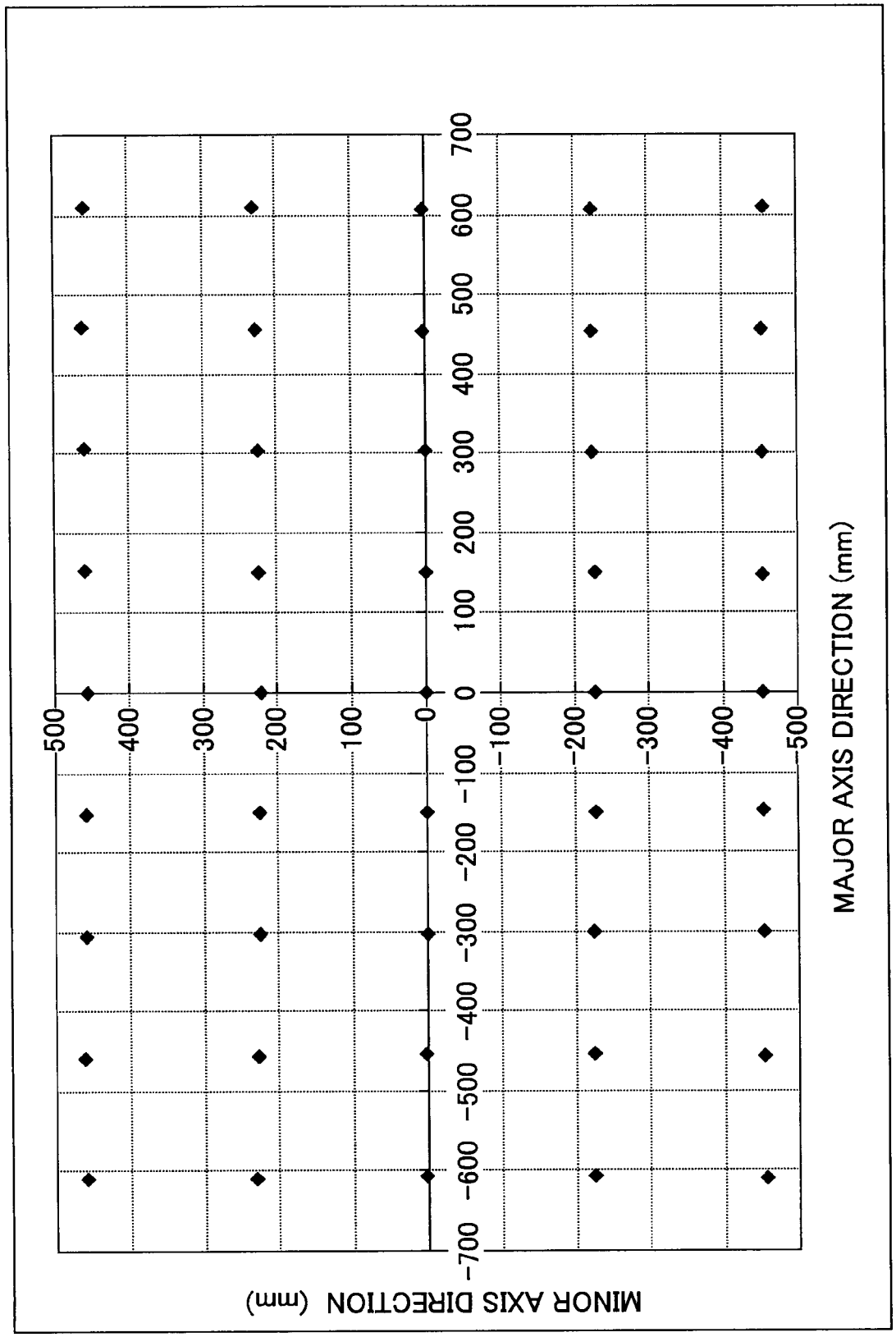
FIG. 23 is a diagram showing the distortion condition of an enlarged image on the last conjugate plane B in practical example 5.
Figure 24:
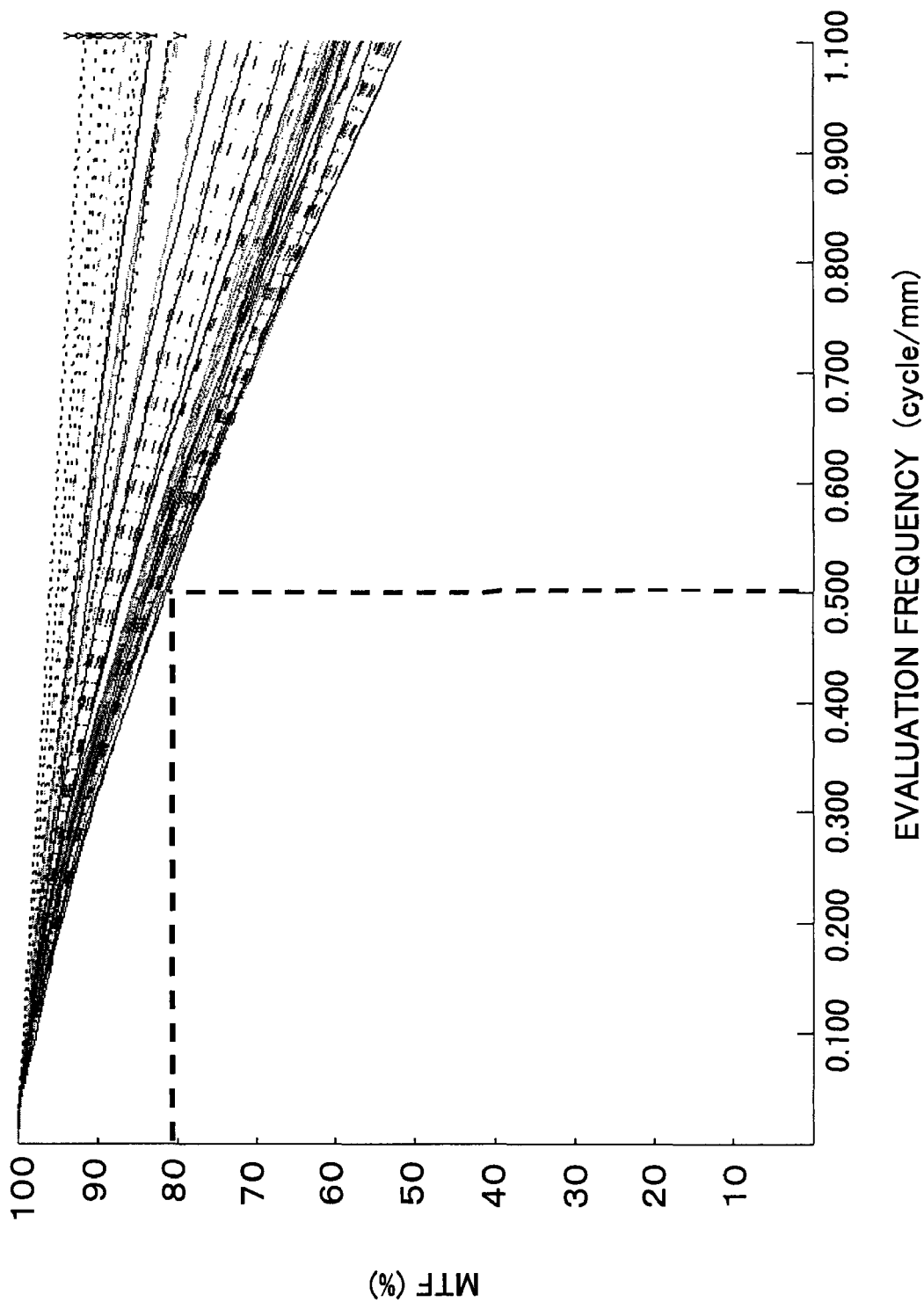
FIG. 24 is a diagram showing the resolution performance with respect to an enlarged image on the last conjugate plane B in practical example 5.

FIG. 23 shows the distortion condition of an enlarged image on the last conjugate plane B in practical example 5 and FIG. 24 shows the resolution performance with respect to the image.

Both of them are the results where a panel with a diagonal size of 0.7 inches and a vertical to horizontal ratio of 3:4 is assumed as an image forming element. The enlargement ratio is approximately 85.7. It can be seen that grid images are formed in generally equal spaces as shown in FIG. 23 and the distortion is corrected well. Also, it can be seen that the MTF value at an evaluation frequency of 0.5 c/mm is 80% or greater as shown in FIG. 24 and the resolution performance is good. Additionally, the F number of light emitted from the image forming element is F 2.8 and the thickness in the directions of the depth is 300 mm. Also, the lens having the largest diameter in the first optical system is a lens in the second group and the diameter is 80 mm. In regard to the size of the reflection mirror having a positive refractive power in the second optical system, the product of the maximum length in the minor axis directions and the maximum length in the major axis directions is 130.1 mm×120.2 mm.

Practical Example 6

Next, practical example 6 for another embodiment of the present invention is described below.

Figure 25:
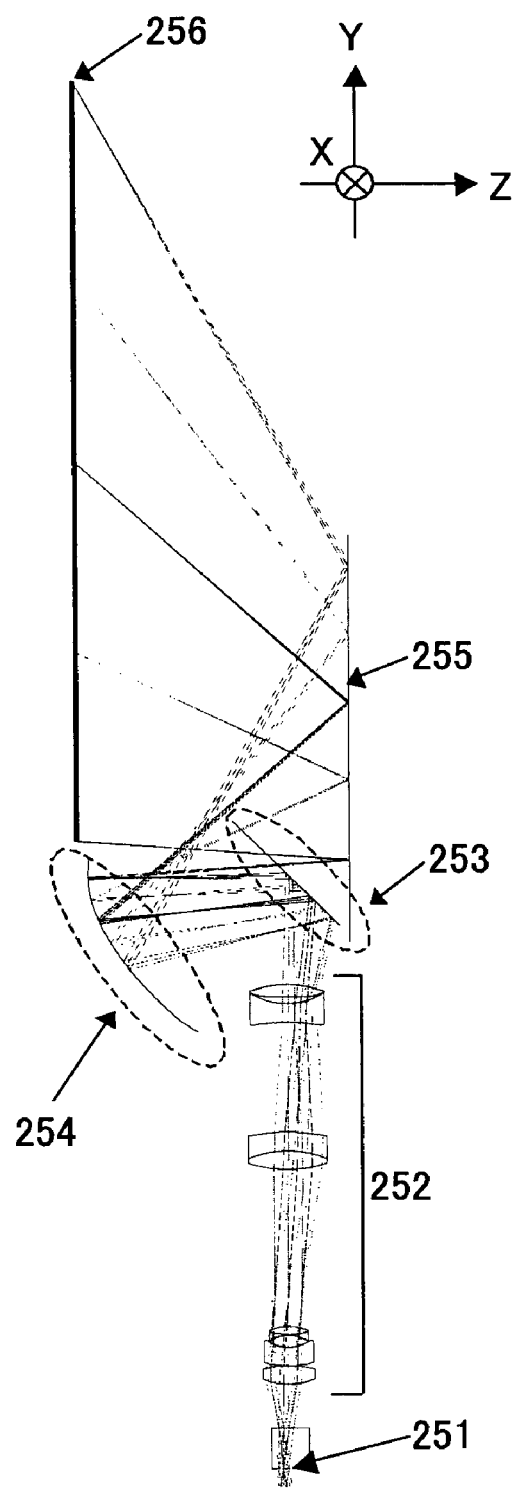
FIG. 25 is a diagram showing practical example 6 of the present invention.
Figure 26:
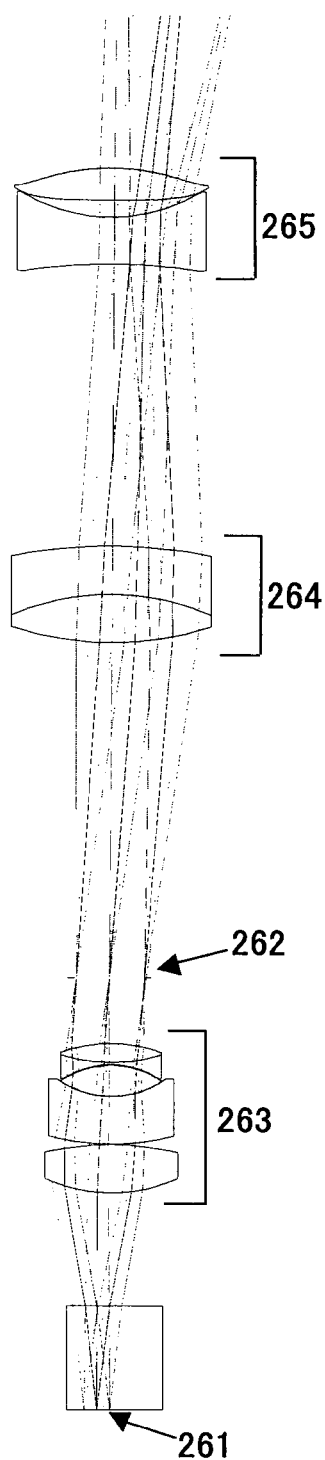
FIG. 26 is an enlarged view of the first optical system of practical example 6 of the present invention.

FIG. 25 shows practical example 6 of the present invention and FIG. 26 shows an enlarged view of a first optical system in practical example 6.

Similarly to practical example 4, 5, 2, and 2 lenses, (totally 9 lenses,) are used for the first group 263, the second group 264, and the third group 265, respectively, for a first optical system 252 in the optical system according to an embodiment of the present invention and one lens is removed from practical example 4 so as to provide a cost reduction system. However, similarly to practical example 1, it is obvious that the embodiment of the present invention does not depend on the number of a lens(es) and the spatial occupancy of the optical system may be reduced by arranging a reflection mirror 255 so as to fold the optical path.

Also, since this practical example satisfies the above-mentioned conditional formula (2), the size of the reflection mirror 254 having a positive refractive power may be reduced.

Figure 28:
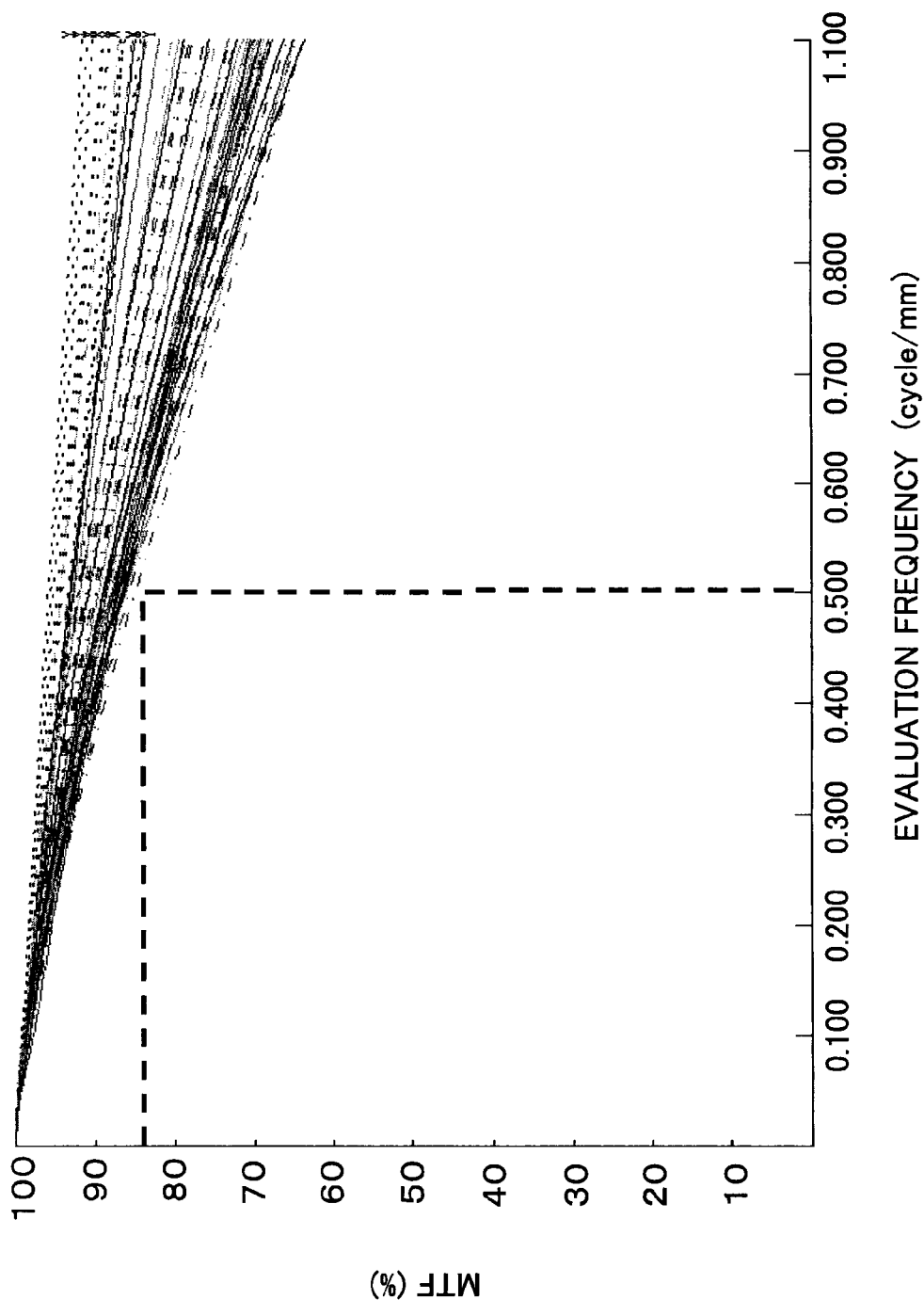
FIG. 28 is a diagram showing the resolution performance with respect to an enlarged image on the last conjugate plane B in practical example 6.

Furthermore, in this practical example, since the magnification is approximately 77.1 which is lower than those of practical examples 1-5, the MTF resolution performance is 84% or greater at an evaluation frequency of 0.5 c/mm and is good (see FIG. 28).

The specific data of practical example 6 are shown in Table 16.

TABLE 16

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 0 | ∞ | 0.00 | | | | | |
| 1 | ∞ | 43.60 | 1.517 | 64.2 | | | |
| 2 | ∞ | 47.00 | | | | | |
| 3 | 63.7 | 20.00 | 1.497 | 81.6 | 1.399 | | SPHERICAL SURFACE |
| 4 | −122.4 | 0.30 | | | | | SPHERICAL SURFACE |
| 5 | 97.2 | 19.86 | 1.835 | 43.0 | | | SPHERICAL SURFACE |
| 6 | 38.4 | 12.58 | 1.497 | 81.6 | | | SPHERICAL SURFACE |
| 7 | −38.2 | 0.37 | | | | | SPHERICAL SURFACE |
| 8 | −36.9 | 1.00 | 1.835 | 43.0 | | | SPHERICAL SURFACE |
| 9 | 72.1 | 7.98 | 1.670 | 38.3 | | | SPHERICAL SURFACE |
| 10 | −60.7 | 27.31 | | | | | SPHERICAL SURFACE |
| 11 STOP | ∞ | 140.63 | | | 0.724 | | |
| 12 | 129.6 | 20.00 | 1.525 | 53.1 | −0.724 | | SPHERICAL SURFACE |
| 13 | −105.1 | 20.00 | 1.835 | 43.0 | | | SPHERICAL SURFACE |
| 14 | −214.8 | 117.68 | | | | | SPHERICAL SURFACE |
| 15 | −234.2 | 20.00 | 1.729 | 54.7 | | | SPHERICAL SURFACE |
| 16 | 70.7 | 6.83 | | | | | SPHERICAL SURFACE |
| 17 | 828.1 | 13.89 | 1.492 | 57.8 | | | ASPHERICAL SURFACE |
| 18 | −90.0 | 120.00 | | | | | ASPHERICAL SURFACE |
| 19 | ∞ | −173.02 | REFLECTION | | | −45.0 | SPHERICAL SURFACE |

TABLE 16-continued

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 20 | ∞ | 240.00 | REFLECTION | | −94.421 | 36.0 | POLYNOMIAL FREE-FORM SURFACE |
| 21 | ∞ | −290.00 | REFLECTION | | | | |
| 22 | ∞ | 0.00 | | | | | |

The coefficients of the aspherical surfaces in practical example 6 are provided in Table 17.

TABLE 17

| COEFFICIENT | 17 TH SURFACE | 18 TH SURFACE |
|---|---|---|
| CONICAL COEFFICIENT: k | 0 | 0 |
| 4 TH ORDER COEFFICIENT: A | 1.87364E−06 | 8.56179E−07 |
| 6 TH ORDER COEFFICIENT: B | −2.24732E−09 | −1.31487E−09 |
| 8 TH ORDER COEFFICIENT: C | 2.23324E−12 | 5.98471E−13 |
| 10 TH ORDER COEFFICIENT: D | −3.28554E−16 | 2.69276E−16 |
| 12 TH ORDER COEFFICIENT: E | −2.79406E−19 | −8.60510E−20 |
| 14 TH ORDER COEFFICIENT: F | 9.14565E−23 | −5.47130E−24 |

The coefficients of the polynomial free-form surface in practical example 6 are provided in Table 18. The coefficients of the polynomial free-form surface correspond to those of formula (1) described above.

TABLE 18

| COEFFICIENT | COEFFICIENT VALUE |
|---|---|
| X2 | 3.16909.E−03 |
| Y2 | 1.63345.E−03 |
| X2Y | 1.30784.E−05 |
| Y3 | 4.84851.E−06 |
| X4 | −1.08420.E−09 |
| X2Y2 | 8.40216.E−08 |
| Y4 | 2.19256.E−08 |
| X4Y | −4.21060.E−11 |
| X2Y3 | 4.23633.E−10 |
| Y5 | 9.84052.E−11 |
| X6 | 5.84217.E−13 |
| X4Y2 | −1.54197.E−12 |
| X2Y4 | 2.54754.E−12 |
| Y6 | 2.80764.E−12 |

Figure 27:
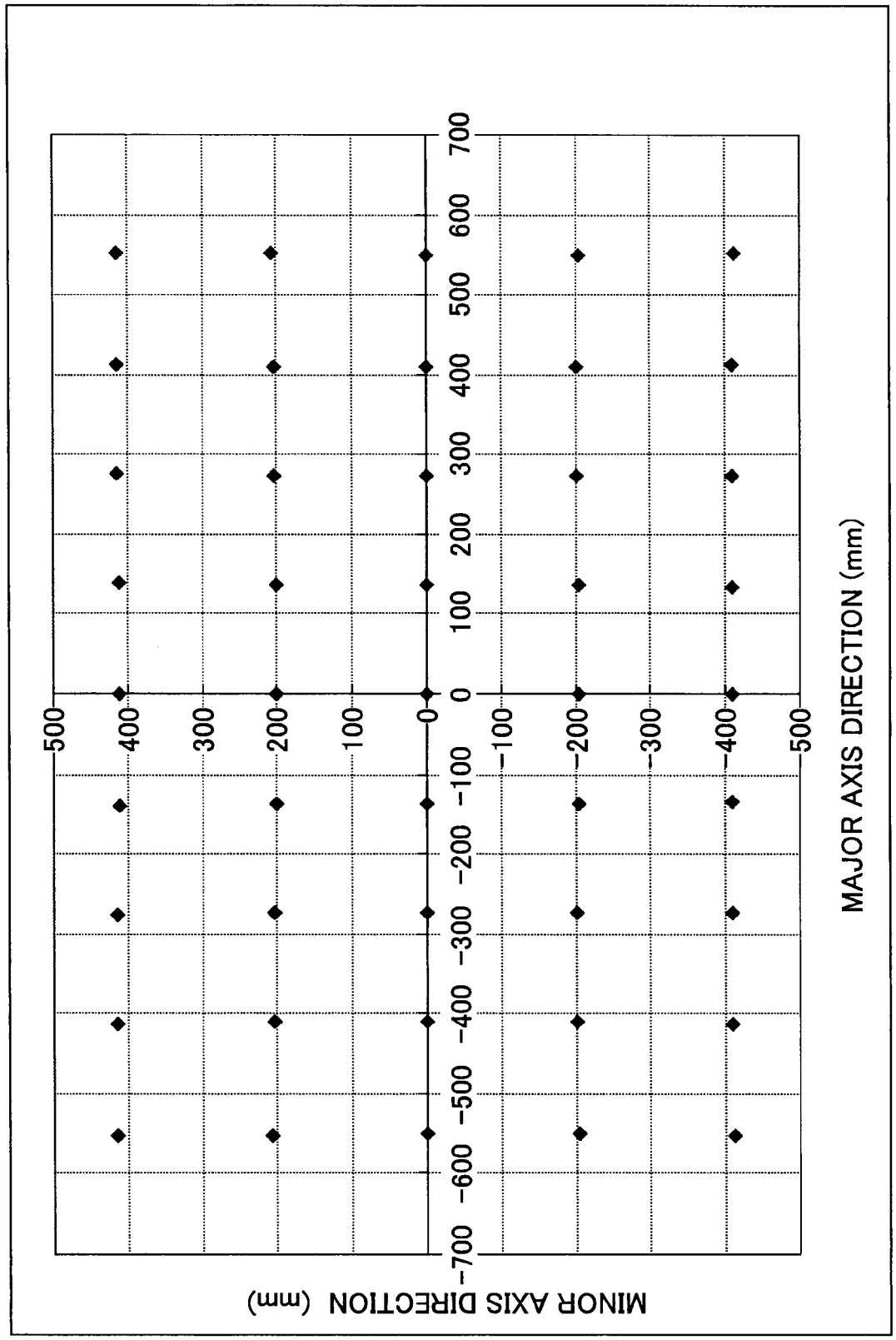
FIG. 27 is a diagram showing the distortion condition of an enlarged image on the last conjugate plane B in practical example 6.

FIG. 27 shows the distortion condition of an enlarged image on the last conjugate plane B in practical example 6 and FIG. 28 shows the resolution performance with respect to the image.

Both of them are the results where a panel with a diagonal size of 0.7 inches and a vertical to horizontal ratio of 3:4 is assumed as an image forming element. The enlargement ratio is approximately 77.1. It can be seen that grid images are formed in generally equal spaces as shown in FIG. 27 and the distortion is corrected well. Also, it can be seen that the MTF value at an evaluation frequency of 0.5 c/mm is 84% or greater as shown in FIG. 28 and the resolution performance is good. Additionally, the F number of light emitted from the image forming element is F 2.8 and the thickness in the directions of the depth is 300 mm. Also, the lens having the largest diameter in the first optical system is a lens in the second group and the diameter is 80 mm. In regard to the size of the reflection mirror having a positive refractive power in the second optical system, the product of the maximum length in the minor axis directions and the maximum length in the major axis directions is 130.4 mm×119.2 mm.

Practical Example 7

Next, practical example 7 for another embodiment of the present invention is described below.

Figure 29:
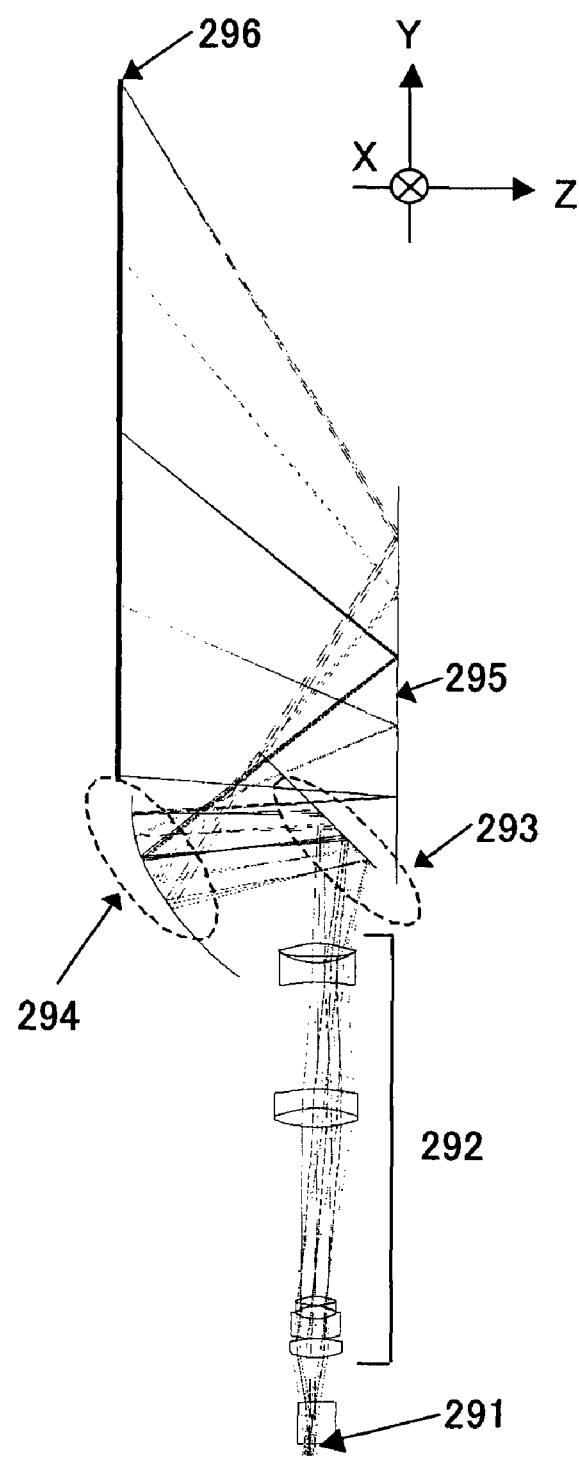
FIG. 29 is a diagram showing practical example 7 of the present invention.
Figure 30:
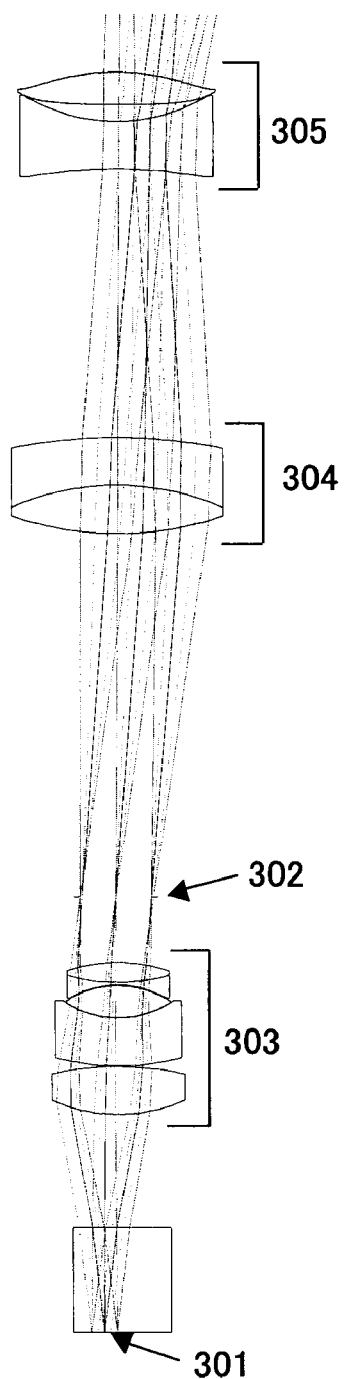
FIG. 30 is an enlarged view of the first optical system of practical example 7 of the present invention.

FIG. 29 shows practical example 7 of the present invention and FIG. 30 shows an enlarged view of a first optical system in practical example 7.

Similarly to practical example 4, 5, 2, and 2 lenses, (totally 9 lenses,) are used for the first group 303, the second group 304, and the third group 305, respectively, for a first optical system 292 in the optical system according to an embodiment of the present invention and one lens is removed from practical example 4 so as to provide a cost reduction system. However, similarly to practical example 1, it is obvious that the embodiment of the present invention does not depend on the number of a lens(es) and the spatial occupancy of the optical system may be reduced by arranging a reflection mirror 295 so as to fold the optical path.

Also, since this practical example satisfies the above-mentioned conditional formula (2), the size of the reflection mirror 294 having a positive refractive power may be reduced.

Figure 32:
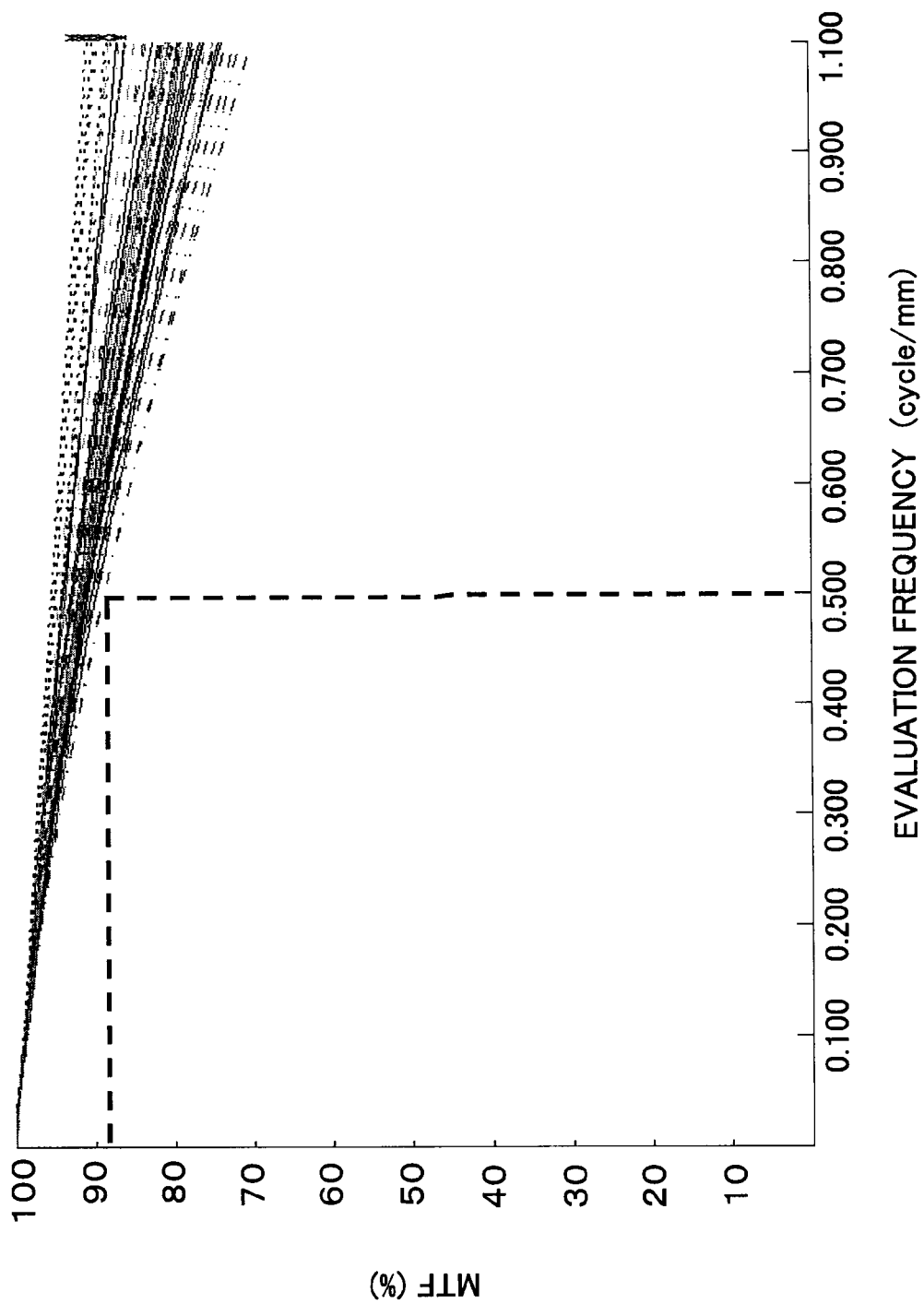
FIG. 32 is a diagram showing the resolution performance with respect to an enlarged image on the last conjugate plane B in practical example 7.

Furthermore, in this practical example, since the magnification is approximately 68.6 which is lower than those of practical examples 1-5, the MTF resolution performance is 88% or greater at an evaluation frequency of 0.5 c/mm and is good (see FIG. 32).

The specific data of practical example 7 are shown in Table 19.

TABLE 19

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 0 | ∞ | 0.00 | | | | | |
| 1 | ∞ | 43.60 | 1.517 | 64.2 | | | |
| 2 | ∞ | 47.00 | | | | | |
| 3 | 65.0 | 20.00 | 1.497 | 81.6 | 1.434 | | SPHERICAL SURFACE |
| 4 | −123.8 | 0.30 | | | | | SPHERICAL SURFACE |
| 5 | 98.1 | 20.00 | 1.835 | 43.0 | | | SPHERICAL SURFACE |
| 6 | 38.8 | 13.27 | 1.497 | 81.6 | | | SPHERICAL SURFACE |
| 7 | −38.9 | 0.38 | | | | | SPHERICAL SURFACE |

TABLE 19-continued

| SURFACE NUMBER | RADIUS OF CURVATURE | SURFACE DISTANCE | REFRACTIVE INDEX | DISPERSION | SHIFT | TILT | SURFACE SHAPE |
|---|---|---|---|---|---|---|---|
| 8 | −37.6 | 1.00 | 1.835 | 43.0 | | | SPHERICAL SURFACE |
| 9 | 70.0 | 8.46 | 1.690 | 38.7 | | | SPHERICAL SURFACE |
| 10 | −62.6 | 27.12 | | | | | SPHERICAL SURFACE |
| 11 STOP | 1E+18 | 150.50 | | | 0.723 | | |
| 12 | 130.1 | 20.00 | 1.523 | 53.6 | −0.723 | | SPHERICAL SURFACE |
| 13 | −107.6 | 20.00 | 1.835 | 43.0 | | | SPHERICAL SURFACE |
| 14 | −213.5 | 111.29 | | | | | SPHERICAL SURFACE |
| 15 | −209.8 | 19.77 | 1.729 | 54.7 | | | SPHERICAL SURFACE |
| 16 | 72.4 | 6.69 | | | | | SPHERICAL SURFACE |
| 17 | 742.5 | 13.55 | 1.492 | 57.8 | | | ASPHERICAL SURFACE |
| 18 | −92.8 | 140.00 | | | | | ASPHERICAL SURFACE |
| 19 | 1000.00 | −158.33 | REFLECTION | | | −45.0 | SPHERICAL SURFACE |
| 20 | ∞ | 240.00 | REFLECTION | | −95.310 | 34.8 | POLYNOMIAL FREE-FORM SURFACE |
| 21 | ∞ | −290.00 | REFLECTION | | | | |
| 22 | ∞ | 0.00 | | | | | |

The coefficients of the aspherical surfaces in practical example 7 are provided in Table 20.

TABLE 20

| COEFFICIENT | 17 TH SURFACE | 18 TH SURFACE |
|---|---|---|
| CONICAL COEFFICIENT: k | 0 | 0 |
| 4 TH ORDER COEFFICIENT: A | 1.51635E−06 | 6.18694E−07 |
| 6 TH ORDER COEFFICIENT: B | −1.39546E−09 | −7.75994E−10 |
| 8 TH ORDER COEFFICIENT: C | 1.50684E−12 | 2.88584E−13 |
| 10 TH ORDER COEFFICIENT: D | −3.03534E−16 | 3.29490E−16 |
| 12 TH ORDER COEFFICIENT: E | −1.01365E−19 | −1.63039E−19 |
| 14 TH ORDER COEFFICIENT: F | 4.05944E−23 | 3.31317E−23 |

The coefficients of the polynomial free-form surface in practical example 7 are provided in Table 21. The coefficients of the polynomial free-form surface correspond to those of formula (1) described above.

TABLE 21

| COEFFICIENT | COEFFICIENT VALUE |
|---|---|
| X2 | 3.02292.E−03 |
| Y2 | 1.65436.E−03 |
| X2Y | 1.16638.E−05 |
| Y3 | 4.73471.E−06 |
| X4 | −1.62364.E−09 |
| X2Y2 | 7.10466.E−08 |
| Y4 | 2.42523.E−08 |
| X4Y | −4.75619.E−11 |
| X2Y3 | 3.14896.E−10 |
| Y5 | 1.15443.E−10 |
| X6 | 4.72617.E−13 |
| X4Y2 | −1.28129.E−12 |
| X2Y4 | 1.05809.E−12 |
| Y6 | 1.58335.E−12 |

Figure 31:
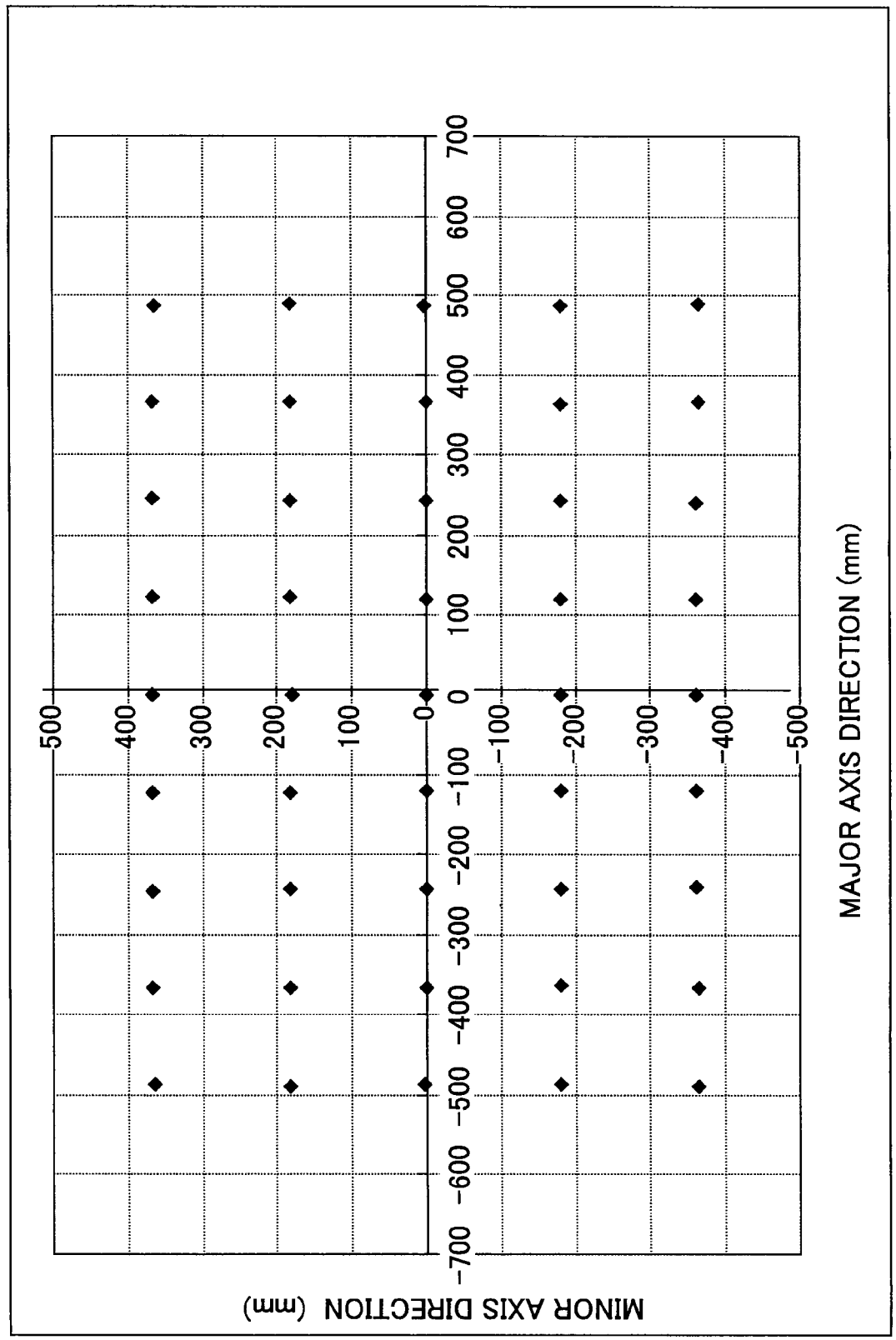
FIG. 31 is a diagram showing the distortion condition of an enlarged image on the last conjugate plane B in practical example 7.

FIG. 31 shows the distortion condition of an enlarged image on the last conjugate plane B in practical example 7 and FIG. 32 shows the resolution performance with respect to the image.

Both of them are the results where a panel with a diagonal size of 0.7 inches and a vertical to horizontal ratio of 3:4 is assumed as an image forming element. The enlargement ratio is approximately 68.6. It can be seen that grid images are formed in generally equal spaces as shown in FIG. 31 and the distortion is corrected well. Also, it can be seen that the MTF value at an evaluation frequency of 0.5 c/mm is 88% or greater as shown in FIG. 32 and the resolution performance is good. Additionally, the F number of light emitted from the image forming element is F 2.8 and the thickness in the directions of the depth is 300 mm. Also, the lens having the largest diameter in the first optical system is a lens in the second group and the diameter is 80 mm. In regard to the size of the reflection mirror having a positive refractive power in the second optical system, the product of the maximum length in the minor axis directions and the maximum length in the major axis directions is 131.2 mm×118.4 mm.

Practical Example 8

Next, practical example 8 for another embodiment of the present invention is described below.

Figure 35:
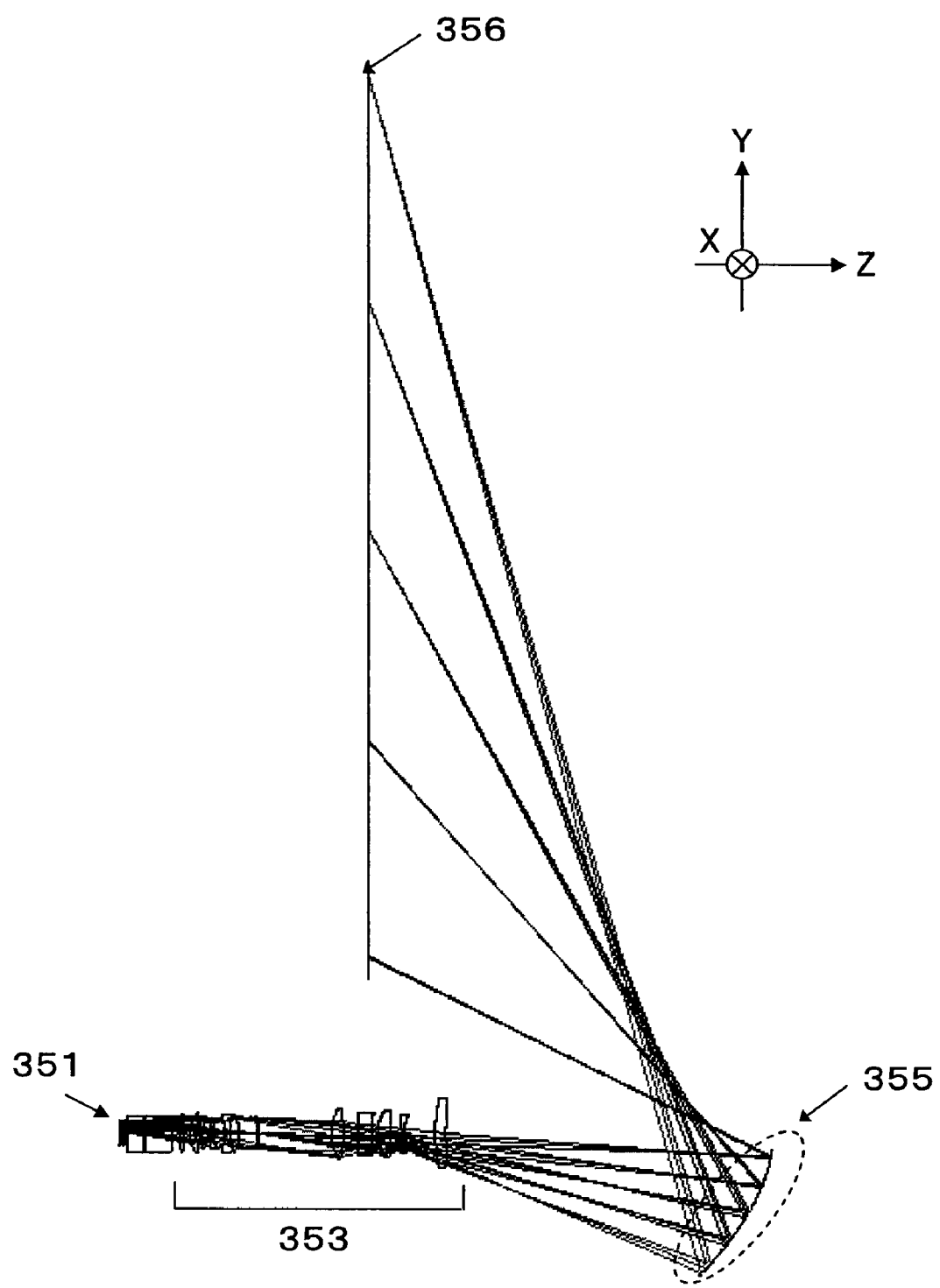
FIG. 35 is a diagram showing practical example 8 of the present invention.
Figure 36:
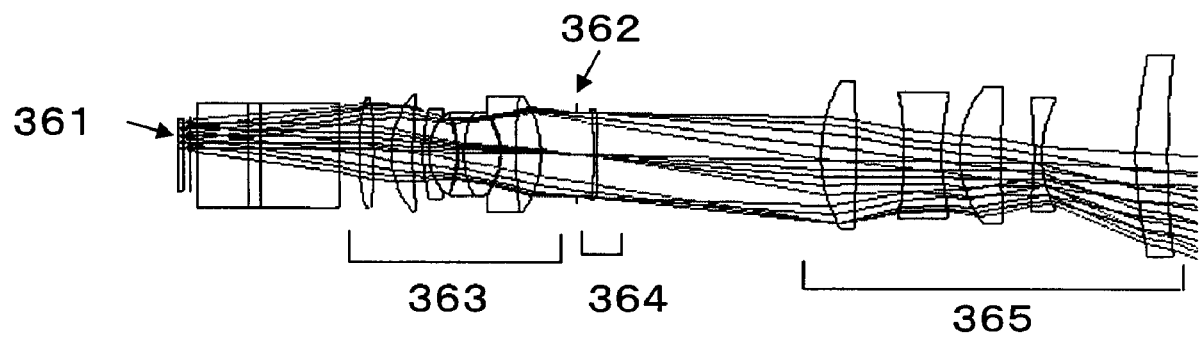
FIG. 36 is an enlarged view of the first optical system of practical example 8 of the present invention.

FIG. 35 shows practical example 8 of the present invention and FIG. 36 shows an enlarged view of a first optical system in practical example 8.

Similarly to practical example 4, a mirror having a positive refractive power in a second optical system 355 has a rotationally symmetric aspherixal surface in the optical system according to an embodiment of the present invention. Since it is more easily processed compared to the mirror having a shape of polynomial free-form surface, a model with a low processing error, a low processing time period, and cost reduction is provided (the fifth embodiment of the present invention). However, similarly to practical example 1, it is obvious that the embodiment of the present invention does not depend on the number of a lens(es) and the spatial occupancy of the optical system may be reduced by arranging a reflection mirror so as to fold the optical path.

Also, since this practical example satisfies the above-mentioned conditional formula (2), the size of the reflection mirror 355 having a positive refractive power may be reduced.

The specific data of practical example 8 are shown in Table 23.

TABLE 23

| SURFACE NUMBER | RADIUS OF CURVATURE | SURFACE DISTANCE | REFRACTIVE INDEX | DISPERSION | SHIFT | SURFACE SHAPE |
|---|---|---|---|---|---|---|
| 0 | ∞ | 1.80 | 1.517 | 64.2 | | |
| 1 | ∞ | 2.00 | | | | |
| 2 | ∞ | 0.40 | 1.549 | 52.6 | | |
| 3 | ∞ | 2.00 | | | | |
| 4 | ∞ | 16.00 | 1.589 | 61.3 | | |
| 5 | ∞ | 3.25 | 1.589 | 61.3 | | |
| 6 | ∞ | 25.00 | 1.517 | 64.2 | | |
| 7 | ∞ | 0.00 | | | | |
| 8 | ∞ | 6.05 | | | | |
| 9 | 63.0 | 4.69 | 1.487 | 70.4 | 0.501 | SPHERICAL SURFACE |
| 10 | −119.6 | 5.30 | | | | SPHERICAL SURFACE |
| 11 | 24.7 | 3.04 | 1.487 | 70.4 | | SPHERICAL SURFACE |
| 12 | 129.1 | 2.57 | | | | SPHERICAL SURFACE |
| 13 | 53.1 | 1.80 | 1.789 | 33.1 | | SPHERICAL SURFACE |
| 14 | 15.6 | 8.62 | 1.487 | 70.4 | | SPHERICAL SURFACE |
| 15 | −30.3 | 0.62 | | | | SPHERICAL SURFACE |
| 16 | −26.4 | 1.80 | 1.820 | 36.1 | | SPHERICAL SURFACE |
| 17 | 27.3 | 11.23 | 1.497 | 81.6 | | SPHERICAL SURFACE |
| 18 | −18.8 | 0.35 | | | | SPHERICAL SURFACE |
| 19 | −19.1 | 4.78 | 1.739 | 45.6 | | SPHERICAL SURFACE |
| 20 | 131.0 | 7.84 | 1.785 | 25.7 | | SPHERICAL SURFACE |
| 21 | −29.0 | 11.41 | | | | SPHERICAL SURFACE |
| 22 | ∞ | 5.00 | | | | |
| 23 | 663.8 | 1.51 | 1.742 | 31.3 | | ASPHERICAL SURFACE |
| 24 | 369.7 | 69.67 | | | | ASPHERICAL SURFACE |
| 25 | 40.4 | 10.98 | 1.543 | 71.3 | | SPHERICAL SURFACE |
| 26 | −362.6 | 14.88 | | | | SPHERICAL SURFACE |
| 27 | −488.5 | 12.00 | 1.835 | 43.0 | | ASPHERICAL SURFACE |
| 28 | 49.6 | 5.75 | | | | ASPHERICAL SURFACE |
| 29 | 31.4 | 13.00 | 1.523 | 63.1 | | SPHERICAL SURFACE |
| 30 | 474.2 | 10.09 | | | | SPHERICAL SURFACE |
| 31 | −126.4 | 2.48 | 1.835 | 43.0 | | SPHERICAL SURFACE |
| 32 | 31.4 | 29.59 | | | | SPHERICAL SURFACE |
| 33 | 98.3 | 10.00 | 1.578 | 44.5 | | ASPHERICAL SURFACE |
| 34 | 267.7 | 312.56 | | | | ASPHERICAL SURFACE |
| 35 | −80.6 | −387.26 | REFLECTION | | | ASPHERICAL SURFACE |
| 36 | ∞ | 0.00 | | | | |

The coefficients of the aspherical surfaces in practical example 8 are provided in Table 24.

TABLE 24

| COEFFICIENT | 23 TH SURFACE | 24 TH SURFACE | 27 TH SURFACE | 28 TH SURFACE | 33 TH SURFACE | 34 TH SURFACE | 35 TH SURFACE |
|---|---|---|---|---|---|---|---|
| CONICAL COEFFICIENT: k | 0 | 0 | 0 | −8.089862861 | 0 | 0 | −2.621640175 |
| 4 TH ORDER COEFFICIENT: A | −3.25771E−05 | −3.31661E−05 | −1.41405E−05 | −8.93391E−06 | −2.47816E−06 | −1.31294E−06 | −1.10442E−07 |
| 6 TH ORDER COEFFICIENT: B | 1.56661E−08 | 2.04471E−08 | 1.43033E−08 | 1.73339E−08 | 5.85770E−09 | 4.33752E−09 | 4.10634E−12 |
| 8 TH ORDER COEFFICIENT: C | 3.19642E−11 | 2.24696E−11 | −8.04383E−12 | −1.87356E−11 | −6.58011E−12 | −1.57120E−12 | −9.53182E−17 |
| 10 TH ORDER COEFFICIENT: D | 3.32284E−14 | 1.35619E−14 | 2.10987E−14 | 3.58714E−14 | 1.84722E−15 | −4.21037E−15 | 5.70049E−22 |
| 12 TH ORDER COEFFICIENT: E | 0 | 0 | −3.71327E−17 | −4.48494E−17 | 0 | 3.48329E−18 | 1.25230E−27 |
| 14 TH ORDER COEFFICIENT: F | 0 | 0 | 2.14941E−20 | 2.84847E−20 | 0 | −7.72915E−22 | 2.39754E−31 |

Figure 37:
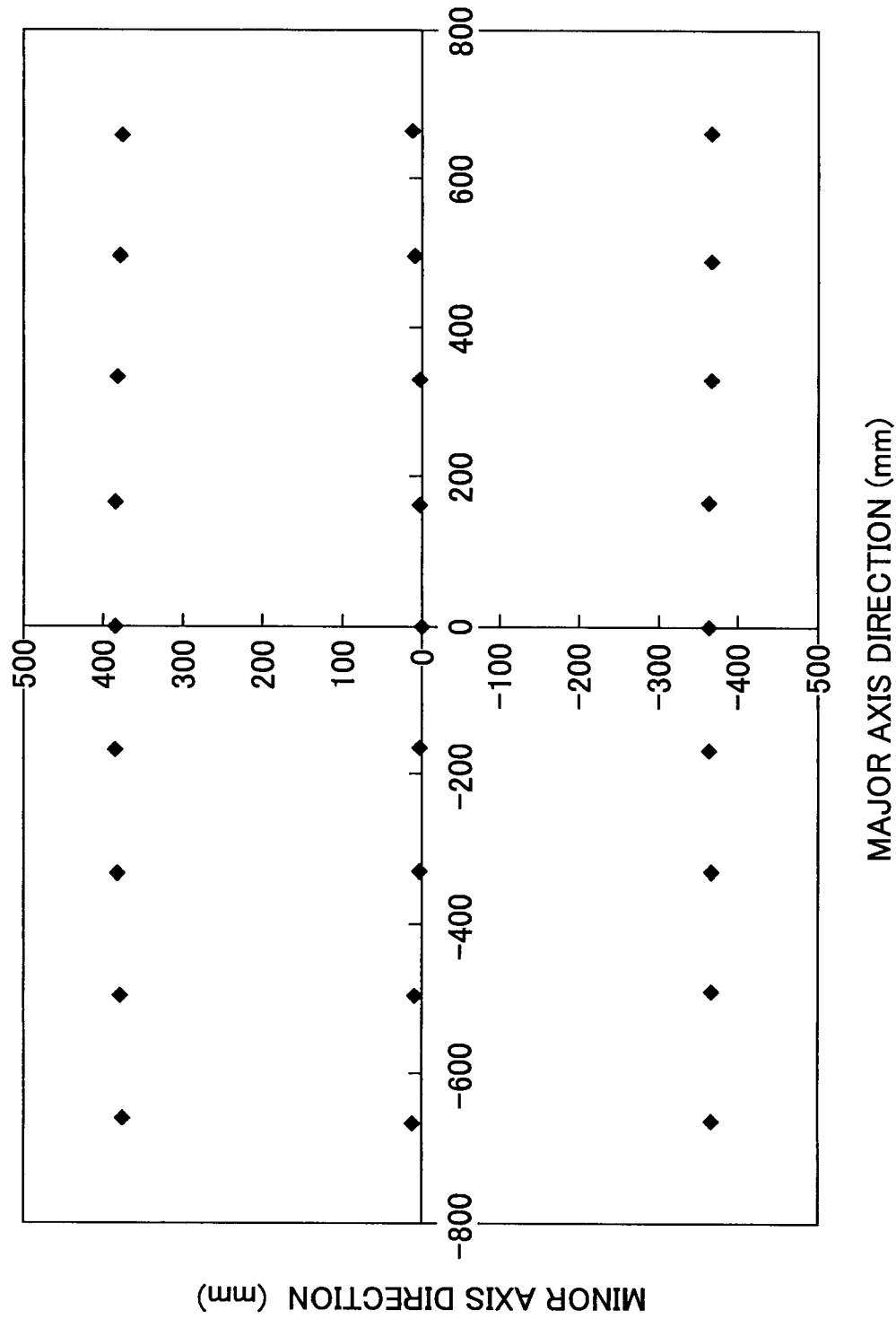
FIG. 37 is a diagram showing the distortion condition of an enlarged image on the last conjugate plane B in practical example 8.
Figure 38:
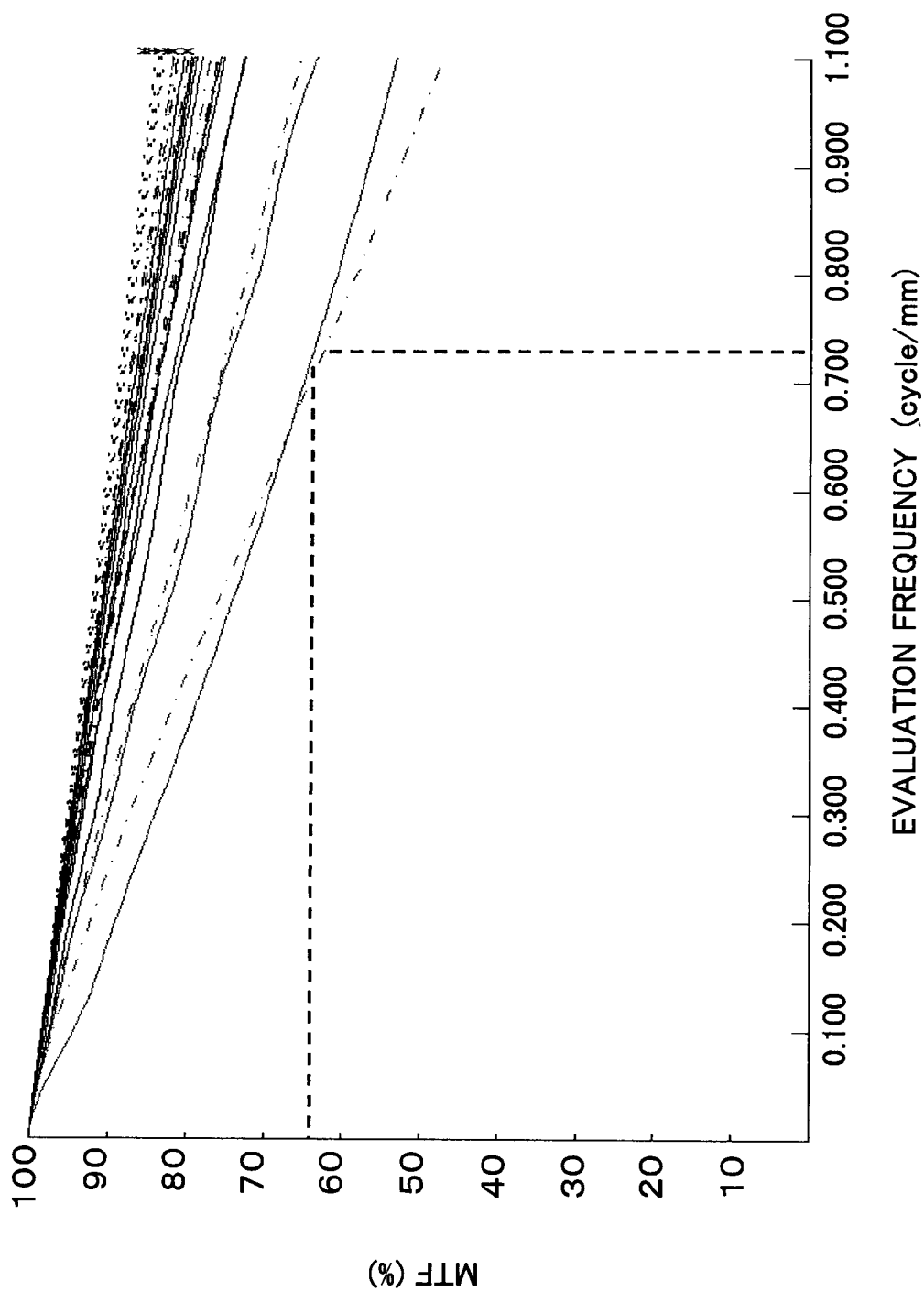
FIG. 38 is a diagram showing the resolution performance with respect to an enlarged image on the last conjugate plane B in practical example 8.

FIG. 37 shows the distortion condition of an enlarged image on the last conjugate plane B in practical example 8 and FIG. 38 shows the resolution performance with respect to the image.

Both of them are the results where a panel with a diagonal size of 0.6 inches and a vertical to horizontal ratio of 9:16 is assumed as an image forming element. The enlargement ratio is approximately 100. It can be seen that grid images are formed in generally equal spaces as shown in FIG. 37 and the distortion is corrected well. Also, it can be seen that the MTF value at an evaluation frequency of 0.73 c/mm is 60% or greater as shown in FIG. 38 and the resolution performance is good. Additionally, the F number of light emitted from the image forming element is F 2.45 and the thickness in the directions of the depth is 387 mm. Also, in regard to the size of the reflection mirror 355 having a positive refractive power in the second optical system, the product of the maximum length in the minor axis directions and the maximum length in the major axis directions is 178.4 mm×101.2 mm.

An image projecting apparatus may be provided by applying the projection optical system according to the embodiment(s) of the present invention to a projection apparatus (the fifteenth embodiment of the present invention).

Figure 11:
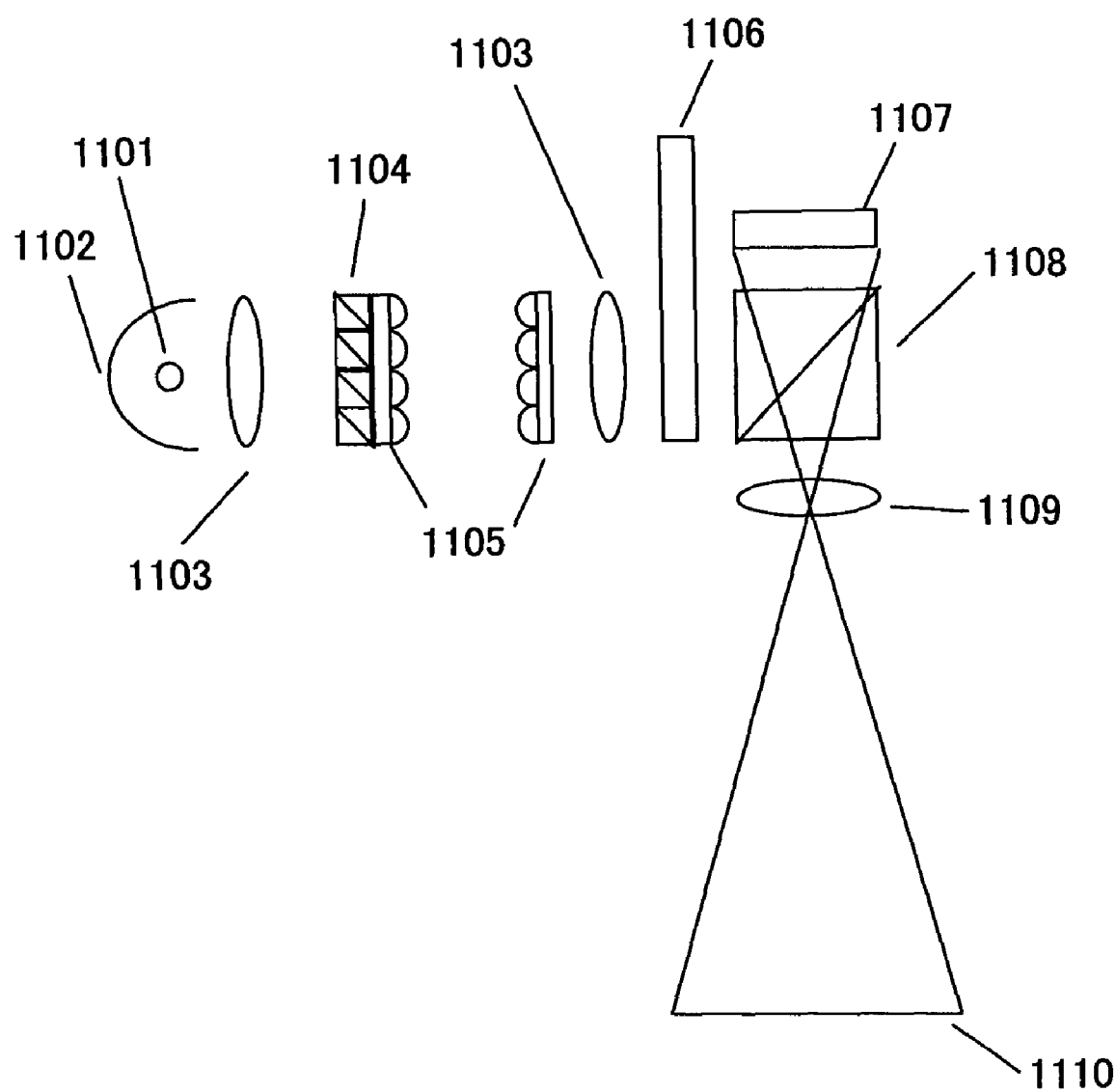
FIG. 11 is a diagram showing a projection apparatus to which a projection optical system is applied.

As shown in FIG. 11, when the projection optical system 1109 is applied to a projection apparatus, an illumination light source 1101 for an image forming element 1107 is used. As an illumination light source 1101, for example, a halogen lamp, a xenon lamp, a metal halide lamp, an extra-high pressure mercury lamp, or an LED may be used. Usually, an illumination optical system is installed in order to obtain high illumination efficiency. As a specific example of the illumination optical system, a reflector 1102 (integrated with a light source 1101) arranged near a light source 1101 may be provided. Furthermore, an optical system may be installed such that light beams reflected by the reflector 1102 and having an orientation are uniformized by an illuminance uniformizing part 1105 called an integrator optical system to obtain a uniform illumination distribution on an image forming element 1107. Moreover, illumination light may be colored by using a color wheel 1106 and an image on an image forming element 1107 may be controlled while synchronized with it, so that a color image may be projected. When a reflection-type liquid crystal image forming element is used, more efficient illumination may be attained, for example, by using polarized light separating parts 1108 on an illumination optical path and a projection optical path which are combined with a PBS. Also, when a DMD panel is installed, for example, an optical path separation using a total reflection prism is provided. Thus, an appropriate optical system may be provided depending on the kind of a light valve.

Additionally, as shown in FIG. 12, it is obvious that a color image may be projected onto a screen 1211 by using plural image forming elements 1207 such as ones for red, green and blue, applying illumination light of each color divided from illumination light by color separating parts 1206, and introducing light combined by a color combining part 1209 into the projection optical system 1210.

Then, the distance from an image forming element 1207 to the first surface of a first optical system of the projection optical system 1210 has to be a long distance due to the presence of a polarized-light separation parts 1208 on an illumination optical path and a projection optical path and a color combining part 1209 for coloring. In the practical examples, a color image may be projected using the above-mentioned coloring part since the air-equivalent length thereof is 68.7 mm.

Thus, according to at least one of the practical examples as described above, a projection optical system whose field curvature is reduced may be provided.

Also, according to at least one of the practical examples as described above, an image projecting apparatus which includes a projection optical system whose field curvature is reduced may be provided.

The present invention may be applied to a projection optical system of a projection apparatus such as an image projecting apparatus. In particular, the present invention may be applied to a projection optical system in a front projector or a projection optical system to attain thinning in rear-projection.

PARTS LIST 011, 021, 031, 041, 071, 081, 131, 141, 171, 181, 211, 221, 251, 261, 291, 301, 351, 361, 1107, 1207: Image Forming Element
012, 022, 032, 082, 142, 182, 222, 262, 302, 362: Stop
013, 033, 042, 072, 132, 172, 212, 252, 292, 353: First Optical System
014, 034, 043, 133, 173, 253: Folding Mirror 015, 035, 355: Second Optical System
016, 046, 076, 136, 176, 216, 256, 296, 356, 1110, 1211: Screen
023, 083, 143, 183, 223, 263, 303, 363: First Group
024, 084, 144, 184, 224, 264, 304, 364: Second Group
025, 085, 145, 185, 225, 265, 305, 365: Third Group
036: Intermediate Image
037: Optical Axis
044, 074, 134, 174, 214, 254, 294: Second Optical System-1
045, 075, 135, 175, 215, 255, 295: Second Optical System-2 (Folding Mirror)
047: Housing
073, 213, 293: Rotationally Symmetric Reflection Mirror
1101, 1201: Light Source
1102, 1202: Reflector
1103, 1203: Relay Lens
1104, 1204: Polarized-Light Converting Element
1105, 1205: Illumination Uniformizing Part
1106: Color Wheel
1108, 1208: Polarized-Light Separating Part
1109, 1210: Projection Optical System
1206: Color Separating Part
1209: Color Combining Part

APPENDIX

Typical embodiments (1) to (16) of the present invention are described below.

Embodiment (1) is a projection optical system comprising a first optical system configured to form a second image conjugate to a first image and a second optical system configured to comprise a reflective optical element which reflects light from the second image and to project a third image conjugate to the second image onto a projection surface, characterized in that the first optical system has a Petzval sum with a sign opposite to a sign of a Petzval sum of the second optical system.

Additionally, "the first optical system having a Petzval sum with a sign opposite to a sign of a Petzval sum of the second optical system" includes, for example, "the first optical system being configured to compensate for a Petzval sum component provided in the second optical system" in the first embodiment of the present invention and "the first optical system being configured to compensate for a Petzval sum component provided in the second optical system" in the second embodiment of the present invention.

Embodiment (2) is the projection optical system as described in embodiment (1) above, characterized in that the reflective optical element comprises a mirror with a positive power and the first optical system is a coaxial optical system having an optical axis thereof.

Embodiment (3) is the projection optical system as described in embodiment (2) above, characterized in that the first optical system comprises at least one optical element with a refractive power which is composed of lenses only.

Embodiment (4) is the projection optical system as described in embodiment (2) above, characterized in that the first optical system comprises a mirror that is rotationally symmetric around the optical axis and has a negative refractive power.

Embodiment (5) is the projection optical system as described in embodiment (2), (3) or (4) above, characterized in that a mirror surface of the mirror with a positive refractive power is a surface with a curvature decreasing from an intersection point of the mirror surface and the optical axis to a perimeter of the mirror surface.

Embodiment (6) is the projection optical system as described in any of embodiments (2) to (5) above, characterized in that a mirror surface of the mirror with a positive refractive power is an anamorphic and polynomial free-form surface with a first refractive power in first directions and a second refractive power different from the first refractive power in second directions orthogonal to the first directions.

Embodiment (7) is the projection optical system as described in any of embodiments (2) to (5) above, characterized in that a mirror surface of the mirror with a positive refractive power is a rotationally symmetric aspherical surface.

Embodiment (8) is the projection optical system as described in any of embodiments (1) to (7) above, characterized in that the first optical system comprises an optical element having an aspherical surface.

Embodiment (9) is the projection optical system as described in embodiment (8) above, characterized in that the first optical system comprises a stop and at least one optical element with a positive refractive power and at least one optical element with a negative refractive power which are provided between the stop and the second image, and an optical element with a strongest positive refractive power in the at least one optical element with a positive refractive power is provided between the stop and an optical element with a strongest negative refractive power in the at least one optical element with a negative refractive power, wherein the optical element having an aspherical surface is provided between the optical element with a strongest positive refractive power in the at least one optical element with a positive refractive power and the second image.

Embodiment (10) is the projection optical system as described in embodiment (8) or (9) above, characterized in that the optical element having an aspherical surface comprises a lens with a positive refractive power.

Embodiment (11) is the projection optical system as described in any of embodiments (8) to (10) above, characterized in that the optical element having an aspherical surface comprises an optical element in the first optical system which is closet to the second image.

Embodiment (12) is the projection optical system as described in any of embodiments (2) to (11) above, characterized in that the second image is an image which is tilted with respect to the optical axis and is curved.

Embodiment (13) is the projection optical system as described in any of embodiments (1) to (12) above, characterized in that the first optical system is a generally telecentric optical system with respect to the first image.

Embodiment (14) is the projection optical system as described in any of embodiments (1) to (13) above, characterized in that the first optical system comprises a first lens and a second lens and a mirror provided between the first lens and the second lens.

Embodiment (15) is the projection optical system as described in any of embodiments (1) to (14) above, characterized in that the Petzval sum of the first optical system is negative.

Embodiment (16) is the projection optical system as described in embodiment (15) above, characterized in that the Petzval sum of the first optical system is less than −0.0115.

Embodiment (17) is an image projecting apparatus configured to project an image onto a projection surface, characterized by comprising the projection optical system as described in any of embodiments (1) to (16) above.

Although the embodiment(s) and specific example(s) of the present invention have been described above specifically, the present invention is not limited to the embodiment(s) or specific example(s), and the embodiment(s) and specific example(s) of the present invention can be altered or modified without departing from the spirit and scope of the present invention.

The present application is based on Japanese priority application No. 2006-251910 filed on Sep. 15, 2006 and Japanese priority application No. 2007-229442 filed on Sep. 4, 2007, the entire contents of which priority applications are hereby incorporated by reference.

What is claimed is:

1. A projection optical system comprising:
 a first optical system configured to form a second image conjugate to a first image; and
 a second optical system including a reflective optical element which reflects light from the second image and is configured to project a third image conjugate to the second image onto a projection surface, wherein
 the first optical system has a Petzval sum with a sign opposite to a sign of a Petzval sum of the second optical system,
 the following condition PTZ<−0.0115 is satisfied, where PTZ is the Petzval sum component of the first optical system, and
 a size of the reflective optical element is less than or equal to 20,000 mm$^2$.

2. A projection optical system in which plural light beams emitted from an image forming element displaying image information on a conjugate plane A are allowed to be obliquely incident on a conjugate plane B so as to form an enlarged image of an image formed by the image forming element on the conjugate plane B, the projection optical system comprising:
 a first optical system; and
 a second optical system; wherein
 the projection optical system has a refractive power in the first optical system including only a lens system transmitting the light beams,
 an intermediate image of the image forming element is formed between the first optical system and the second optical system on which the plural light beams are generally converged,
 the intermediate image is formed by only a refractive power of the first optical system,
 the second optical system is a reflective optical system including a reflection mirror having a positive refractive power which reflects the light beams and is directly behind the intermediate image,
 the first optical system is configured to compensate for a Petzval sum component provided in the second optical system,
 the following condition PTZ<−0.0115 is satisfied, where PTZ is the Petzval sum component of the first optical system, and
 a size of the reflection mirror is less than or equal to 20,000 mm$^2$.

3. A projection optical system in which plural light beams emitted from an image forming element displaying image information on a conjugate plane A are allowed to be obliquely incident on a conjugate plane B so as to form an enlarged image of an image formed by the image forming element on the conjugate plane B, the projection optical system comprising:
 a first optical system; and
 a second optical system; wherein
 the projection optical system has a refractive power in the first optical system including a lens system transmitting the light beams and a first reflection mirror being rotationally symmetric with respect to an optical axis of the first optical system and having a negative refractive power, an intermediate image of the image forming element is formed between the first optical system and the second optical system on which the plural light beams are generally converged, the intermediate image is formed by only a refractive power of the first optical system, the second optical system is a reflective optical system including a second reflection mirror having a positive refractive power which reflects the light beams and is directly behind the intermediate image, the first optical system is configured to compensate for a Petzval sum component provided in the second optical system, the following condition PTZ<−0.0115 is satisfied, where PTZ is the Petzval sum component of the first optical system, and a size of the second reflection mirror is less than or equal to 20,000 mm$^2$.

4. The projection optical system as claimed in claim 2, wherein a curved surface of the mirror having a positive refractive power in the second optical system has a shape such that a curvature thereof becomes smaller from its intersection point with an optical axis of the first optical system to a perimeter thereof.

5. The projection optical system as claimed in claim 2, wherein the mirror having a positive refractive power in the second optical system has an anamorphic and polynomial free-form surface having different powers between a minor axis direction and major axis direction of the image forming element.

6. The projection optical system as claimed in claim 2, wherein the mirror having a positive refractive power in the second optical system has a surface with a rotationally symmetric and aspherical shape.

7. The projection optical system as claimed in claim 2, wherein a lens of the first optical system has at least one surface with an aspherical shape.

8. The projection optical system as claimed in claim 7, wherein at least one aspherical surface in the first optical system is positioned in a group.

9. The projection optical system as claimed in claim 8, wherein at least one aspherical surface in the group of the first optical system is positioned on a lens having a positive refractive power.

10. The projection optical system as claimed in claim 7, wherein at least one aspherical surface in the first optical system is a surface of a lens system that is closest to the conjugate plane B.

11. The projection optical system as claimed in claim 2, wherein the intermediate image is curved and tilted with respect to a surface perpendicular to an optical axis of the first optical system.

12. The projection optical system as claimed in claim 2, wherein the projection optical system is generally telecentric from the image forming element to a first surface of the transmittable refractive optical system.

13. The projection optical system as claimed in claim 2, wherein a reflection mirror is arranged between lenses of the first optical system.

14. An image projecting apparatus, comprising:
an image forming element configured to form a first image; and
a projection optical system,
wherein the projection optical system includes,
a first optical system configured to form a second image conjugate to the first image, and
a second optical system including a reflective optical element which reflects light from the second image and is configured to project a third image conjugate to the second image onto a projection surface, and
wherein
the first optical system has a Petzval sum with a sign opposite to a sign of a Petzval sum of the second optical system,
the following condition PTZ<−0.0115 is satisfied, where PTZ is the Petzval sum component of the first optical system, and
a size of the reflective optical element is less than or equal to 20,000 mm$^2$.

15. An image projecting apparatus, comprising:
an image forming element configured to display image information on a conjugate plane A; and
a projection optical system in which plural light beams emitted from the image forming element are allowed to be obliquely incident on a conjugate plane B so as to form an enlarged image of an image formed by the image forming element on the conjugate plane B, the projection optical system including,
a first optical system, and
a second optical system,
wherein the projection optical system has a refractive power in the first optical system including only a lens system transmitting the light beams,
an intermediate image of the image forming element is formed between the first optical system and the second optical system on which the plural light beams are generally converged,
the intermediate image is formed by only a refractive power of the first optical system,
the second optical system is a reflective optical system including a reflection mirror having a positive refractive power which reflects the light beams and is directly behind the intermediate image,
the first optical system is configured to compensate for a Petzval sum component provided in the second optical system,
the following condition PTZ<−0.0115 is satisfied, where PTZ is the Petzval sum component of the first optical system, and
a size of the reflection mirror is less than or equal to 20,000 mm$^2$.

16. An image projecting apparatus, comprising:
an image forming element configured to display image information on a conjugate plane A; and
a projection optical system in which plural light beams emitted from the image forming element are allowed to be obliquely incident on a conjugate plane B so as to form an enlarged image of an image formed by the image forming element on the conjugate plane B, the projection optical system including,
a first optical system, and
a second optical system,
wherein the projection optical system has a refractive power in the first optical system including a lens system transmitting the light beams and a first reflection mirror being rotationally symmetric with respect to an optical axis of the first optical system and having a negative refractive power, an intermediate image of the image forming element is formed between the first optical system and the second optical system on which the plural light beams are generally converged, the intermediate image is formed by only a refractive power of the first optical system, the second optical system is a reflective optical system including a second reflection mirror having a positive refractive power which reflects the light beams and is directly behind the intermediate image, the first optical system is configured to compensate for a Petzval sum component provided in the second optical system, the following condition PTZ<-0.0115 is satisfied, where PTZ is the Petzval sum component of the first optical system, and a size of the second reflection mirror is less than or equal to 20,000 mm$^2$.

* * * * *